United States Patent
Kim et al.

(10) Patent No.: US 11,436,701 B2
(45) Date of Patent: Sep. 6, 2022

(54) METHOD AND APPARATUS FOR STREAMING VR IMAGE

(71) Applicant: SAMSUNG ELECTRONICS CO., LTD., Suwon-si (KR)

(72) Inventors: Seungmo Kim, Suwon-si (KR); Hyunjin Yang, Suwon-si (KR); Seungyoung Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/175,020

(22) Filed: Feb. 12, 2021

(65) Prior Publication Data

US 2021/0256658 A1    Aug. 19, 2021

(30) Foreign Application Priority Data

Feb. 14, 2020    (KR) .................. 10-2020-0018573

(51) Int. Cl.
*G06T 3/40*    (2006.01)
*H04L 65/61*    (2022.01)
*G06F 3/01*    (2006.01)

(52) U.S. Cl.
CPC .......... *G06T 3/4046* (2013.01); *G06F 3/013* (2013.01); *H04L 65/61* (2022.05)

(58) Field of Classification Search
CPC .............................. G06T 3/4046; G06F 3/013
See application file for complete search history.

(56) References Cited

U.S. PATENT DOCUMENTS

| | | | |
|---|---|---|---|
| 10,062,414 B1 | 8/2018 | Westphal | |
| 10,110,678 B2 | 10/2018 | Hebsur et al. | |
| 2016/0260196 A1 | 9/2016 | Roimela et al. | |
| 2018/0152690 A1* | 5/2018 | Ha | G06T 19/006 |
| 2018/0192058 A1* | 7/2018 | Chen | H04N 19/119 |
| 2018/0288363 A1 | 10/2018 | Amengual Galdon et al. | |

(Continued)

FOREIGN PATENT DOCUMENTS

KR    10-2018-0020887    2/2018

OTHER PUBLICATIONS

Search Report and Written Opinion dated May 17, 2021 in counterpart International Patent Application No. PCT/KR2021/001779.

(Continued)

*Primary Examiner* — Shivang I Patel
(74) *Attorney, Agent, or Firm* — Nixon & Vanderhye, P.C.

(57) ABSTRACT

Provided are an edge data network for streaming a virtual reality (VR) image and a device for displaying a VR image. An example method, performed by the edge data network, of streaming a VR image includes receiving gaze information of a user viewing the VR image from a device, determining at least a partial region among all of regions of the VR image as an artificial intelligence (AI) scaling target region of the VR image, based on the gaze information, determining an AI scaling change level for the AI scaling target region, performing a scaling change on a region corresponding to the AI scaling target region among the regions of the VR image obtained from a media server, according to the AI scaling change level, generating VR image data including the AI scaling target region, and streaming the VR image data to the device.

18 Claims, 34 Drawing Sheets

(56) References Cited

U.S. PATENT DOCUMENTS

2019/0313144 A1 10/2019 Stokking et al.
2020/0053408 A1 2/2020 Park et al.

OTHER PUBLICATIONS

Hong, S.W. et al., "Technologies of Intelligent Edge Computing and Networking", Electronics and Telecommunications Trends. vol. 34, No. 1, Feb. 2019, pp. 23-35.
VR and Edge Computing, Dec. 12, 2018 (=https://netmanias.com/ko/?m=view&id=blog&no=13939) and English-language translation, 11 pages.
Hou et al., "Predictive View Generation to Enable Mobile 360-degree and VR Experiences", VR/AR Network '18, Aug. 24, 2018, 7 pages.
Sun et al., "Communication, Computing and Caching for Mobile VR Delivery: Modeling and Trade-off", Apr. 27, 2018, 6 pages.
Antunes, "A.I. Gigapixel: Enlarge Images Using Artificial Intelligence", Aug. 17, 2018 (=https://www.provideocoalition.com/a-i-gigapixel-enlarge-images-using-artificial-intelligence/), 6 pages.

* cited by examiner

FIG. 5

| IMAGE-RELATED INFORMATION | DNN CONFIGURATION INFORMATION |
|---|---|
| SD, 10Mbps, AV1 | A DNN CONFIGURATION INFORMATION |
| HD, 15Mbps, H.264 | B DNN CONFIGURATION INFORMATION |
| Full HD, 20Mbps, HEVC | C DNN CONFIGURATION INFORMATION |
| Full HD, 15Mbps, HEVC | D DNN CONFIGURATION INFORMATION |

METHOD AND APPARATUS FOR STREAMING VR IMAGE

CROSS-REFERENCE TO RELATED APPLICATION

This application is based on and claims priority under 35 U.S.C. § 119 to Korean Patent Application No. 10-2020-0018573, filed on Feb. 14, 2020, in the Korean Intellectual Property Office, the disclosure of which is incorporated by reference herein in its entirety.

BACKGROUND

1. Field

The disclosure relates to a method, performed by an edge data network, of streaming a virtual reality (VR) image, and for example, to an edge data network that streams a VR image by adaptively performing artificial intelligence (AI) scaling, depending on whether an AI codec is supported.

2. Description of Related Art

Recently, an edge computing technique for transmitting data using an edge server is being discussed. The edge computing technique may include, for example, multi-access edge computing (MEC) or fog computing (FOC). The edge computing technique may refer to a technique for providing data to an electronic device from a separate server (hereinafter, referred to as an 'edge data network' or an 'MEC server') installed at a location geographically close to the electronic device, e.g., inside or near a base station. For example, an application requiring low latency among at least one application installed in the electronic device may transmit and receive data to and from an edge server installed at a geographically close location without passing through a server arranged in an external data network (DN) (e.g., the Internet).

Recently, a service using the edge computing technique (hereinafter, an 'MEC based service' or an 'MEC service') is being discussed, and research and development regarding an electronic device for supporting the MEC based service are being conducted. For example, an application of the electronic device may transmit and receive edge computing-based data on the edge server (or an application of the edge server) and an application layer.

Along with the research and development for supporting the MEC based service, a scheme to shorten the latency of an edge data network (e.g., an MEC server) that provides the MEC based service is being discussed. For example, discussions are conducted about a method of efficiently streaming a virtual reality (VR) image depending on support or non-support of a video codec, when a VR image streaming service is provided to a terminal using the edge computing service.

SUMMARY

Embodiments of the disclosure provide an adaptive virtual reality (VR) streaming method based on artificial intelligence (AI) upscaling or AI downscaling using an edge data network.

Additional aspects will be set forth in part in the description which follows and, in part, will be apparent from the description.

According to an example embodiment, a method, performed by an edge data network, of streaming a VR image is provided. A method, performed by the edge data network, of streaming a VR image includes: receiving gaze information associated with a displayed VR image from a device, determining at least a partial region among all of regions of the VR image as an AI scaling target region of the VR image, based on the gaze information, determining an AI scaling change level for the AI scaling target region, performing scaling change on a region corresponding to the AI scaling target region among the regions of the VR image obtained from a media server, according to the AI scaling change level, generating VR image data including the AI scaling target region, and streaming the VR image data to the device.

According to an example embodiment, the determining of the at least a partial region among all of the regions of the VR image as the AI scaling target region of the VR image, based on the gaze information may include receiving first network information regarding a network environment between the edge data network and the device, classifying the VR image into a plurality of regions based on the gaze information and the first network information, and determining the AI scaling target region based on the classified regions.

According to an example embodiment, the AI scaling change level is determined based on at least one of the first network information regarding the network environment between the edge data network and the device, first request information received from the device, or first AI data regarding AI scaling performed by the media server.

According to an example embodiment, the method may further include receiving first request information from the device, and wherein the first request information of the device includes at least one of the gaze information of the user, first network information, device information, or image information.

According to an example embodiment, the determining of the AI scaling change level for the AI scaling target region may include generating display batch information about all of the regions of the VR image, including the AI scaling target region, based on the AI scaling change level determined for the AI scaling target region.

According to an example embodiment, the streaming of the VR image data to the device may include transmitting the display batch information to the device.

According to an example embodiment, the method may further include obtaining the VR image from the media server.

According to an example embodiment, the obtaining of the VR image from the media server may include generating second request information based on at least one of the gaze information of the user, device information, image information requested by the device, second network information regarding a network environment between the edge data network and the media server, or media server information, transmitting the second request information to the media server, and receiving, from the media server, VR image data generated based on the second request information.

According to an example embodiment, the receiving of the VR image data generated based on the second request information from the media server may include receiving first AI data regarding AI downscaling performed by the media server, and the VR image data generated based on the second request information may corresponds to data of a VR image whose partial region among all of the VR image is AI-downscaled.

According to an example embodiment, the streaming of the VR image data to the device may include transmitting second AI data regarding the AI scaling change level to the device.

According to an example embodiment, a method of displaying a VR image, the method being performed by a device, may be provided. The method of displaying, performed by the device, the VR image may include: determining gaze information of a VR image displayed by the device, receiving, from the edge data network, VR image data for a VR image in which at least a partial region among all of regions of the VR image has undergone AI scaling change, obtaining a VR image from the VR image data, and displaying the obtained VR image.

According to an example embodiment, the obtaining of the VR image from the VR image data may include determining the at least a partial region among all of the regions of the VR image as an AI scaling target region of the VR image, based on the gaze information, determining an AI scaling change level for the AI scaling target region, and performing scaling change on a region corresponding to the AI scaling target region among regions of the VR image obtained from the edge data network, according to the AI scaling change level.

According to an example embodiment, the determining of the AI scaling change level for the AI scaling target region may include receiving second AI data regarding AI scaling performed by the edge data network, from the edge data network and determining the AI scaling change level for the AI scaling target region based on at least one of the second AI data or the gaze information of the user.

According to an example embodiment, the method may further include receiving display batch information regarding the AI scaling target region from the edge data network, and the displaying of the obtained VR image may include combining regions of the VR image which are included in the VR image data based on the display batch information.

According to an example embodiment, there may be provided a method, performed by a media server, of streaming a VR image. The method, performed by the media server, streaming the VR image may include: receiving request information from an edge data network, generating VR image data based on the request information, and streaming the generated VR image data to the edge data network.

According to an example embodiment, the request information may include at least one of gaze information of a user viewing the VR image, device information, image information, second network information, or media server information.

According to an example embodiment, the generating of the VR image data based on the request information may include determining at least a partial region among all of regions of the VR image as an AI scaling target region of the VR image, determining an AI scaling change level for the AI scaling target region, and performing scaling change on a region corresponding to the AI scaling target region among the regions of the VR image, according to the AI scaling change level.

According to an example embodiment, the AI scaling change level is determined based on at least one of the gaze information of the user or the second network information.

According to an example embodiment, there may be provided an edge data network for streaming a VR image. The edge data network may include: a communicator comprising communication circuitry configured to communicate with a device and a media server, a memory storing at least one instruction, and at least one processor configured to control the edge data network by executing the at least one instruction.

According to an example embodiment, the at least one processor may be further configured to execute the at least one instruction to control the communicator to receive gaze information of a displayed VR image from the device, to determine at least a partial region among all of regions of the VR image as an AI scaling target region of the VR image, based on the received gaze information, to determine an artificial intelligence (AI) scaling change level for the AI scaling target region, to perform a scaling change on a region corresponding to the AI scaling target region among the regions of the VR image obtained from the media server, according to the AI scaling change level, to generate VR image data including the AI scaling target region, and to control the communicator to stream the VR image data to the device.

According to an example embodiment, the at least one processor may be further configured to execute the at least one instruction to control the communicator to receive first network information regarding a network environment between the edge data network and the device, to classify the VR image into a plurality of regions based on the gaze information and the first network information, and to determine the AI scaling target region based on the classified regions.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 5 is a diagram illustrating an example mapping relationship between several image-related information pieces and several DNN configuration information pieces according to various embodiments;

DETAILED DESCRIPTION

Figure 1:
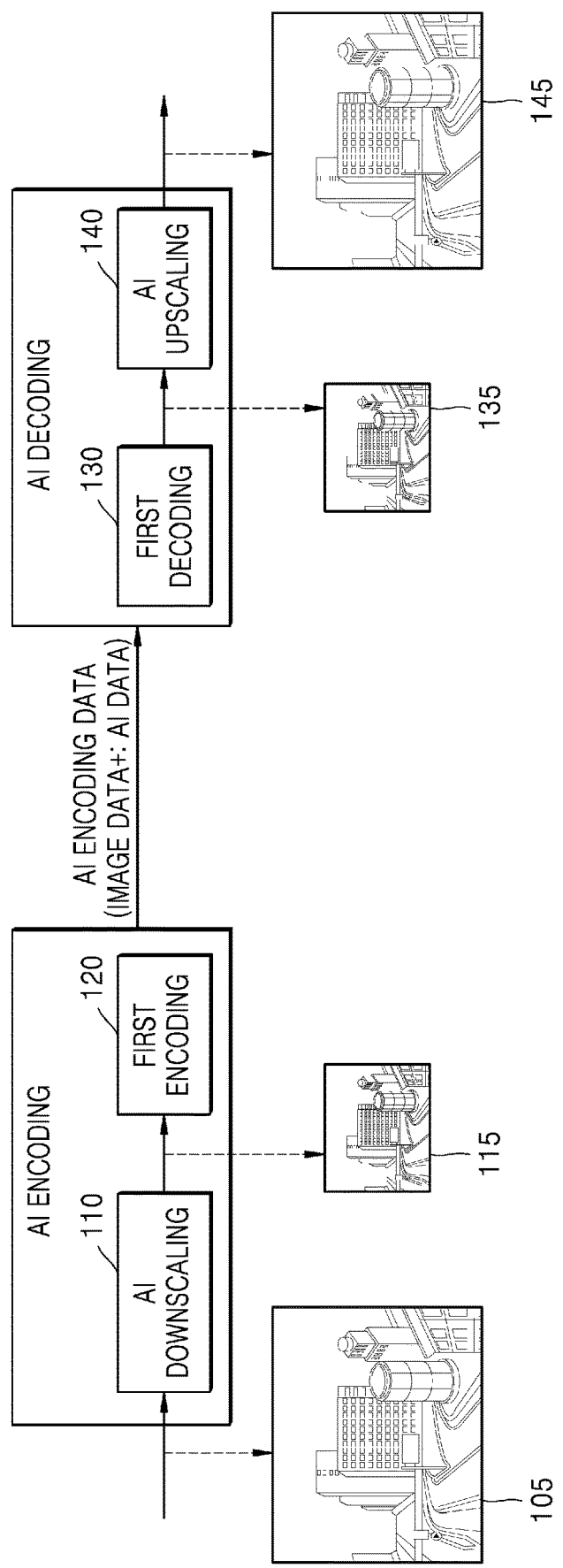
FIG. 1 is a diagram illustrating an example artificial intelligence (AI) encoding process and an AI decoding process, according to various embodiments.

Various changes may be made to the disclosure and the disclosure may have various embodiments which will be described in greater detail below with reference to the drawings. However, the embodiments according to the disclosure are not limited to specified disclosures, and include all changes, equivalents, or substitutes that do not depart from the spirit and technical scope of the disclosure.

In this disclosure, a detailed description of related well-known techniques may be omitted when it unnecessarily obscures the subject matter of the disclosure. In addition, numbers (e.g., $1^{st}$, $2^{nd}$, first, second, etc.) used in the description of the disclosure are merely identification symbols for distinguishing one element from another element.

Moreover, in the present disclosure, when a component is mentioned as being "connected" or "coupled" to another component, it may be directly connected or directly coupled to the another component, but unless described otherwise, it should be understood that the component may also be connected or coupled to the another component via still another component therebetween.

In addition, herein, components expressed as 'unit', 'module', etc., may be made by combining two or more components into one component, or one component may be divided into two or more components based on divided functions. Moreover, each component to be described below may additionally perform all or some of functions managed by another component in addition to a main function managed by the component, and a partial function of the main function managed by each component may be performed by another component.

Throughout the disclosure, the expression "at least one of a, b or c" indicates only a, only b, only c, both a and b, both a and c, both b and c, all of a, b, and c, or variations thereof.

In addition, in the present disclosure, an 'image' or a 'picture' may correspond to a still image, a moving image including a plurality of continuous still images (or frames), or video.

Herein, a 'deep neural network (DNN)' may refer, for example, to a representative example of an artificial neural network model simulating a cranial nerve, and is not limited to an artificial neural network model using a specific algorithm.

Furthermore, herein, a 'parameter' may refer, for example, to a value used in an operation of each of layers constituting a neural network, and may include a weight value used in application of an input value to a specific operation expression. The parameter may also be expressed in the form of a matrix. The parameter, which may include a value set as a result of training, may be updated through separate training data.

Herein, a 'first DNN' may mean a DNN used for artificial intelligence (AI) downscaling of an image, and a 'second DNN' may refer, for example, to a DNN used for AI upscaling of an image.

Herein, 'DNN configuration information' may include a parameter described above as information related to an element forming a DNN. By using the DNN configuration information, the first DNN or the second DNN may be configured.

Herein, an 'original image' may refer, for example, to an image that is subject to AI encoding, and a 'first image' may refer, for example, to an image obtained as a result of AI-downscaling the original image in an AI encoding process. In addition, a 'second image' may refer, for example, to an image obtained through first decoding in an AI decoding process, and a 'third image' may refer, for example, to an image obtained through AI upscaling of the second image during AI decoding.

Herein, 'AI downscaling' may refer, for example, to processing to reduce a resolution of an image based on AI, and 'first encoding' may refer, for example, to encoding using image compression based on frequency conversion. 'First decoding' may refer, for example, to decoding using image reconstruction based on frequency conversion, and 'AI upscaling' may refer, for example, to processing to increase the resolution of an image based on AI.

FIG. 1 is a diagram illustrating an example AI encoding process and an AI decoding process according to various embodiments.

As the resolution of an image sharply increases, information throughput for encoding/decoding increases, requiring a scheme to improve the efficiency of encoding and decoding of an image.

As shown in FIG. 1, according to various embodiments, a first image 115 may be obtained by performing AI-downscaling 110 on a high-resolution original image 105. By performing first encoding 120 and first decoding 130 on the first image 115 having a low resolution, a bitrate to be processed may be largely reduced when compared to performing first encoding 120 and first decoding 130 on the original image 105.

In various embodiments, in the AI encoding process, the first image 115 may be obtained by performing AI-downscaling 110 on the original image 105 and first encoding 120 is then performed on the first image 115. In the AI decoding process, AI encoding data obtained as a result of AI encoding, which includes AI data and image data, may be received, a second image 135 may be obtained through first decoding 130, and AI upscaling 140 may be performed on the second image 135 to obtain a third image 145.

To be more specific about the AI encoding process, upon input of the original image 105, AI downscaling 110 may be performed on the original image 105 to obtain the first image 115 having a specific resolution or quality. AI downscaling 110 is performed based on AI, and, in this case, AI for AI downscaling 110 may be jointly trained with AI for AI upscaling 140 of the second image 135. This is because when AI for AI downscaling 110 and AI for AI upscaling 140 are separately trained, a difference between the original image 105 that is subject to AI encoding and the third image 145 reconstructed through AI decoding increases.

In various embodiments, to maintain such a joint relationship in the AI encoding process and the AI decoding process, AI data may be used. Thus, the AI data obtained through the AI encoding process may include information indicating an upscaling target, and AI upscaling 140 has to be performed on the second image 135 according to the upscaling target identified based on the AI data in the AI decoding process.

The AI for AI downscaling 110 and the AI for AI upscaling 140 may be implemented with a DNN. As will be described below with reference to FIG. 9, the first DNN and the second DNN are jointly trained through sharing of loss information under a specific target, such that an AI encoding apparatus may provide target information used in joint training between the first DNN and the second DNN to an AI decoding apparatus which may perform AI upscaling 140 at a targeting resolution on the second image 135 based on the provided target information.

To describe in detail first encoding 120 and first decoding 130 shown in FIG. 1, the amount of information of the first image 115 which is AI-downscaled 110 from the original image 105 may be reduced through first encoding 120. First encoding 120 may, for example, include generating predicted data by predicting the first image 115, generating residual data corresponding to a difference between the first image 115 and the predicted data, transforming the residual data, which is a spatial-domain component, into a frequency-domain component, quantizing the residual data transformed into the frequency-domain component, and entropy-encoding the quantized residual data. This first encoding 120 may be implemented by one of image compression methods using frequency conversion, such as Moving Picture Experts Group (MPEG)-2, H. 264 advanced video coding (AVC), MPEG-4, high efficiency video coding (HEVC), VC-1, VP8, VP9, AOMedia video 1 (AV1), etc.

The second image 135 corresponding to the first image 115 may be reconstructed through first decoding 130 of the image data. First decoding 130 may, for example, include performing entropy-decoding on the image data to generate quantized residual data, dequantizing the quantized residual data, transforming residual data of a frequency-domain component into a spatial-domain component, generating predicted data, and reconstructing the second image 135 by using the predicted data and the residual data. Such first decoding 130 may be implemented by an image reconstruction method corresponding to one of image compression methods using frequency conversion, such as MPEG-2, H. 264 AVC, MPEG-4, HEVC, VC-1, VP8, VP9, AV1, etc., used in first encoding 120.

The AI encoding data obtained through the AI encoding process may include image data obtained as a result of first encoding 120 of the first image 115 and AI data related to AI downscaling 110 of the original image 105. The image data may be used in first decoding 130, and the AI data may be used in AI upscaling 140.

The image data may be transmitted in the form of a bitstream. The image data may include data obtained based on pixel values in the first image 115, e.g., residual data that is a difference between the first image 115 and predicted data of the first image 115. The image data may include information used in first encoding 120 of the first image 115. For example, the image data may include prediction mode information used in first encoding 120 of the first image 115, motion information, quantization parameter information used in first encoding 120, etc. The image data may be generated according to rules, e.g., a syntax, of the image compression method used in first encoding 120 among image compression methods using frequency conversion such as MPEG-2, H.264 AVC, MPEG-4, HEVC, VC-1, VP8, VP9, AV1, etc.

The AI data may be used in AI upscaling 140 based on the second DNN. As described above, the first DNN and the second DNN are jointly trained, such that the AI data may include information that enables AI upscaling 140 of the second image 135 to be accurately performed through the second DNN. In the AI decoding process, AI upscaling 140 may be performed at a targeting resolution and/or quality on the second image 135 based on the AI data.

The AI data may be transmitted together with the image data in the form of a bitstream. Alternatively, depending on implementation, the AI data may be transmitted separately from the image data, in the form of a frame or a packet. The image data and the AI data, which are obtained as a result of AI encoding, may be transmitted through an identical network or different networks.

Figure 2:
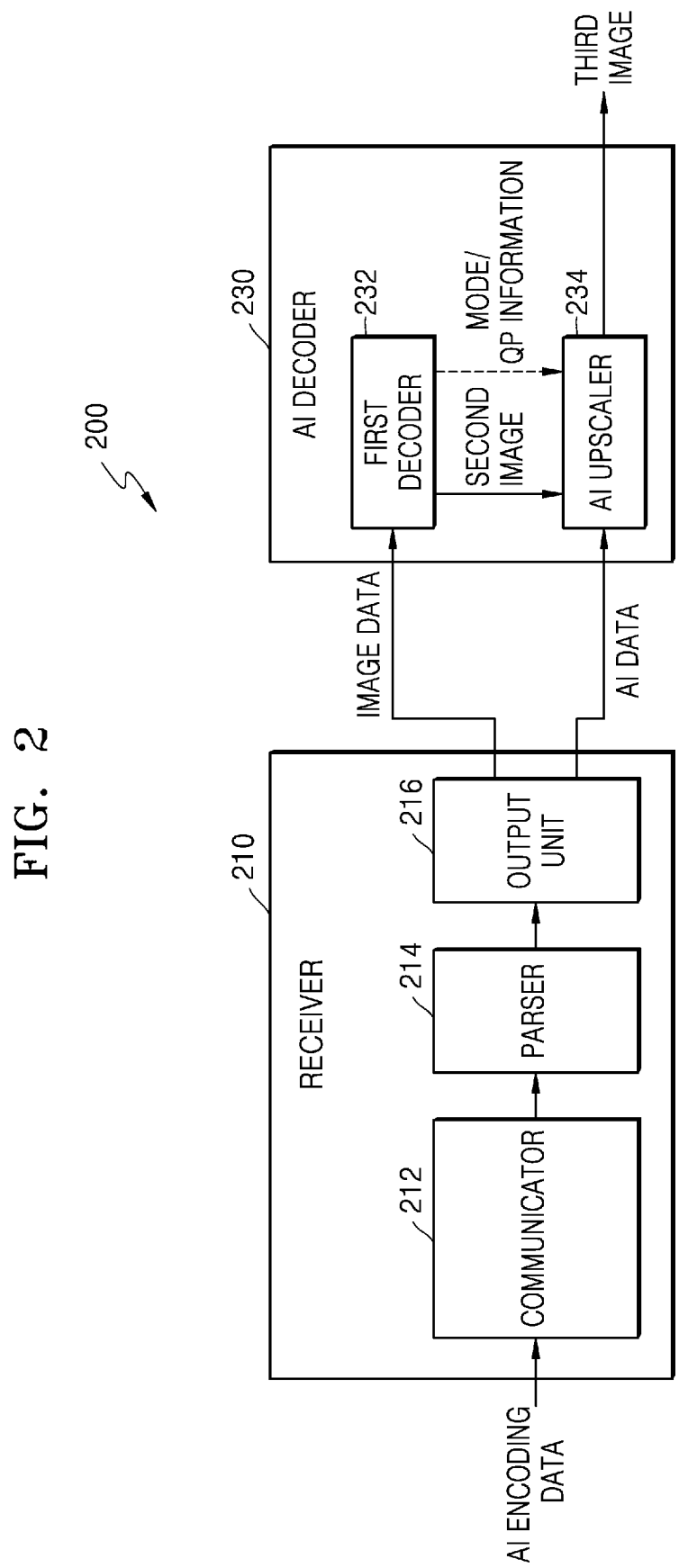
FIG. 2 is a block diagram illustrating an example AI decoding apparatus according to various embodiments.

FIG. 2 is a block diagram illustrating an example AI decoding apparatus 200 according to various embodiments.

Referring to FIG. 2, the AI decoding apparatus 200 according to various embodiments may include a receiver 210 and an AI decoder 230. The receiver 210 may include a communicator (including communication circuitry) 212, a parser 214, and an output unit (including output circuitry) 216. The AI decoder 230 may include a first decoder 232 and an AI upscaler 234.

The receiver 210 may receive and parse AI encoding data obtained as a result of AI encoding and separately output the image data and the AI data to the AI decoder 230.

More specifically, the communicator 212 may receive AI encoding data obtained as a result of AI encoding, over a network. The AI encoding data obtained as the result of AI encoding may include image data and AI data. The image data and the AI data may be received through a homogeneous network or a heterogeneous network.

The parser 214 may receive the AI encoding data received through the communicator 212 and parse the AI encoding data to identify the data as image data or AI data. For example, the parser 214 may read a header of data obtained from the communicator 212 to identify whether the data is image data or AI data. In an example, the parser 214 may identify the data received through the communicator 212 as image data or AI data based on the header of the received data and transmit the received data to the output unit 216 which may output (e.g., transmit) the identified data to the first decoder 232 and the AI upscaler 234. In this case, the image data included in the AI encoding data may be identified as image data obtained through a certain codec (e.g., MPEG-2, H.264, MPEG-4, HEVC, VC-1, VP8, VP9, or AV1). To process the image data based on the identified codec, corresponding information may be transmitted to the first decoder 232 through the output unit 216.

In various embodiments, the AI encoding data to be parsed by the parser 214 may be obtained from a data storage medium including magnetic media such as hard disk, floppy disk, and magnetic tape, optical media such as compact disk read only memory (CD-ROM) and digital versatile disk (DVD), magneto-optical media such as floptical disk, etc.

The first decoder 232 may reconstruct the second image 135 corresponding to the first image 115 based on the image data. The second image 135 obtained by the first decoder 232 may be provided to the AI upscaler 234. Depending on an implementation example, first decoding-related information such as prediction mode information, motion information, quantization parameter (QP) information, etc., included in the image data may be further provided to the AI upscaler 234.

The AI upscaler 234 having received the AI data may perform AI upscaling on the second image 135 based on the AI data. Depending on an implementation example, the AI upscaler 234 may perform AI upscaling by further using first decoding-related information such as prediction mode information, quantization parameter (QP) information, etc., included in the image data.

The receiver 210 and the AI decoder 230 according to an example embodiment are described above and illustrated in FIG. 2 as separate devices, but may also be implemented through one processor. In this case, the receiver 210 and the AI decoder 230 may be implemented as dedicated processors, and may be implemented through a combination of a general-purpose hardware processor, such as an AP, a CPU, or a GPU, and software (S/W). In addition, the dedicated processor may be implemented by including a memory for implementing various embodiments or by including a memory processor for using an external memory.

In addition, the receiver 210 and the AI decoder 230 may include a plurality of processors. In this case, the receiver 210 and the AI decoder 230 may be implemented with a combination of dedicated processors, and may be implemented with a combination of a general-purpose processors, such as an AP, a CPU, or a GPU, and S/W. Likewise, the AI upscaler 234 and the first decoder 232 may be implemented using different processors.

The AI data provided to the AI upscaler 234 may include information for AI-upscaling the second image 135. An upscaling target needs to correspond to downscaling of the first DNN. Thus, the AI data includes information for identifying a downscaling target of the first DNN.

To be more specific about the information included in the AI data, the information may include difference information between a resolution of the original image 105 and a resolution of the first image 115, information related to the first image 115, etc.

The difference information may be expressed in the form of information (e.g., a resolution change rate information) about a resolution change level of the first image 115 with respect to the original image 105. Then, the resolution of the first image 115 may be identified from the resolution of the reconstructed second image 135, through which the resolution change level may be identified, such that the difference information may be expressed merely with resolution information of the original image 105. Herein, the resolution information may be expressed as a screen size of width/length, and as a ratio (16:9, 4:3, etc.) and a size of one axis. When preset resolution information exists, the resolution information may also be expressed in the form of an index or a flag.

The information related to the first image 115 may include information about at least one of a bitrate of image data obtained as a result of first encoding of the first image 115 or a codec type used in first encoding of the first image 115.

The upscaler 234 may determine an upscaling target of the second image 135 based on at least one of the difference information included in the AI data or the information related to the first image 115. The upscaling target may indicate, e.g., a level of a resolution to which the second image 135 needs to be upscaled. When the AI upscaler 234 determines the upscaling target, the AI upscaler 234 may perform AI upscaling on the second image 135 through the second DNN to obtain the third image 145 corresponding to the upscaling target.

Prior to a description of a method, performed by the AI upscaler 234, of performing AI upscaling on the second image 135 based on the upscaling target, an AI upscaling process based on the second DNN will be described with reference to FIGS. 3 and 4.

Figure 3:
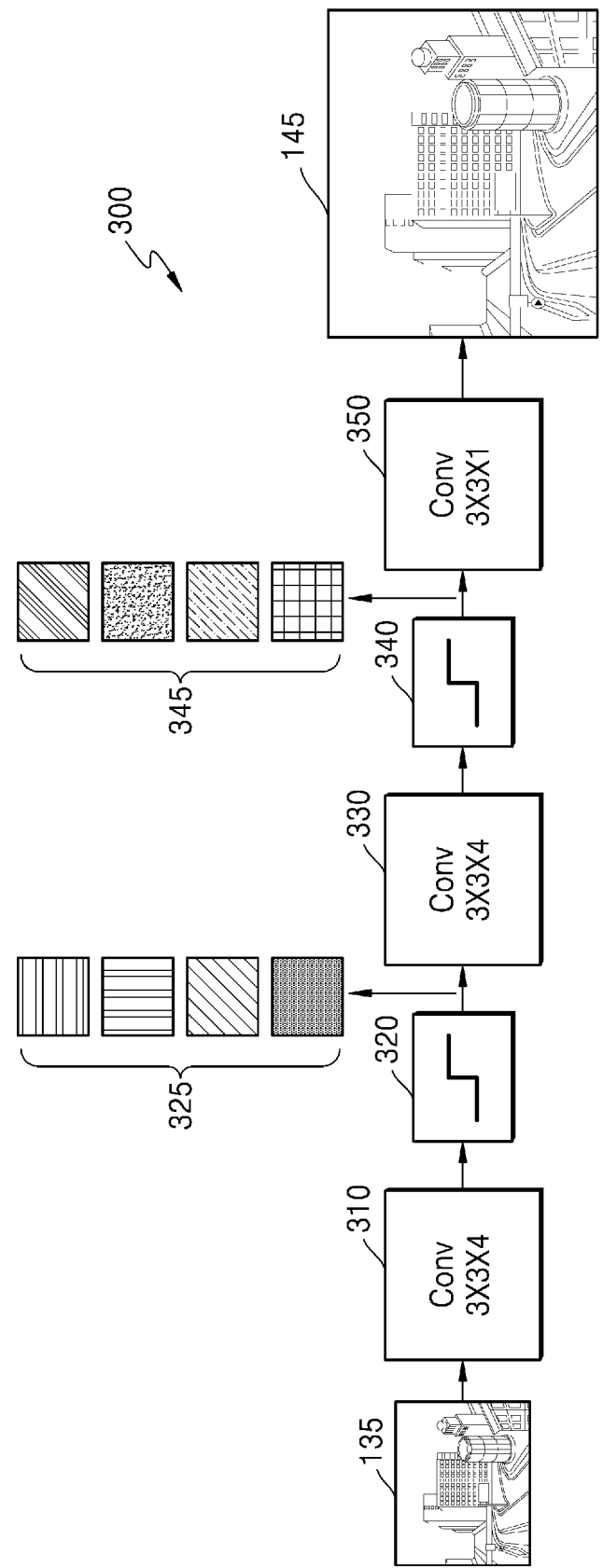
FIG. 3 is a diagram illustrating an example second deep neural network (DNN) for AI-upscaling a second image according to various embodiments.
Figure 4:
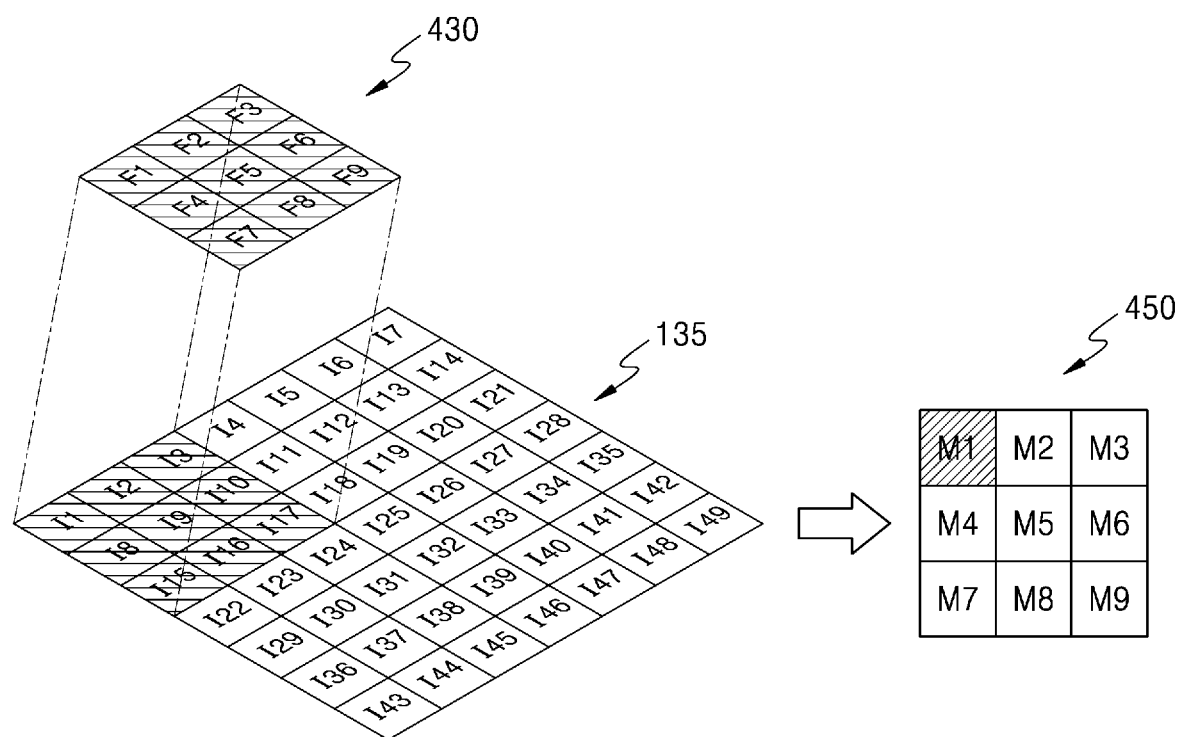
FIG. 4 is a diagram illustrating an example convolution operation in a first convolution layer shown in FIG. 3 according to various embodiments.

FIG. 3 is a diagram illustrating an example second DNN 300 for AI-upscaling the second image 135, and FIG. 4 is a diagram illustrating an example convolution operation in a first convolution layer 310 shown in FIG. 3.

As shown in FIG. 3, the second image 135 may be input to the first convolution layer 310. 3×3×4 indicated in the first convolution layer 310 shown in FIG. 3 illustrates convolution processing with respect to one input image by using four 3×3 filter kernels. As a result of convolution processing, four feature maps may be generated by the four filter kernels. Each feature map may indicate unique features of the second image 135. For example, each feature map may indicate a vertical direction feature, a horizontal direction feature, an edge feature, etc., of the second image 135.

Referring to FIG. 4, an example convolution operation in the first convolution layer 310 will be described in detail.

Through a multiplication operation and an addition operation between parameters of a filter kernel 430 having a size of 3×3 used in the first convolution layer 310 and pixel values in the second image 135 corresponding thereto, one feature map 450 may be generated. Four filter kernels are used in the first convolution layer 310, such that four feature maps may be generated through a convolution operation process using the four filter kernels.

I1 through I49 indicated on the second image 135 in FIG. 4 may indicate pixels of the second image 135, and F1 through F9 indicated on the filter kernel 430 may indicate parameters of the filter kernel 430. M1 through M9 indicated on the feature map 450 may indicate samples of the feature map 450.

In FIG. 4, the second image 135 is illustrated as including 49 pixels, but this illustration is merely an example, and when the second image 135 has a resolution of 4K, for example, the second image 135 may include 3840×2160 pixels.

During a convolution operation, multiplication between each of pixel values of I1, I2, I3, I8, I9, I10, I15, I16, and I17 of the second image 135 and each of the parameters F1, F2, F3, F4, F5, F6, F7, F8, and F9 of the filter kernel 430 may be performed, and a combination (e.g., an addition operation) of results of the multiplication may be assigned as a value of the sample M1 of the feature map 450. When a stride of the convolution operation is 2, multiplication between each of pixel values of I3, I4, I5, I10, I11, I12, I17, I18, and I19 of the second image 135 and each of the parameters F1, F2, F3, F4, F5, F6, F7, F8, and F9 of the filter kernel 430 may be performed, and a combination of results of the multiplication may be assigned as a value of the sample M2 of the feature map 450.

As the filter kernel 430 moves according to a stride until the filter kernel 430 reaches the last pixel of the second image 135, a convolution operation is performed between pixel values in the second image 135 and parameters of the filter kernel 430, such that the feature map 450 having a certain size may be obtained.

According to the disclosure, parameters of the second DNN, e.g., parameters of a filter kernel (e.g., F1, F2, F3, F4, F5, F6, F7, F8, and F9 of the filter kernel 430) used in convolution layers of the second DNN may be optimized through joint training between the first DNN and the second DNN. As described above, the AI upscaler 234 may determine an upscaling target corresponding to a downscaling target of the first DNN based on the AI data, and determine parameters corresponding to the determined upscaling target as parameters of the filter kernel to be used in convolution layers of the second DNN.

The convolution layers included in the first DNN and the second DNN may be processed based on the convolution operation described with reference to FIG. 4, but the convolution operation described with reference to FIG. 4 is merely an example, without being limited thereto.

Referring back to FIG. 3, feature maps output from the first convolution layer 310 may be input to a first activation layer 320.

The first activation layer 320 may give a non-linear feature to each feature map. The first activation layer 320 may include, but not limited to, a sigmoid function, a Tan h function, a rectified linear unit (ReLU) function, etc.

Giving the non-linear feature in the first activation layer 320 may, for example, refer to changing and outputting some sample values of a feature map which is an output of the first convolution layer 310. In this case, changing may be performed by applying the non-linear feature.

The first activation layer 320 may determine whether to transmit sample values of feature maps output from the first convolution layer 310 to a second convolution layer 330. For example, among the sample values of the feature maps, some sample values may be activated by the first activation layer 320 and transmitted to the second convolution layer 330 and some other sample values may be deactivated by the first activation layer 320 and thus not transmitted to the second convolution layer 330. Unique features of the second image 135 indicated by the feature maps may be emphasized by the first activation layer 320.

Feature maps 325 output from the first convolution layer 320 may be input to the second convolution layer 330. Any one of the feature maps 325 shown in FIG. 3 may be a result of processing the feature map 450 described with reference to FIG. 4 in the first activation layer 320.

3×3×4 indicated in the second convolution layer 330 illustrates convolution processing with respect to the input feature maps 325 by using four 3×3 filter kernels. An output of the second convolution layer 330 may be input to the second activation layer 340. The second activation layer 340 may give non-linear feature(s) to input data.

Feature maps 345 output from the second convolution layer 340 may be input to a third convolution layer 350. 3×3×1 indicated in the third convolution layer 350 shown in FIG. 3 illustrates convolution processing to generate one output image by using one 3×3 filter kernel. The third convolution layer 350, which is a layer for outputting a final image, may generate one output by using one filter kernel. According to various embodiments, the third convolution layer 350 may output the third image 145 based on a convolution operation result.

DNN configuration information indicating the number of filter kernels, parameters of a filter kernel, etc., of the first convolution layer 310, the second convolution layer 330, and the third convolution layer 350 of the second DNN 300 may be provided in plural as will be described below, and a plurality of pieces of DNN configuration information of the second DNN may be joined with a plurality of pieces of DNN configuration information of the first DNN. Correlation between the plurality of pieces of DNN configuration information of the second DNN and the plurality of pieces of DNN configuration information of the first DNN may be implemented through joint training of the first DNN and the second DNN.

FIG. 3 illustrates that the second DNN 300 includes three convolution layers 310, 330, and 350 and two activation layers 320 and 340, but this illustration is merely an example and the number of convolution layers and the number of activation layers may be variously changed depending on an implementation example. In addition, according to an implementation example, the second DNN 300 may be implemented through a recurrent neural network (RNN). In this case, a convolutional neural network (CNN) structure of the second DNN 300 according to an example of the disclosure may be changed to an RNN structure.

In various embodiments, the AI upscaler 234 may include at least one arithmetic logic unit (ALU) for the above-described convolution operation and operation of the activation layer. The ALU may be implemented using a processor. For the convolution operation, the ALU may include a multiplier for performing multiplication of sample values of a feature map output from the second image 135 or a previous layer and sample values of the filter kernel and an adder for adding results of multiplication. For the operation of the convolution layer, the ALU may include a multiplier for multiplying a weight value used in a previously determined sigmoid function, Tahn function, ReLU function, etc., to an input sample value and a comparator for comparing a multiplication result with a certain value to determine whether to the input sample value to a next layer.

Hereinbelow, a method, performed by the AI upscaler 234, of performing AI upscaling with respect to the second image 135 according to an upscaling target will be described.

In various embodiments, the AI upscaler 234 may store a plurality of pieces of DNN configuration information that may be set in the second DNN.

Herein, the DNN configuration information may include information about at least one of the number of convolution layers included in the second DNN, the number of filter kernels for each convolution layer, or a parameter of each filter kernel. The plurality of pieces of DNN configuration information may correspond to various upscaling targets, respectively, and the second DNN may operate based on the DNN configuration information corresponding to a certain upscaling target. The second DNN may have different structures according to the DNN configuration information. For example, the second DNN may include three convolution layers based on certain DNN configuration information, and the second DNN may include four convolution layers according to other DNN configuration information.

In various embodiments, DNN configuration information may include a parameter of a filter kernel used in the second DNN. In this case, the structure of the second DNN may not be changed; instead, a parameter of an internal filter kernel may be changed according to the DNN configuration information.

The AI upscaler 234 may obtain DNN configuration information for AI-upscaling the second image 135 among the plurality of pieces of DNN configuration information. Each of the plurality of pieces of DNN configuration information used herein may be information for obtaining the third image 145 having a previously determined resolution and/or a previously determined quality, and may be trained jointly with the first DNN.

For example, any one of the plurality of pieces of DNN configuration information may include information for obtaining the third image 145 having a resolution that is two times greater than that of the second image 135, e.g., the third image 145 of 4K (4096*2160) that is two times greater than 2K (2048*1080) of the second image 135, and other DNN configuration information may include information for obtaining the third image 145 having a resolution that is four times greater than that of the second image 135, e.g., the third image 145 of 8K (8192*4320) that is four times greater than 2K (2048*1080) of the second image 135.

Each of the plurality of pieces of DNN configuration information has been generated in association with the DNN configuration information of the first DNN, and the AI upscaler 234 may obtain one of the plurality of pieces of DNN configuration information according to an enlargement rate corresponding to a reduction rate of the DNN configuration information of the first DNN. To this end, the AI upscaler 234 needs to identify information of the first DNN. In order for the AI upscaler 234 to identify the information of the first DNN, the AI decoding apparatus 200 according to various embodiments may receive AI data including the information of the first DNN from an AI encoding apparatus 600 (described below with reference to FIG. 7).

In other words, the AI upscaler 234 may identify target information of DNN configuration information of the first DNN used to obtain the first image 115 from the AI encoding apparatus 600, and obtain DNN configuration information of the second DNN trained jointly with the DNN configuration information of the first DNN.

When the DNN configuration information for AI-upscaling the second image 135 is obtained among the plurality of pieces of DNN configuration information, input data may be processed based on the second DNN operating according to the obtained DNN configuration information.

For example, when any one DNN configuration information pieces is obtained, the number of filter kernels included in each of the first convolution layer 310, the second convolution layer 330, and the third convolution layer 350 of the second DNN 300 shown in FIG. 3 and parameters of the filter kernel may be configured based on values included in the obtained DNN configuration information.

More specifically, parameters of a 3×3 filter kernel used in any one convolution layer of the second DNN shown in FIG. 4 may be set to $\{1, 1, 1, 1, 1, 1, 1, 1, 1\}$, and thereafter, when there is a change in the DNN configuration information, those parameters may be replaced with parameters $\{2, 2, 2, 2, 2, 2, 2, 2, 2\}$ included in the changed DNN configuration information.

The AI upscaler 234 may obtain DNN configuration information for upscaling the second image 135 among the plurality of pieces of DNN configuration information based on information included in the AI data, and the AI data used to obtain the DNN configuration information will be described in detail.

In various embodiments, the AI upscaler 234 may obtain DNN configuration information for upscaling the second image 135 among the plurality of pieces of DNN configuration information, based on difference information included in the AI data. For example, when the resolution (e.g., 4K(4096*2160)) of the original image 105 is identified as being two times greater than the resolution (e.g., 2K (2048*1080)) of the first image 115, the AI upscaler 234 may obtain the DNN configuration information which may increase the resolution of the second image 135 by two times.

In another example embodiment, the AI upscaler 234 may obtain DNN configuration information for AI-upscaling the second image 135 among the plurality of pieces of DNN configuration information, based on information related to the first image 115, included in the AI data. The AI upscaler 234 may previously determine a mapping relationship between image-related information and DNN configuration information and obtain the DNN configuration information mapped to the information related to the first image 115.

FIG. 5 is a diagram illustrating an example mapping relationship between several image-related information pieces and several DNN configuration information pieces according to various embodiments.

From an example embodiment illustrated in FIG. 5, it may be known that an AI encoding/AI decoding process of various embodiments does not consider merely a change of a resolution. As shown in FIG. 5, by separately or collectively considering a resolution such as standard definition (SD), high definition (HD), full HD, etc., a bitrate such as 10 Mbps, 15 Mbps, 20 Mbps, etc., and codec information such as AV1, H.264, HEVC, etc., selection of the DNN configuration information may be performed. For such a consideration, training considering respective elements in an AI training process may be performed jointly with encoding and decoding (see FIG. 9).

Thus, when a plurality of pieces of DNN configuration information are included based on image-related information including a codec type, a resolution of an image, etc., as shown in FIG. 5, depending on training details, the DNN configuration information for AI-upscaling the second image 135 may be obtained based on the information related to the first image 115 received in the AI decoding process.

That is, the AI upscaler 234 may use the DNN configuration information based on the image-related information by matching the image-related information in the left side of the table shown in FIG. 5 to the DNN configuration information in the right side of the table.

As shown in FIG. 5, based on identifying from the information related to the first image 115 that the resolution of the first image 115 is SD, a bitrate of image data obtained as a result of first encoding of the first image 115 is 10 Mbps, and the first image 115 undergoes first encoding with an AV1 codec, then the AI upscaler 234 may use "A" DNN configuration information among the plurality of pieces of DNN configuration information.

Based on identifying from the information related to the first image 115 that the resolution of the first image 115 is HD, the bitrate of the image data obtained as the result of first encoding is 15 Mbps, and the first image 115 undergoes first encoding with an H.264 codec, the AI upscaler 234 may use "B" DNN configuration information among the plurality of pieces of DNN configuration information.

Based on identifying from the information related to the first image 115 that the resolution of the first image 115 is full HD, the bitrate of the image data obtained as the result of first encoding is 20 Mbps, and the first image 115 undergoes first encoding with an HEVC codec, then the AI upscaler 234 may use "C" DNN configuration information among the plurality of pieces of DNN configuration information, and based on identifying from the information related to the first image 115 that the resolution of the first image 115 is full HD, the bitrate of the image data obtained as the result of first encoding is 15 Mbps, and the first image 115 undergoes first encoding with the HEVC codec, then the AI upscaler 234 may use "D" DNN configuration information among the plurality of pieces of DNN configuration information. According to whether the bitrate of the image data obtained as the result of first encoding of the first image 115 is 20 Mbps or 15 Mbps, any one of the "C" DNN configuration information and the "D" DNN configuration information may be selected. When the first image 115 of the same resolution is first-encoded with the same codec, different bitrates of image data may mean different qualities of a reconstructed image. Thus, the first DNN and the second DNN may be trained jointly based on a certain quality, such that the AI upscaler 234 may obtain DNN configuration information according to a bitrate of image data indicating a quality of the second image 135.

In another example embodiment, the AI upscaler 234 may obtain DNN configuration information for AI-upscaling the second image 135 among the plurality of pieces of DNN configuration information, based on both information provided from the first decoder 232 (prediction mode information, motion information, quantization parameter information, etc.) and the information related to the first image 115 included in the AI data. For example, the AI upscaler 234 may receive quantization parameter information used in first encoding of the first image 115 from the first decoder 232, identify a bitrate of image data obtained as a result of encoding of the first image 115 from the AI data, and obtain DNN configuration information corresponding to the quantization parameter and the bitrate. The quality of the reconstructed image may differ with the complexity of the image in spite of the same bitrate, in which the bitrate represents the first image 115 to be subject to first encoding and the quality of each frame may differ in the first image 115. Thus, by considering prediction mode information, motion information, and/or a quantization parameter which may be obtained for each frame from the first decoder 232 together, DNN configuration information that is more appropriate for the second image 135 may be obtained than using the AI data alone.

Thus, depending on an implementation example, the AI data may include an identifier of mutually agreed DNN configuration information. The identifier of the DNN configuration information may be information for identifying a pair of DNN configuration information jointly trained between the first DNN and the second DNN for AI-upscaling the second image 135 as an upscaling target corresponding to the downscaling target of the first DNN. After the AI upscaler 234 obtains the identifier of the DNN configuration information included in the AI data, the AI upscaler 234 may perform AI upscaling on the second image 135 by using the DNN configuration information corresponding to the identifier of the DNN configuration information. For example, an identifier indicating each of a plurality of pieces of DNN configuration information that may be configured in the first DNN and an identifier indicating each of a plurality of pieces of DNN configuration information that may be configured in the second DNN may be designated in advance. In this case, the same identifier may be designated for a pair of DNN configuration information that may be configured in the first DNN and the second DNN, respectively. The AI data may include the identifier of the DNN configuration information configured in the first DNN for AI-downscaling the original image 105. The AI upscaler 234 having received the AI data may perform AI upscaling on the second image 135 by using the DNN configuration information indicated by the identifier included in the AI data among the plurality of pieces of DNN configuration information.

In addition, depending on an implementation example, the AI data may include the DNN configuration information. After the AI upscaler 234 obtains the DNN configuration information included in the AI data, the AI upscaler 234 may perform AI upscaling on the second image 135 by using the corresponding DNN configuration information.

Depending on an implementation example, when information (e.g., the number of convolution layers, the number of filter kernels per convolution layer, a parameter of each filter kernel, etc.) constituting DNN configuration information is stored in the form of a lookup table, the AI upscaler 234 may obtain the DNN configuration information by combining some values selected from lookup table values based on the information included in the AI data, and perform AI upscaling on the second image 135 by using the obtained DNN configuration information.

Depending on an implementation example, when the DNN structure corresponding to the upscaling target is determined, the AI upscaler 234 may obtain DNN configuration information corresponding to the determined DNN structure, e.g., parameters of the filter kernel.

The AI upscaler 234 may obtain the DNN configuration information of the second DNN through the AI data including the information related to the first DNN and perform AI upscaling with respect to the second image 135 through the second DNN that is set with the obtained DNN configuration information, which may reduce the amount of memory use and the amount of computation when compared to upscaling based on direct analysis of the feature of the second image 135.

In various embodiments, when the second image 135 includes a plurality of frames, the AI upscaler 234 may independently obtain DNN configuration information per specific number of frames, or may obtain common DNN configuration information for all frames.

Figure 6:
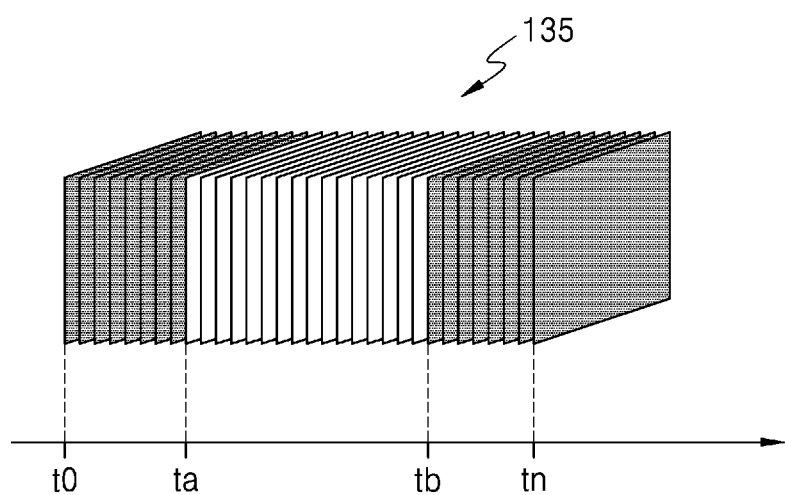
FIG. 6 is a diagram illustrating an example second image including a plurality of frames, according to various embodiments.

FIG. 6 is a diagram illustrating an example second image 135 including a plurality of frames, according to various embodiments.

As shown in FIG. 6, the second image 135 may include frames corresponding to t0 through tn.

In various embodiments, the AI upscaler 234 may obtain the DNN configuration information of the second DNN from the AI data and perform AI upscaling on frames corresponding to t0 through tn based on the obtained DNN configuration information. That is, the frames corresponding to t0 through tn may be AI-upscaled based on the common DNN configuration information.

In another example, the AI upscaler 234 may perform AI upscaling on some of the frames corresponding to t0 through tn, e.g., frames corresponding to t0 through ta, based on the 'A' DNN configuration information obtained from the AI data, and perform AI upscaling on frames corresponding to ta+1 through tb based on the 'B' DNN configuration information obtained from the AI data. The AI upscaler 234 may perform AI upscaling on frames corresponding to tb+1 through tn based on the 'C' DNN configuration information obtained from the AI data. That is, the AI upscaler 234 may separately obtain DNN configuration information for each group including a certain number of frames from among a plurality of frames and perform AI upscaling on frames included in each group based on DNN configuration information obtained separately.

In another example, the AI upscaler 234 may separately obtain DNN configuration information for each frame included in the second image 135. That is, when the second image 135 includes three frames, the AI upscaler 234 may perform AI upscaling on the first frame with DNN configuration information obtained in relation to the first frame, perform AI upscaling on the second frame with DNN configuration information obtained in relation to the second frame, and perform AI upscaling on the third frame with DNN configuration information obtained in relation to the third frame. The DNN configuration information may be separately obtained for each frame forming the second image 135 according to a scheme in which the DNN configuration information is obtained based on the information (the prediction mode information, the motion information, the quantization parameter information, etc.) provided from the first decoder 232 and the information related to the first image 115 included in the AI data. This is because the mode information, the quantization parameter information, etc., may be separately determined for each frame forming the second image 135.

In another example, the AI data may include information indicating up to which frame the DNN configuration information obtained based on the AI data is valid. For example, when the AI data includes information indicating that the DNN configuration information is valid up to the frame ta, then the AI upscaler 234 may perform AI upscaling on the frames t0 through ta with the DNN configuration information obtained based on the AI data. When other AI data includes information indicating that the DNN configuration information is valid up to the frame tn, then the AI upscaler 234 may perform AI upscaling on the frames ta+1 through tn with the DNN configuration information obtained based on the other AI data.

Hereinbelow, the AI encoding apparatus 600 for AI encoding of the original image 105 will be described with reference to FIG. 7.

Figure 7:
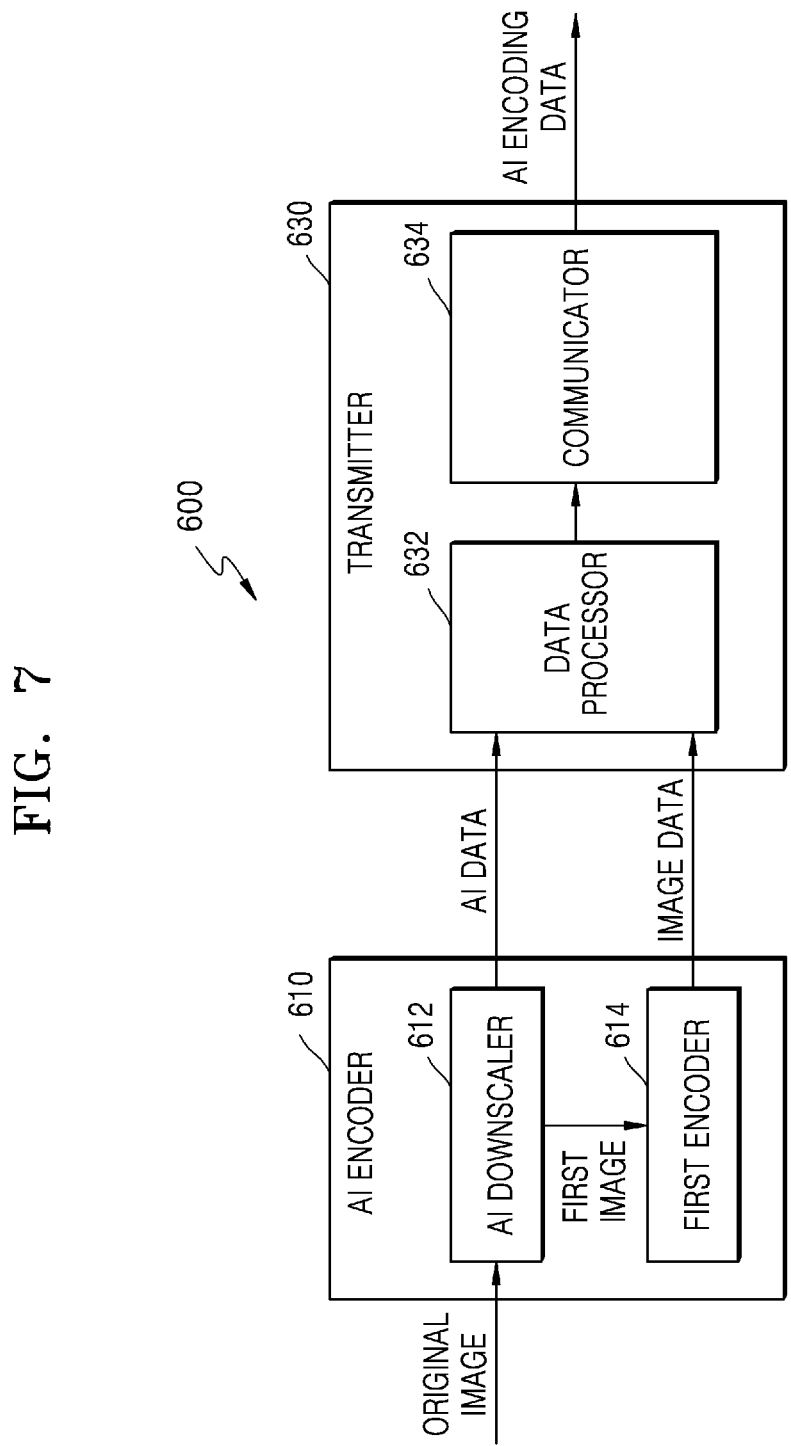
FIG. 7 is a block diagram illustrating an example AI encoding apparatus according to various embodiments.

FIG. 7 is a block diagram illustrating an example AI encoding apparatus 600 according to various embodiments.

Referring to FIG. 7, the AI encoding apparatus 600 may include an AI encoder 610 and a transmitter 630. The AI encoder 610 may include an AI downscaler 612 and a first encoder 614. The transmitter 630 may include a data processor 632 and a communicator 634.

While FIG. 7 shows the AI encoder 610 and the transmitter 630 as separate devices, the AI encoder 610 and the transmitter 630 may be implemented using one processor. In this case, the AI encoder 610 and the transmitter 630 may be implemented with a combination of dedicated processors or a combination of general-purpose processors, such as an AP, a CPU, or a GPU, and S/W. In addition, the dedicated processor may be implemented by including a memory for implementing an example embodiment or by including a memory processor for using an external memory.

In addition, the AI encoder 610 and the transmitter 630 may include a plurality of processors. In this case, the AI encoder 610 and the transmitter 630 may be implemented with a combination of dedicated processors, and may be implemented with a combination of general-purpose processors, such as an AP, a CPU, or a GPU, and S/W. The AI downscaler 612 and the first decoder 614 may be implemented using different processors.

The AI encoder 610 may perform AI downscaling on the original image 105 and first encoding on the first image 115, and transmit (output) AI data and image data to the transmitter 630. The transmitter 630 may transmit the AI data and the image data to the AI decoding apparatus 200.

The image data may include data obtained as a result of first encoding of the first image 115. The image data may include data obtained based on pixel values in the first image 115, e.g., residual data that is a difference between the first image 115 and predicted data of the first image 115. The image data may include information used in first encoding of the first image 115. For example, the image data may include prediction mode information used in first encoding of the first image 115, motion information, quantization parameter information used in first encoding of the first image 115, etc.

The AI data may include information that allows the AI upscaler 234 to perform AI upscaling on the second image 135 that is an upscaling target corresponding to a downscaling target of the first DNN. In an example, the AI data may include difference information between the original image 105 and the first image 115. The AI data may include the information related to the first image 115. The information related to the first image 115 may include information about at least one of a resolution of the first image 115, a bitrate of image data obtained as a result of first encoding of the first image 115, or a codec type used in first encoding of the first image 115.

In various embodiments, the AI data may include an identifier of mutually agreed DNN configuration information to perform AI upscaling on the second image 135 that is an upscaling target corresponding to the downscaling target of the first DNN.

In addition, in various embodiments, the AI data may include the DNN configuration information that may be set in the second DNN.

The AI downscaler 612 may obtain the first image 115 that is AI-downscaled from the original image 105 through the first DNN. The AI downscaler 612 may determine the downscaling target of the original image 105 based on a previously determined criterion (or criteria).

To obtain the first image 115, the AI upscaler 612 may store a plurality of pieces of DNN configuration information that may be set in the second DNN. The AI downscaler 612 may obtain DNN configuration information corresponding to the downscaling target among the plurality of pieces of DNN configuration information and perform AI downscaling on the original image 105 through the first DNN that is set with the obtained DNN configuration information.

Each of the plurality of pieces of DNN configuration information may be information trained to obtain the first image 115 of a previously determined resolution and/or a previously determined quality. For example, any one of the plurality of pieces of DNN configuration information may include information for obtaining the first image 115 having a resolution that is ½ times less than that of the original image 105, e.g., the first image 115 of 2K (2048*1080) that is ½ times less than 4K (4096*2160) of the original image 105, and other DNN configuration information may include information for obtaining the first image 115 having a resolution that is ¼ times less than that of the original image 105, e.g., the first image 115 of 2K (2048*1080) that is ¼ times less than 8K (8192*4320) of the original image 105.

Depending on an implementation example, when information (e.g., the number of convolution layers, the number of filter kernels per convolution layer, a parameter of each filter kernel, etc.) constituting DNN configuration information is stored in the form of a lookup table, the AI downscaler 612 may obtain the DNN configuration information by combining some selected values from lookup table values based on downscaling target, and perform AI downscaling on the original image 105 using the obtained DNN configuration information.

Depending on an implementation example, the AI downscaler 612 may determine the DNN structure corresponding to the downscaling target and obtain DNN configuration information corresponding to the determined DNN structure, e.g., parameters of the filter kernel.

The plurality of pieces of DNN configuration information for AI-downscaling the original image 105 may have an optimized value based on joint training between the first DNN and the second DNN. Here, each DNN configuration information piece may include, for example, at least one of the number of convolution layers included in the first DNN, the number of filter kernels for each convolution layer, or a parameter of each filter kernel.

The AI downscaler 612 may set the first DNN with the DNN configuration information determined for AI-downscaling the original image 105 to obtain the first image 115 of the previously determined resolution and/or the previously determined quality through the first DNN. When the DNN configuration information for AI-downscaling the original image 105 is obtained among the plurality of pieces of DNN configuration information, each layer in the first DNN may process input data based on information included in the DNN configuration information.

Hereinbelow, a method, performed by the AI downscaler 612, of determining a downscaling target will be described. The downscaling target may indicate by how much the resolution of the first image 115 is reduced from the resolution of the original image 105.

In various embodiments, the AI downscaler 612 may determine a downscaling target based on at least one of a compression rate (e.g., a resolution difference between the original image 105 and the first image 115, a target bitrate), a compression quality (e.g., a bitrate type), compression history information, or a type of the original image 105.

In an example, the AI downscaler 612 may determine a downscaling target based on a preset or user-input compression rate or compression quality.

In another example, the AI downscaler 612 may determine a downscaling target by using compression history information stored in the AI encoding apparatus 600. For example, according to the compression history information available to the AI encoding apparatus 600, a user-preferred encoding quality or compression rate may be determined, and a downscaling target may be determined according to an encoding quality determined based on the compression history information. For example, the resolution, the quality, etc., of the first image 115 may be determined according to an encoding quality that is most frequently used based on the compression history information.

In another example, the AI downscaler 612 may determine a downscaling target based on the encoding quality that is more frequently used than the previously determined threshold value (e.g., an average of encoding qualities more frequently used than a previously determined threshold value) according to the compression history information.

In another example, the AI downscaler 612 may determine the downscaling target based on the resolution, the type (e.g., a format of a file), etc., of the original image 105.

In various embodiments, when the original image 105 includes a plurality of frames, the AI downscaler 612 may separately determine a downscaling target per specific number of frames, or may determine a common downscaling target for all frames.

In an example, the AI downscaler 612 may divide frames forming the original image 105 into a specific number of groups and separately determine a downscaling target for each group. For each group, the same downscaling target or different downscaling targets may be determined. The number of frames included in groups may be identical or different over the groups.

In another example, the AI downscaler 612 may separately determine the downscaling target for each of the frames constituting the original image 105. For each frame, the same downscaling target or different downscaling targets may be determined.

Hereinbelow, an example structure of a first DNN 700 based on AI downscaling will be described.

Figure 8:
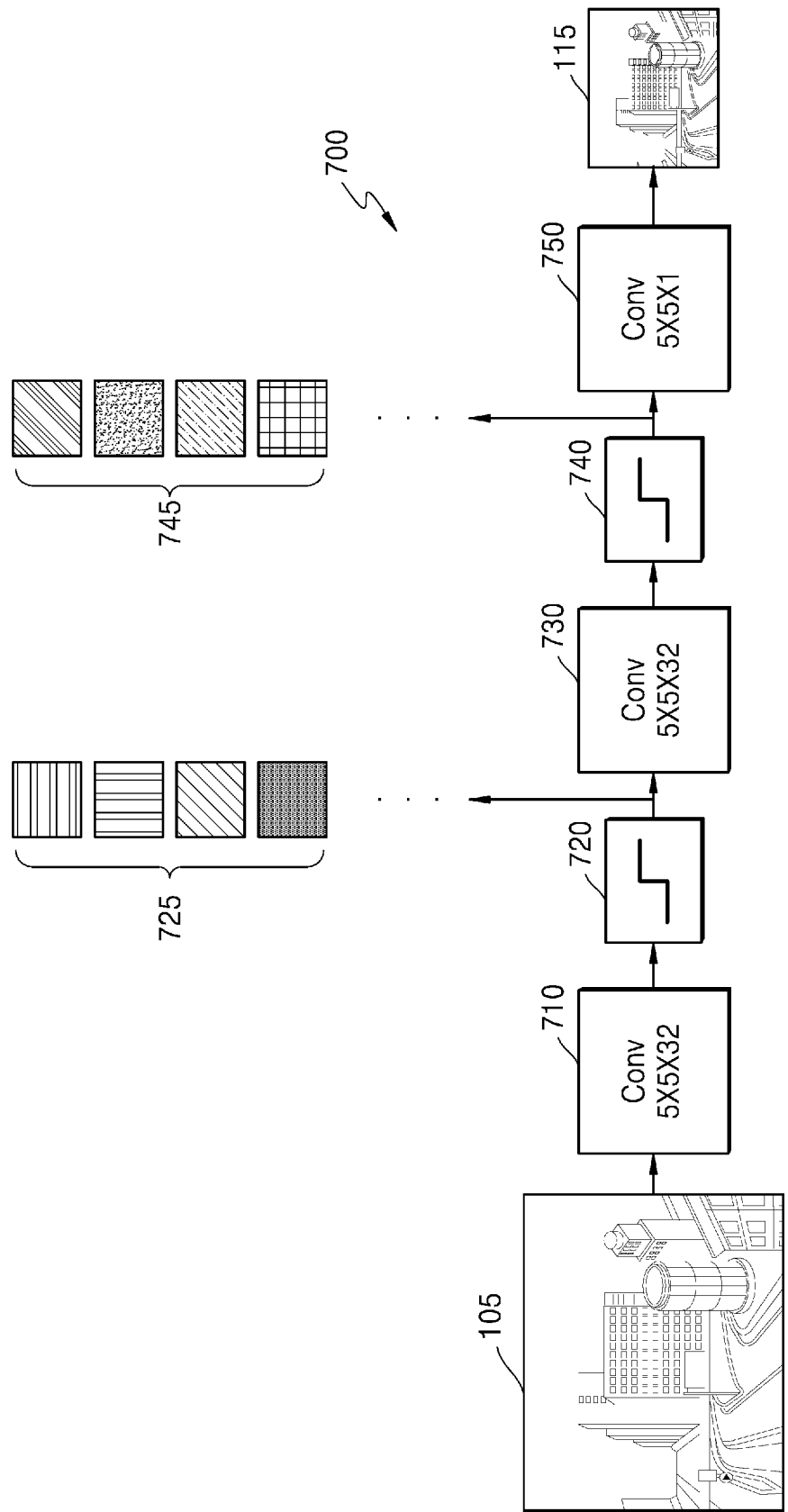
FIG. 8 is a diagram illustrating an example first DNN for AI-downscaling an original image according to various embodiments.

FIG. 8 is a diagram illustrating an example first DNN 700 for AI-downscaling the original image 105 according to various embodiments.

As shown in FIG. 8, the original image 105 may be input to a first convolution layer 710. The first convolution layer 710 may perform convolution processing on the original image 105 by using 32 5×5 filter kernels. 32 feature maps generated as a result of the convolution processing may be input to a first activation layer 720. The first activation layer 720 may apply a non-linear feature(s) to the 32 feature maps.

The first activation layer 720 may determine whether to transmit sample values of feature maps output from the first convolution layer 710 to a second convolution layer 730. For example, among the sample values of the feature maps, some sample values may be activated by the first activation layer 720 and transmitted to the second convolution layer 730 and some other sample values may be deactivated by the first activation layer 720 and thus not transmitted to the second convolution layer 730. Information indicated by feature maps output from the first convolution layer 710 may be emphasized by the first activation layer 720.

An output 725 of the first activation layer 720 may be input to the second convolution layer 730. The second convolution layer 730 may perform convolution processing on the input data by using 32 5×5 filter kernels. The 32 feature maps output as a result of the convolution processing may be input to the second activation layer 740, and the second activation layer 740 may apply the non-linear feature (s) to the 32 feature maps.

An output 745 of the second activation layer 740 may be input to a third convolution layer 750. The third convolution layer 750 may perform convolution processing on the input data by using one 5×5 filter kernel. As a result of the convolution processing, one image may be output from the third convolution layer 750. The third convolution layer 750, which is a layer for outputting a final image, may obtain one output by using one filter kernel. According to various embodiments, the third convolution layer 750 may output the first image 115 based on a convolution operation result.

DNN configuration information indicating the number of filter kernels, parameters of a filter kernel, etc., of the first convolution layer 710, the second convolution layer 730, and the third convolution layer 750 of the first DNN 700 may be provided in plural, and the plurality of pieces of DNN configuration information of the first DNN may be joined with a plurality of pieces of DNN configuration information of the second DNN. Joining of the plurality of pieces of DNN configuration information of the first DNN and the plurality of pieces of DNN configuration information of the second DNN may be implemented, for example, through joint training of the first DNN and the second DNN.

FIG. 8 illustrates that the first DNN 700 includes three convolution layers 710, 730, and 750 and two activation layers 720 and 740, but this illustration is merely an example and the number of convolution layers and the number of activation layers may be variously changed depending on an implementation example. In addition, according to an implementation example, the first DNN 700 may be implemented through an RNN. In this case, it may mean that a CNN structure of the first DNN 700 according to an example of the disclosure is changed to an RNN structure.

In various embodiments, the AI downscaler 612 may include at least one ALU for the above-described convolution operation(s) and operation(s) of the activation layer. The ALU may be implemented using by a processor. For the convolution operation, the ALU may include a multiplier for performing multiplication of sample values of a feature map output from the original image 105 or a previous layer and sample values of the filter kernel, and an adder for adding results of the multiplication. For the operation of the activation layer, the ALU may include a multiplier for multiplying a weight value used in a previously determined sigmoid function, Tahn function, ReLU function, etc., by an input sample value and a comparator for comparing a multiplication result with a certain value so as to determine whether to transmit the input sample value to a next layer.

Referring back to FIG. 7, the first encoder 614 having received the first image 115 from the AI downscaler 612 may reduce the amount of information of the first image 115 by performing first encoding on the first image 115. As a result of the first encoding performed by the first encoder 614, image data corresponding to the first image 115 may be obtained.

The data processor 632 may process AI data and image data such that at least one of the AI data or the image data may be transmitted in a certain form. For example, when the AI data and the image data need to be transmitted in the form of a bitstream, the data processor 632 may process the AI data to express the AI data in the form of a bitstream and may transmit the AI data and the image data in the form of one bitstream through the communicator (including communication circuitry) 634. In another example, the data processor 632 may process the AI data to express the AI data in the form of a bitstream and may transmit the bitstream corresponding to the AI data and a bitstream corresponding to the image data through the communicator 634, respectively. In another example, the data processor 632 may process the AI data to express the AI data in the form of a frame or a packet, and may transmit the image data in the form of a bitstream and the AI data in the form of the frame or the packet through the communicator 634.

The communicator 634 may transmit AI encoding data obtained as a result of AI encoding over a network. The AI encoding data obtained as the result of AI encoding may include the image data and the AI data. The image data and the AI data may be transmitted through a homogeneous network or a heterogeneous network.

In various embodiments, the AI encoding data obtained as a processing result of the data processor 632 may be stored in a data storage medium including magnetic media such as hard disk, floppy disk, and magnetic tape, optical media such as CD-ROM and DVD, magneto-optical media such as floptical disk, etc.

Hereinbelow, a method of jointly training the first DNN 700 and the second DNN 300 will be described with reference to FIG. 9.

Figure 9:
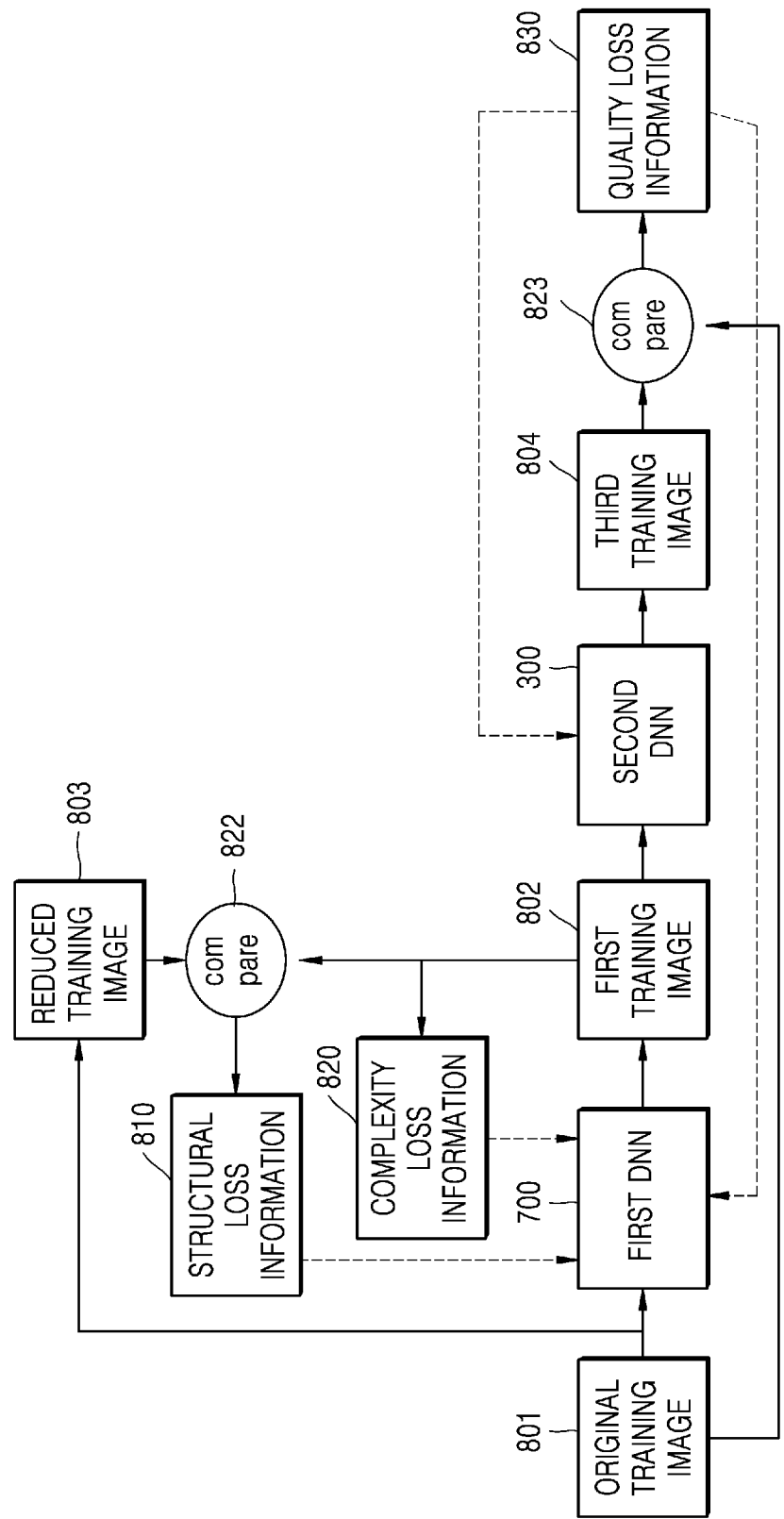
FIG. 9 is a diagram illustrating an example method of training a first DNN and a second DNN according to various embodiments.

FIG. 9 is a diagram illustrating an example method of training the first DNN 700 and the second DNN 300 according to various embodiments.

In various embodiments, the original image 105 having undergone AI encoding through the AI encoding process may be reconstructed to the third image 145 through the AI decoding process. To maintain similarity between the third image 145 obtained as a result of AI decoding and the original image 105, association between the AI encoding process and the AI decoding process is required. That is, information lost in the AI encoding has to be reconstructed in the AI decoding process, and to this end, joint training between the first DNN 700 and the second DNN 300 may be used.

For accurate AI decoding, quality loss information 830 corresponding to a result of comparison between a third training image 804 and an original training image 801 shown in FIG. 9 needs to be ultimately reduced. Thus, the quality loss information 830 may be used in training of both the first DNN 700 and the second DNN 300.

First, a training process shown in FIG. 9 will be described.

In FIG. 9, an original training image 801 may be an image that is an AI downscaling target, and a first training image 802 may be an image that is AI-downscaled from the original training image 801. In addition, a third training image 804 may be an image that is AI-upscaled from the first training image 802.

The original training image 801 may include a still image, or a moving image including a plurality of frames. In various embodiments, the original training image 801 may include a luminance image extracted from the still image or the moving image including the plurality of frames. In addition, in various embodiments, the original training image 801 may include a patch image extracted from the still image or the moving image including the plurality of frames. When the original training image 801 includes a plurality of frames, the first training image 802, the second training image (discussed below), and the third training image 804 may also include a plurality of frames. When the plurality of frames of the original training image 801 are sequentially input to the first DNN 700, the plurality of frames of the first training image 802, the second training image (discussed below), and the third training image 804 may be sequentially obtained through the first DNN 700 and the second DNN 300.

For joint training between the first DNN 700 and the second DNN 300, the original training image 801 may be input to the first DNN 700. The original training image 801 input to the first DNN 700 may be AI-downscaled and output as the first training image 802 which may be input to the second DNN 300. As a result of AI-upscaling the first training image 802, the third training image 804 may be output.

Referring to FIG. 9, the first training image 802 is input to the second DNN 300, but depending on an implementation example, a second training image (not shown in FIG. 9) obtained through first encoding and first decoding of the first training image 802 may be input to the second DNN 300. To input the second training image for input to the second DNN, any one codec of MPEG-2, H.264, MPEG-4, HEVC, VC-1, VP8, VP9, or AV1 may be used. More specifically, for first encoding of the first training image 802 and first decoding of image data corresponding to the first training image 802, any one codec of MPEG-2, H.264, MPEG-4, HEVC, VC-1, VP8, VP9, or AV1 may be used.

Referring to FIG. 9, separately from output of the first training image 802 through the first DNN 700, a reduced training image 803 that is legacy-downscaled from the original training image 801 may be obtained. Herein, legacy downscaling may include at least one of bilinear scaling, bicubic scaling, lanczos scaling, or stair step scaling.

To prevent a structural feature of the first image 115 from largely deviating from a structural feature of the original image 105, a reduced training image 803 preserving the structural feature of the original training image 801 may be obtained.

Prior to execution of training, the first DNN 700 and the second DNN 300 may be set with previously determined DNN configuration information. As training progresses, structural loss information 810, complexity loss information 820, and quality loss information 830 may be determined.

The structural loss information 810 may be determined based on a result of comparison 822 between the reduced training image 802 and the first training image 802. In an example, the structural loss information 810 may correspond to a difference between structural information of the reduced training image 803 and structural information of the first training image 802. The structural information may include various features, such as a luminance, a contrast, a histogram, etc., of an image, which may be extracted from the image. The structural loss information 810 may indicate to which extent the structural information of the original training image 801 is maintained in the first training image 802. As the size of the structural loss information 810 decreases, the structural information of the first training image 802 becomes more similar with the structural information of the original training image 801.

The complexity loss information 820 may be determined based on a spatial complexity of the first training image 802. In an example, a total variance of the first training image 802 may be used as the spatial complexity. The complexity loss information 820 may be related to a bitrate of the image data obtained through first encoding of the first training image 802. As the size of the complexity loss information 820 decreases, the bitrate of the image data is defined as being low.

The quality loss information 830 may be determined based on a result of comparison 823 between the original training image 801 and the third training image 804. The quality loss information 830 may include at least one of L1-norm and L2-norm regarding a difference between the original training image 801 and the third training image 804, structural similarity (SSIM), peak signal-to-noise (PSNR)-human vision system (HVS), multiscale (MS)-SSIM, a variance inflation factor (VIF), or a video multimethod assessment fusion (VMAF) value. The quality loss information 830 may indicate to which extent the third training image 804 is similar with the original training image 801. As the size of the quality loss information 830 decreases, the third training image 804 may become more similar with the original training image 801.

Referring to FIG. 9, the structural loss information 810, the complexity loss information 820, and the quality loss information 830 may be used in training of the first DNN 700, and the quality loss information 830 may be used in training of the second DNN 300. That is, the quality loss information 830 may be used in training of both the first DNN 700 and the second DNN 300.

The first DNN 700 may update a parameter to reduce or minimize final loss information determined based on the structural loss information 810, the complexity loss information 820, and the quality loss information 830. The second DNN 300 may update a parameter to reduce or minimize the quality loss information 830.

The final loss information for training the first DNN 700 and the second DNN 300 may be determined as shown in Equation 1.

$$\text{Loss}DS = a*\text{structural loss information} + b*\text{complexity loss information} + c*\text{quality loss information}$$

$$\text{Loss}US = d*\text{quality loss information} \quad \text{[Equation 1]}$$

In Equation 1, LossDS may indicate final loss information to be reduced or minimized for training of the first DNN 700, and LossUS may indicate final loss information to be reduced or minimized for training of the second DNN 300. a, b, c, and d may be previously determined weight values.

That is, the first DNN 700 may update parameters in a direction to reduce LossDS of Equation 1, and the second DNN 300 may update parameters in a direction to reduce LossUS. As the parameters of the first DNN 700 are updated based on LossDS derived in a training process, the first training image 802 obtained based on the updated parameters may become different from the first training image 802 of a previous training process, such that the third training image 804 becomes different from the third training image 804 of the previous training process. When the third training image 804 becomes different from the third training image 804 of the previous training process, the quality loss information 830 may be newly determined, such that the second DNN 300 may update the parameters. When the quality loss information 830 is newly determined, LossDS may also be newly determined, such that the first DNN 700 may update the parameters based on newly determined LossDS. That is, parameter updating of the first DNN 700 may cause parameter updating of the second DNN 300, and parameter updating of the second DNN 300 may cause parameter updating of the first DNN 700. In other words, the first DNN 700 and the second DNN 300 are jointly trained through sharing of the quality loss information 830, such that the parameters of the first DNN 700 and the parameters of the second DNN 300 may be optimized with connection to each other.

Referring to Equation 1, it may be seen that LossUS is determined according to the quality loss information 830, but this is merely an example, such that LossUS may also be determined based on at least one of the structural loss information 810 or the complexity loss information 820 and the quality loss information 830.

While it is described above that the AI upscaler 234 of the AI decoding apparatus 200 and the AI downscaler 612 of the AI encoding apparatus 600 store a plurality of pieces of DNN configuration information, a method of training each of the plurality of pieces of DNN configuration information stored in the AI upscaler 234 and the AI downscaler 612 will be described.

As described with reference to Equation 1, the first DNN 700 may update a parameter based on a similarity level (the structural loss information 810) between the structural information of the first training image 802 and the structural information of the original training image 801, a bitrate (the complexity loss information 820) of the image data obtained as a result of first encoding of the first training image 802, and a difference (the quality loss information 830) between the third training image 804 and the original training image 801.

More specifically, the parameter of the first DNN 700 may be updated such that the first training image 802 having structural information that is similar with that of the original training image 801 and a low bitrate of the image data obtained as a result of first encoding may be obtained and at the same time, the second DNN 300 for AI upscaling of the first training image 802 may obtain the third training image 804 that is similar with the original training image 801.

As the weight values a, b, and c of Equation 1 are adjusted, directions to optimize the parameters of the first DNN 700 may become different. For example, when the weight value b is determined to be high, the parameter of the first DNN 700 may be updated by giving higher importance to decreasing the bitrate than the quality of the third training image 804. In addition, when the weight value c is determined to be high, the bitrate may increase, but the parameter of the first DNN 700 may be updated by giving higher importance to increasing the quality of the third training image 804 than maintaining the structural information of the original training image 801.

A direction to optimize the parameters of the first DNN 700 may become different according to a type of a codec used in first decoding of the first training image 802. This is because the second training image to be input to the second DNN 300 may differ with a type of a codec.

That is, based on the weight values a, b, c, and the type of the codec for first encoding of the first training image 802, the parameters of the first DNN 700 and the parameters of the second DNN 300 may be updated jointly. Thus, when each of the weight values a, b, and c is determined to be a certain value, the type of the codec is determined to be a certain type, and then the first DNN 700 and the second DNN 300 are trained, then the parameters of the first DNN 700 and the parameters of the second DNN 300 which are optimized jointly with each other may be determined.

When the first DNN 700 and the second DNN 300 are trained after the weight values a, b, and c and the type of the codec are changed, then the parameters of the first DNN 700 and the parameters of the second DNN 300 which are optimized jointly with each other may be determined. In other words, when the first DNN 700 and the second DNN 300 are trained while changing the weight values a, b, and c and the type of the codec, then the plurality of pieces of DNN configuration information trained jointly with each other may be determined in the first DNN 700 and the second DNN 300.

As described with reference to FIG. 5, the plurality of pieces of DNN configuration information of the first DNN 700 and the second DNN 300 may be mapped to first image-related information pieces. To set such a mapping relationship, the first training image 802 output from the first DNN 700 may be first-encoded with a certain codec according to a specific bitrate, and the second training image obtained by performing first decoding on a bitstream may be input to the second DNN 300. That is, after an environment is set to perform first encoding on the first training image 802 of a specific resolution with a certain codec according to a specific bitrate, the first DNN 700 and the second DNN 300 may be trained, thereby determining a pair of DNN configuration information pieces mapped to a resolution of the first training image 802, a type of a codec used in first encoding of the first training image 802, and a bitrate of a bitstream obtained as a result of first encoding of the first training image 802. By variously changing the resolution of the first training image 802, the type of the codec used in first encoding of the first training image 802, and the bitrate of the bitstream obtained as a result of first encoding of the first training image 802, a mapping relationship may be determined between the plurality of pieces of DNN configuration information of the first DNN 700 and the second DNN 300 and the first image-related information pieces.

Figure 10:
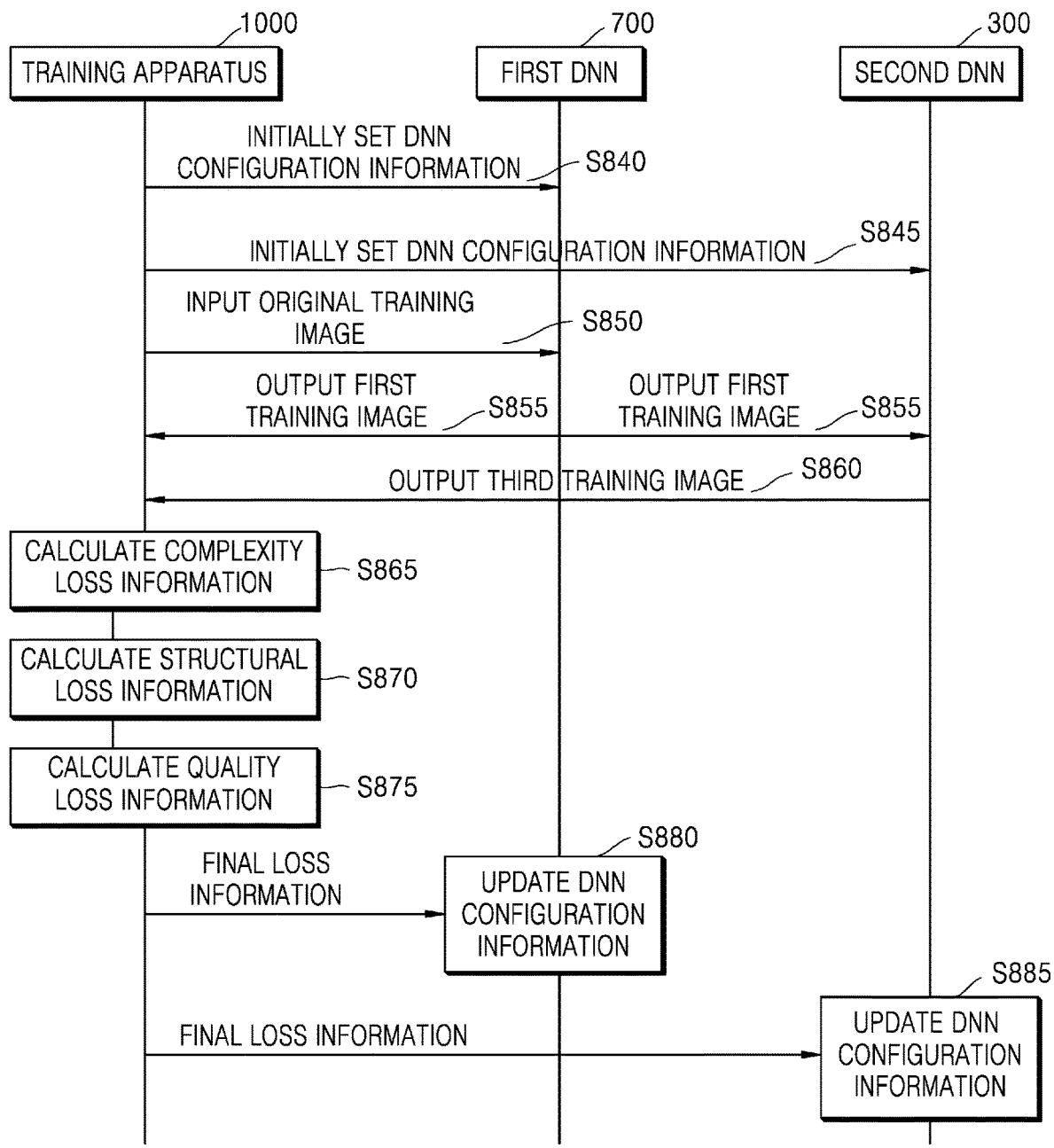
FIG. 10 is a diagram illustrating an example process, performed by a training apparatus, of training a first DNN and a second DNN according to various embodiments.

FIG. 10 is a diagram for illustrating an example process, performed by a training apparatus 1000, of training the first DNN 700 and the second DNN 300 according to various embodiments.

Training of the first DNN 700 and the second DNN 300 described with reference to FIG. 9 may be performed by the training apparatus 1000. The training apparatus 1000 may include the first DNN 700 and the second DNN 300. The training apparatus 1000 may be, for example, the AI encoding apparatus 600 or a separate server. DNN configuration information pieces of the second DNN 300 obtained as a result of training may be stored in the AI decoding apparatus 200.

Referring to FIG. 10, the training apparatus 1000 initially sets DNN configuration information of the first DNN 700 and the second DNN 300, in operations S840 and S845. Thus, the first DNN 700 and the second DNN 300 may operate based on previously determined DNN configuration information. The DNN configuration information may, for example, include information about at least one of the number of convolution layers included in the first DNN 700 and the second DNN 300, the number of filter kernels for each convolution layer, the size of a filter kernel per convolution layer, or a parameter of each filter kernel.

The training apparatus 1000 may input the original training image 801 to the first DNN 700 in operation S850. The original training image 801 may include at least one frame forming a still image or a moving image.

The first DNN 700 may process the original training image 801 according to the initially set DNN configuration information and output the first training image 802 that is AI-downscaled from the original training image 801, in operation S855. While FIG. 10 shows that the first training image 802 output from the first DNN 700 is directly input to the second DNN 300, the first training image 802 output from the first DNN 700 may be input to the second DNN 300 by the training apparatus 1000. For example, the training apparatus 1000 may perform first encoding and first decoding on the first training image 802 according to a certain codec, and then input the second training image to the second DNN 300.

The second DNN 300 may process the first training image 802 (or the second training image) according to the initially set DNN configuration information, and output the third training image 804 that is AI-upscaled from the second training image in operation S860.

The training apparatus 1000 may calculate the complexity loss information 820 based on the first training image 802, in operation S865.

The training apparatus 1000 may calculate the structural loss information 810 by comparing the reduced training image 803 with the first training image 802, in operation S870.

The training apparatus 1000 may calculate the quality loss information 830 by comparing the original training image 801 with the third training image 804, in operation S875.

The first DNN 700 may update the initially set DNN configuration information through a back-propagation process based on the final loss information, in operation S880. The training apparatus 1000 may calculate final loss information for training the first DNN 700 based on the complexity loss information 820, the structural loss information 810, and the quality loss information 830.

The second DNN 300 may update the initially set DNN configuration information through a back-propagation process based on the quality loss information or the final loss information, in operation S885. The training apparatus 1000 may calculate final loss information for training the second DNN 300 based on the quality loss information 830.

Thereafter, the training apparatus 1000, the first DNN 700, and the second DNN 300 may update DNN configuration information by repeating operations S850 through S885 until final loss information is minimized. In this case, in each repeated process, the first DNN 700 and the second DNN may operate according to the DNN configuration information updated in a previous process.

Table 1 provided below illustrates effects when the original image 105 is AI-encoded and AI-decoded according to an example embodiment and when the original image 105 is encoded and decoded according to HEVC.

embodiments, the transformation-based encoder 1126 may correspond to the first encoder 614 of FIG. 7, and the AI downscaler 1124 may correspond to the AI downscaler 612 of FIG. 7.

The apparatus 40 may receive the AI data 30 and the image data 25 and obtain the third image 145 by using a transformation-based decoder 1146 and an AI upscaler 1144. In various embodiments, the transformation-based encoder 1146 may correspond to the first decoder 232 of FIG. 2, and the AI upscaler 1144 may correspond to the AI upscaler 234 of FIG. 2.

In various embodiments, the apparatus 20 may include a CPU, a memory, and a computer program including instructions. The computer program may be stored in the memory. In an example embodiment, according to execution of the computer program by the CPU, the apparatus 20 may execute functions to be described with reference to FIG. 11. In an example embodiment, the functions to be described with reference to FIG. 11 are executed by dedicated hardware chip and/or the CPU.

In various embodiments, the apparatus 40 may include a CPU, a memory, and a computer program including instructions. The computer program may be stored in the memory. In an example embodiment, according to execution of the computer program by the CPU, the apparatus 40 may execute functions to be described with reference to FIG. 11. In an example embodiment, the functions to be described with reference to FIG. 11 are executed by dedicated hardware chip and/or the CPU.

Figure 11:
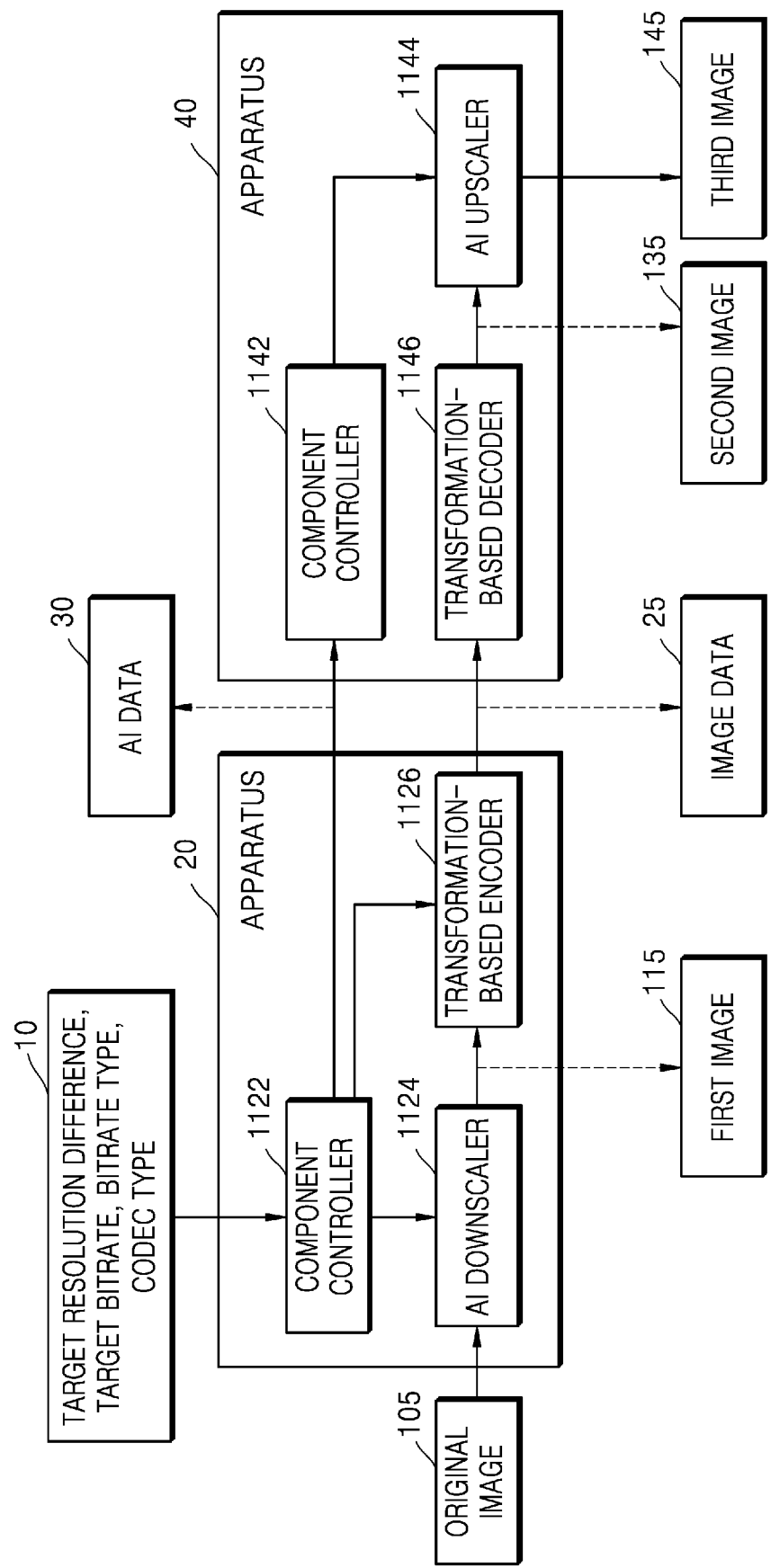
FIG. 11 is a diagram illustrating an example apparatus for AI-downscaling an original image and an example apparatus for AI-upscaling a second image according to various embodiments.

In FIG. 11, a component controller 1122 may receive one or more input values 10. In various embodiments, the one or more input values 10 may include at least one of a target resolution difference for the AI downscaler 1124 and the AI upscaler 1144, a bitrate of the image data 25, a bitrate type of the image data 25 (e.g., a variable bitrate type, a constant bitrate type, an average bitrate, etc.), or a codec type for the

TABLE 1

| Contents | Resolution | Frame Number | Amount of Information (Bitrate) (Mbps) | | Subjective Quality Score (VMAF) | |
| --- | --- | --- | --- | --- | --- | --- |
| | | | HEVC | AI Encoding/ AI Decoding | HEVC | AI Encoding/ AI Decoding |
| Contents_01 | 8K | 300 Frames | 46.3 | 21.4 | 94.80 | 93.54 |
| Contents_02 | (7680 × 4320) | | 46.3 | 21.6 | 98.05 | 98.98 |
| Contents_03 | | | 46.3 | 22.7 | 96.08 | 96.00 |
| Contents_04 | | | 46.1 | 22.1 | 86.26 | 92.00 |
| Contents_05 | | | 45.4 | 22.7 | 93.42 | 92.98 |
| Contents_06 | | | 46.3 | 23.0 | 95.99 | 95.61 |
| | | Average | 46.11 | 22.25 | 94.10 | 94.85 |

As can be seen from Table 1, although the subjective quality of contents including 300 frames of a resolution of 8K, which have been AI-encoded and AI-decoded according to an example embodiment of the disclosure, is higher than that of contents which have been encoded and decoded according to HEVC, the bitrate is reduced by 50% or more.

FIG. 11 is a diagram illustrating an example apparatus 20 for AI-downscaling the original image 105 and an example apparatus 40 for AI-upscaling the second image 135 according to various embodiments.

The apparatus 20 may receive the original image 105 and provide image data 25 and AI data 30 to the apparatus 40 by using an AI downscaler 1124 and a transformation-based encoder 1126. In various embodiments, the image data 25 may correspond to the image data of FIG. 1 and the AI data 30 may correspond to the AI data of FIG. 1. In various transformation-based encoder 1126. The one or more input values 10 may include a previously stored or user-input value.

The component controller 1122 may control operations of the AI downscaler 1124 and the transformation-based encoder 1126 based on the received input values 10. In various embodiments, the component controller 1122 may obtain DNN configuration information for the AI downscaler 1124 according to the received input values 10 and set the AI downscaler 1124 with the obtained DNN configuration information. In various embodiments, the component controller 1122 may transmit the received input values 10 to the AI downscaler 1124 which may then obtain DNN configuration information for AI downscaling of the original image 105 based on the received input values 10. In various embodiments, the component controller 1122 may provide, together with the input values 10, additional information, e.g., information of a color format applied to AI downscaling (a luminance component, a chrominance component, a red component, a green component, a blue component, etc.), tone mapping information of a high dynamic range (HDR), etc., to the AI downscaler 1124, which may then obtain the DNN configuration information based on the input values 10 and the additional information. In various embodiments, the component controller 1122 may transmit at least some of the received input values 10 to the transformation-based encoder 1126 which may perform first encoding on the first image 115 according to a bitrate of a specific value, a bitrate of a specific type, and a specific codec.

The AI downscaler 1124 may receive the original image 105 and perform an operation described with reference to at least one of FIG. 1, 7, 8, 9, or 10 to obtain the first image 115.

In various embodiments, the AI data 30 may be provided to the apparatus 40. The AI data 30 may include at least one of resolution difference information between the original image 105 and the first image 115 or information related to the first image 115. The resolution difference information may be determined based on a target resolution difference of the input value 10, and the information related to the first image 115 may be determined based on at least one of a target bitrate, a bitrate type, or a codec type. In various embodiments, the AI data 30 may include parameters used for an AI upscaling process. The AI data 30 may be provided from the AI upscaler 1124 to the apparatus 40.

The first image 105 may be processed by the transformation-based encoder 1126 to obtain the image data 25 which may be transmitted to the apparatus 40. The transformation-based encoder 1126 may process the first image 115 according to MPEG-2, H.264 AVC, MPEG-4, HEVC, VC-1, VP8, VP9, or AV1.

The component controller 1142 may control operations of the AI upscaler 1144 based on the AI data 30. In various embodiments, the component controller 1142 may obtain DNN configuration information for the AI upscaler 1144 according to the received AI data 30 and set the AI upscaler 1144 with the obtained DNN configuration information. In various embodiments, the component controller 1142 may transmit the received AI data 30 to the AI upscaler 1144 which may then obtain DNN configuration information for AI upscaling of the second image 135 based on the received AI data 30. In various embodiments, the component controller 1142 may obtain the DNN configuration information by considering, together with the AI data 30, additional information, e.g., information of a color format applied to AI upscaling (a luminance component, a chrominance component, a red component, a green component, a blue component, etc.), tone mapping information of an HDR, etc., to the AI upscaler 1144, which may then obtain the DNN configuration information based on the AI data 30 and the additional information. In various embodiments, the AI upscaler 1144 may receive the AI data 30 from the component controller 1142, receive at least one of prediction mode information, motion information, or quantization parameter information from the transformation-based decoder 1146, and obtain the DNN configuration information based on the at least one of the prediction mode information, the motion information, or the quantization parameter information and the AI data 30.

The transformation-based decoder 1146 may reconstruct the second image 135 by processing the image data 25. The transformation-based encoder 1146 may process the image data 25 according to MPEG-2, H.264 AVC, MPEG-4, HEVC, VC-1, VP8, VP9, or AV1.

The AI upscaler 1144 may perform AI upscaling on the second image 135 provided from the transformation-based decoder 1146 based on the set DNN configuration information to obtain the third image 145.

Figure 12:
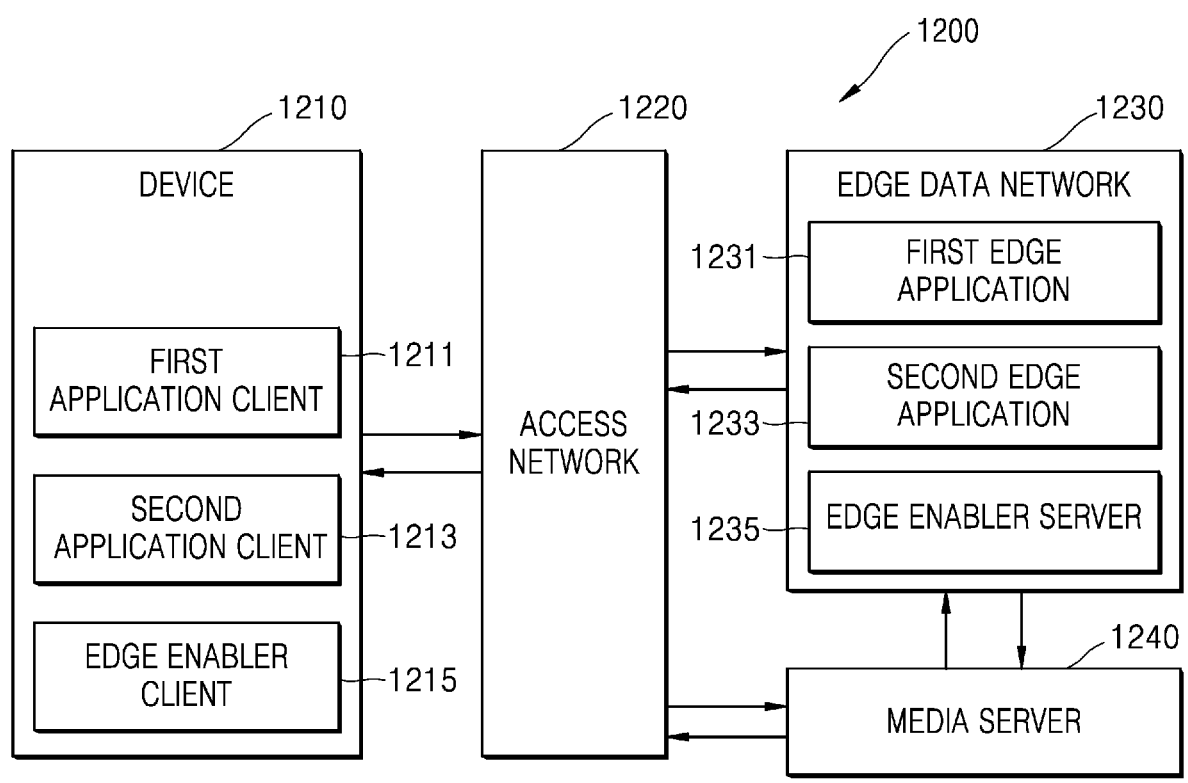
FIG. 12 is a diagram illustrating an example multi-access edge computing (MEC) technique in a network environment, according to various embodiments.

FIG. 12 is a diagram for illustrating an example multi-access edge computing (MEC) technique in a network environment, according to various embodiments.

Referring to FIG. 12, a network environment 1200 according to the disclosure may include a device 1210, an access network (AN) 1220, an edge data network 1230, and a media server 1240. Although not shown in FIG. 12, the example network environment 1200 according to the disclosure may include an edge data network configuration server.

That is, the network environment 1200 according to the disclosure may, for example, refer to a state including a plurality of elements for supporting an MEC based service. However, components included in the network environment 1200 are not limited to the particular configuration illustrated in FIG. 12.

According to various embodiments, each of the components included in the network environment 1200 may refer, for example, to a physical entity unit or a software or module unit capable of executing a separate function.

According to various embodiments, the device 1210 may, for example, refer to a device used by a user. For example, the device 1210 may refer to a terminal, a user equipment (UE), a mobile station, a subscriber station, a remote terminal, a wireless terminal, or a user device. Referring to FIG. 12, the device 1210 may include a first application client (or an application client) 1211, a second application client 1213, and an edge enabler client (or an MEC enabling layer (MEL)) 1215. The device 1210 may perform a required operation by using the edge enabler client 1215 to use the MEC service.

Although not shown in FIG. 12, according to various embodiments, the device 1210 may include a multi-access service agent (MSA) and a multi-access service enabler (MSE). According to various embodiments, the MSA may receive information related to authentication, authorization, and a policy (e.g., an app routing policy, a discovery policy, or a monitoring policy) of the device 1210. The MSE may set a route and manage MEC-based data transmission according to a policy. According to various embodiments, the edge enabler client 1215 may refer, for example, to a component for performing an operation required for using an MEC service among services of the MSE.

According to various embodiments, the device 1210 may execute a plurality of applications. For example, the device 1210 may execute the first application client 1211 and the second application client 1213. The plurality of applications may require different network services based on at least one of a required data transmission rate, a latency (or a speed), reliability, the number of devices accessing a network, a network access period of the device 1210, or an average data use amount. The different network services may include, for example, enhanced mobile broadband (eMBB), ultra-reliable and low latency communication (URLLC), or massive machine type communication (mMTC).

The application client of the device 1210 may refer, for example, to a basic application installed in advance in the device 1210 or an application provided by a third party. That is, the application client may refer to a client application program driven in the device 1210. In the device 1210, several application clients may be driven. At least one or more of the application clients may use a service provided from the edge data network 1230. For example, the application client, which is an application installed and executed in the client device 1210, may provide a function of transmitting and receiving data over the edge data network 1230. The application client of the device 1210 may refer, for example, to application software executed on the device 1210 to use a function provided by one or more specific edge applications.

According to various embodiments, a plurality of application clients (e.g., the first application client 1211 and the second application client 1213) of the device 1210 may perform data transmission with the service server 1240 based on a required network service type or may perform data transmission based on edge computing with the edge data network 1230. For example, when the first application client 1211 does not require a low latency, the first application client 1211 may perform data transmission with the media server 1240. In another example, when the second application client 1213 requires a low latency, the second application client 1213 may perform MEC-based data transmission with the edge data network 1230.

According to various embodiments, an application of the device 1210 may be referred to as an application client, a client application (Client App), or a UE application (UE App). For convenience, hereinbelow, in the disclosure, the application of the device 1210 may be referred to as an application client.

According to various embodiments, the access network 1220 may provide a channel for wireless communication with the device 1210. For example, the access network 1220 may refer, for example, to a radio access network (RAN), a base station, eNodeB (eNB), a $5^{th}$-generation (5G) node, a transmission/reception point (TRP), or a 5G NodeB (5GNB).

According to various embodiments, the edge data network 1230 may refer, for example, to a server the device 1210 accesses to use the MEC service. The edge data network 1230 may be installed in a position geographically close to the device, e.g., inside or near the base station. According to various embodiments, the edge data network 1230 may transmit and receive data to and from the device 1210 without passing through an external data network (DN) (e.g., the Internet). In various embodiments, MEC may be referred to as multi-access edge computing or mobile-edge computing.

According to various embodiments, the edge data network 1230 may be referred to as an MEC host, an edge computing server, a mobile edge host, an edge computing platform, an MEC server, etc. For convenience, hereinbelow, in the disclosure, the MEC server may be referred to as the edge data network 1230. Referring to FIG. 12, the edge data network 1230 may include a first edge application 1231, a second edge application 1233, and an edge enabler server (or an MEP) 1235. The edge enabler server 1235 may refer, for example, to a component that provides the MEC service and performs traffic control, etc., in the edge data network 1230.

According to various embodiments, the edge data network 1230 may execute a plurality of applications. For example, the edge data network 1230 may execute the first edge application 1231 and the second edge application 1233. According to various embodiments, an edge application may refer, for example, to an application provided by a third party in an edge data network that provides the MEC service. The edge application may be used to form a data session with an application client to transmit and receive data related to the application client. That is, the edge application may form a data session with the application client. In various embodiments, the data session may refer, for example, to a communication route formed for the application client of the device 1210 and the edge application of the edge data network 1230 to transmit and receive data.

According to various embodiments, an application of the edge data network 1230 may be referred to as an MEC application (MEC App), an ME (MEC) App, an edge application server, or an edge application. For convenience, hereinbelow, in the disclosure, the application of the edge data network 1230 may be referred to as an edge application. The edge application, while being referred to as an application, may mean refer, for example, to an application server that exists in the edge data network.

According to various embodiments, a media server 1240 may provide contents related to an application. For example, the media server 1240 may be managed by a content operator. According to various embodiments, the media server 1240 may transmit and receive data to and from the device 1210 through an external DN (e.g., the Internet). For example, the media server 1240 may refer, for example, to a server (e.g., a YouTube cloud server, an AffreecaTV server, a Twitch server, etc.) capable of providing data related to a streaming server.

Although not shown in FIG. 12, the network environment 1200 may include an edge data network configuration server. In various embodiments, the edge data network configuration server may provision edge data network configuration information to the edge enabler client 1215 in the device 1210. For example, the edge data network configuration server may provide configuration information for using the MEC service (e.g., information about an edge data network that provides a service to a certain region, information for identifying the edge data network, etc.) to the edge data network 1230, the device 1210, or the like. In various embodiments, the edge data network configuration server may be referred to as an edge data network management server, an edge configuration server, a configuration server, etc., and may perform a function of a mobile edge platform manager (MEPM) or a multi-access edge orchestrator (MEO).

Although not shown in FIG. 12, a core network (CN) or a data network (DN) may exist between the access network 1220 and the edge data network 1230. According to various embodiments, by transmitting or receiving data (or a data packet) to and from the device 1210 through the core network and the access network 1220, the data network may provide a service (e.g., an Internet service or an Internet protocol (IP) multimedia subsystem (IMS) service). For example, the data network may be managed by a communication operator. In various embodiments, the edge data network 1230 may be connected with the access network 1220 or the core network through the data network (e.g., a local DN).

Figure 13:
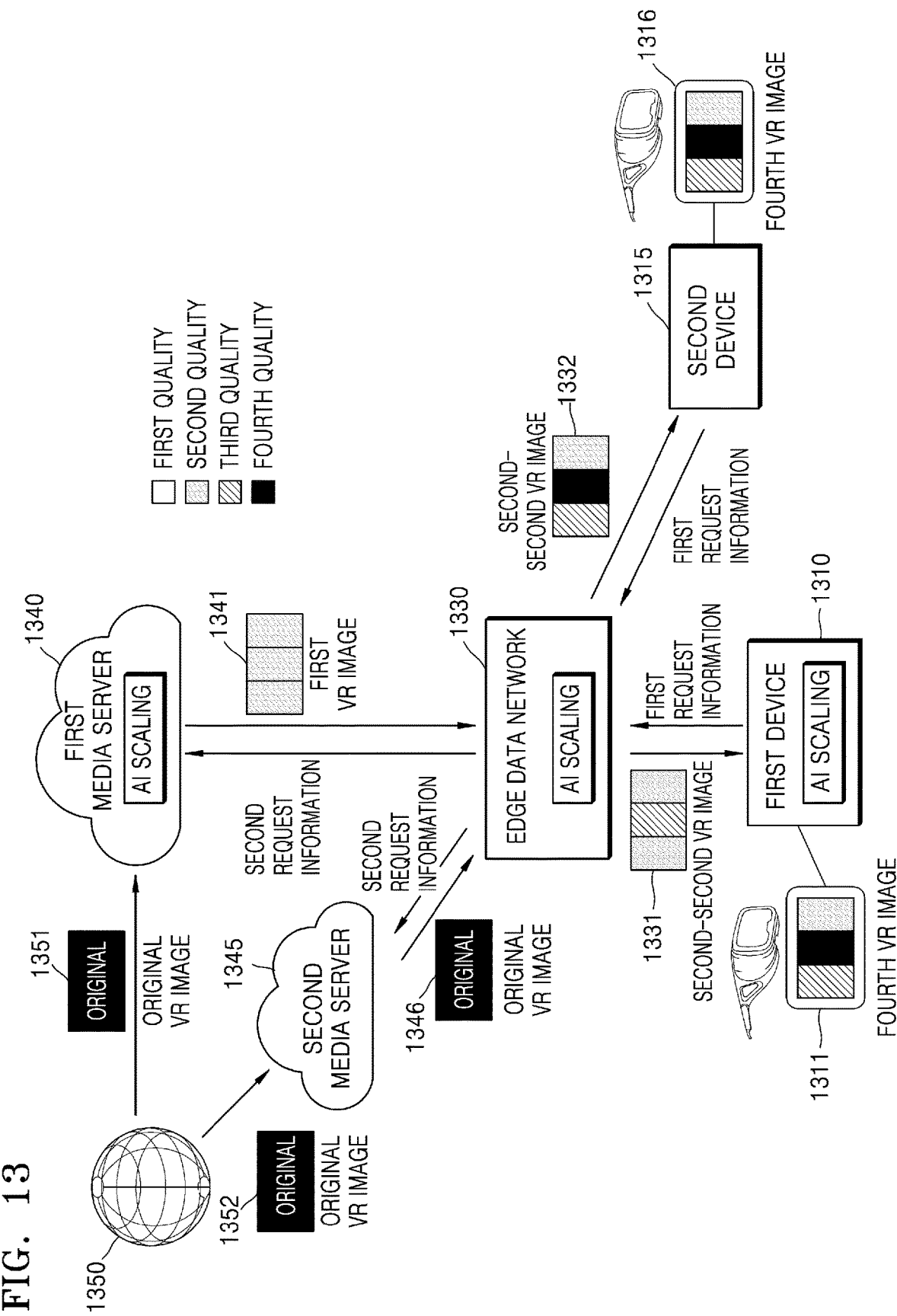
FIG. 13 is a diagram illustrating an example method of performing virtual reality (VR) streaming in a network environment, according to various embodiments.

FIG. 13 is a diagram illustrating an example method of performing virtual reality (VR) streaming in a network environment, according to various embodiments.

In the disclosure, an AI codec may refer, for example, to a codec for supporting the above-described AI encoding process and AI decoding process. More specifically, the AI codec may refer to an encoding and decoding scheme for performing AI upscaling and AI downscaling based on AI. That is, the AI codec may refer to a process of applying an image to a series of processes described above with reference to FIGS. 1 through 11.

In this case, in the disclosure, AI scaling may include both AI downscaling and AI upscaling described above, and may refer to reducing or increasing a resolution of an image based on AI.

An adaptive VR streaming system based on AI upscaling and AI downscaling according to the disclosure may include the media server 1240, the edge data network 1230, and the device 1210. However, without being limited to this example, a separate server for transmitting information may exist when necessary.

According to various embodiments, to perform adaptive VR streaming based on AI upscaling and AI downscaling, the media server 1240, the edge data network 1230, and the device 1210 may perform AI scaling on a received image.

More specifically, FIG. 13 schematically shows an example operation of each component included in the network environment 1200. In this case, according to an example embodiment, the network environment 1200 may include a separate server 1350.

In the disclosure, according to support or non-support for AI scaling, the media server 1240 may be classified as a first media server 1340 that supports AI scaling on an image or a second media server 1345 that does not support AI scaling on an image.

Also, in the disclosure, according to support or non-support for AI scaling, the device 1210 may be classified as a first device 1310 that supports AI scaling on an image or a second device 1315 that does not support AI scaling on an image.

Figure 14:
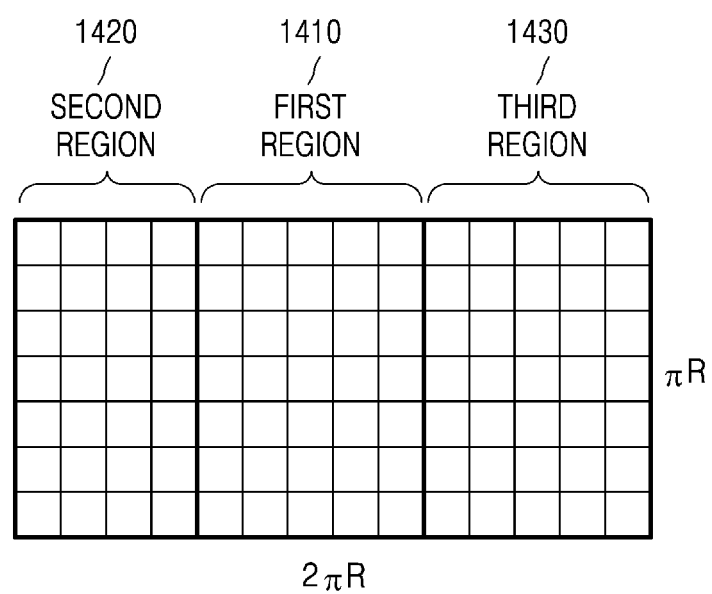
FIG. 14 is a diagram illustrating an example AI scale target region, according to various embodiments.

FIG. 14 is a diagram illustrating an example AI scale target region, according to various embodiments.

In the disclosure, a VR image may be divided into several regions such as a first region 1410, a second region 1420, and a third region 1430 as shown in FIG. 14. In the disclosure, an AI scaling target region may refer, for example, to at least a partial region where AI scaling is to be performed among several divided regions (e.g., the first region 1410, the second region 1420, and the third region 1430) as shown in FIG. 14.

In addition, each AI scaling target region may be AI-scaled to have changes to different qualities (hereinafter, an AI scaling change level). This will be described in detail later.

In the disclosure, for convenience of description, a resolution of an image will be described as a first quality, a second quality, a third quality, and a fourth quality. In this case, each quality may be a relative concept identified according to a difference of a resolution with respect to a resolution of the original image. That is, the first quality, the second quality, the third quality, and the fourth quality may be classified according to the number of pixels included per unit region, reduced from the original image. When expressed otherwise, the first quality, the second quality, the third quality, and the fourth quality may be expressions regarding resolution degradation over the entire area of the image.

In the disclosure, the fourth quality may mean the same resolution as the original image. However, in the disclosure, the size of a region of the image may be changed, such that it may mean that the number of pixels included in a region to which the fourth quality is applied is the same as the number of pixels included in the same region of the original image. Referring to FIG. 14, a description will be made as an example of the case in which the resolution of the original image is 8K (a resolution of 7680×4320). Assuming that a first region 1410 has a size of 10 percent of the original image and the fourth quality that is the same resolution as the original image is applied to the first region 1410, the number of pixels included in the first region 1410 may be 768×432. This is equal to the number of pixels included in a size of 10 percent of the original image.

In the disclosure, the third quality may refer, for example, to the number of pixels included per unit region being reduced from the fourth quality (i.e., the resolution of the original image). Referring to FIG. 14, a description will be made as an example of the case in which the resolution of the original image is 8K (a resolution of 7680×4320). Assuming that a second region 1420 has a size of 10 percent of the original image and 4K as the third quality is applied to the second region 1420, the number of pixels included in the second region 1420 may be 384×216. This may be equal to the number of pixels included in a region of 10 percent of the original image when the entire area of the original image is downscaled to 4K (3840×2160).

Likewise, the second quality may refer, for example, to the number of pixels included per unit region being reduced from the third quality. In addition, the first quality may refer, for example, to the number of pixels included per unit region being reduced from the second quality.

The above-described examples are is used herein for convenience of a description.

Referring back to FIG. 13, the first media server 1340 may obtain an original VR image 1351 stored in the separate server 1350 or the first media server 1340 according to second request information of the edge data network 1330. The second media server 1345 may also obtain an original VR image 1352 stored in the separate server 1350 or the second media server 1345 according to second request information of the edge data network 1330.

The first media server 1340 may obtain a first VR image 1341 of the second quality by performing AI scaling on the received VR image 1351. The first media server 1340 may transmit the first VR image 1341 to the edge data network 1330. That is, according to an example of FIG. 13, the first media server 1340 may transmit the second-quality first VR image 1341 having a reduced resolution to the edge data network 1330 to reduce the amount of data to be transmitted. The edge data network 1330 may perform AI upscaling on the second-quality first VR image 1341 having a reduced resolution.

The second media server 1345 may not be able to perform AI scaling on the received original VR image 1352, and thus may transmit an original VR image 1346 that is the same as the received original VR image 1352 to the edge data network 1330.

The edge data network 1330 may perform AI scaling. Thus, the edge data network 1330 may perform AI scaling on the received first VR image 1341 or the received original image 1346 based on first request information of the first device 1310 or the second device 1315.

As an example embodiment, a case will be described in which the edge data network 1330 streams a VR image to the first device 1310 that supports AI scaling. The first device 1310 supports AI scaling, such that the edge data network 1330 may not need to perform AI upscaling for transmission on the first region 1410 corresponding to user's gaze information up to the fourth quality that is the same as the original image. Thus, the edge data network 1330 may perform AI scaling by considering the user's gaze information included in the first request information, network information, device information, etc. The first device 1310 may receive, from the edge data network 1330, a second-second VR image 1331 resulting from AI scaling to the second quality and the third quality. The first device 1310 may perform AI upscaling on an AI scaling target region to the fourth quality that is the same as the original resolution, by considering current gaze information of the first device.

As another example embodiment, a case will be described in which the edge data network 1330 streams a VR image to the second device 1315 that does not support AI scaling. Referring to FIG. 13, the second device 1315 may not be able to perform AI scaling, such that the edge data network 1330 has to generate and transmit a fourth VR image 1316 that has to be output from the second device 1315. Thus, the edge data network 1330 may perform AI scaling on the first region 1410 corresponding to the gaze information of the second device 1315 to the fourth quality that is the same as the original resolution, perform AI scaling on the second region 1420 to the third quality, and perform AI scaling on the third region 1430 to the second quality. The edge data network 1330 may transmit the AI-scaled second-second VR image 1332 to the second device 1315. In this case, the second device 1315 may output the VR image received from the edge data network 1330 as fourth VR image 1316.

A more detailed description of the foregoing example embodiments of the disclosure will be made below.

Figure 15:
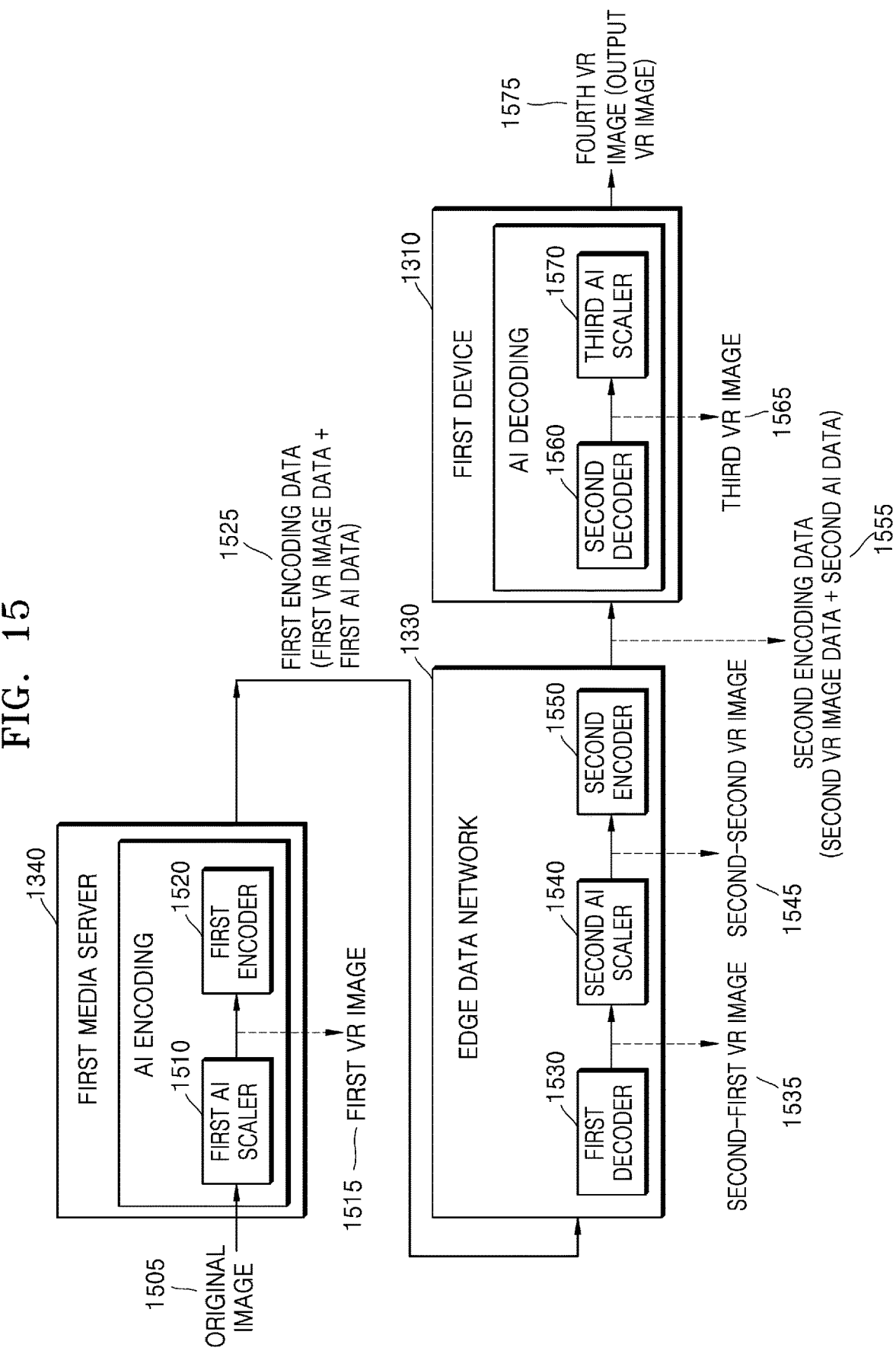
FIG. 15 is a diagram illustrating an example system network environment for performing VR streaming, according to various embodiments.

FIG. 15 is a diagram illustrating an example system network environment for performing VR streaming, according to various embodiments.

According to the disclosure, each of the first media server 1340, the edge data network 1330, and the first device 1310 may perform AI scaling, such that the first device 1310 may have to obtain an image of ideally the same quality as an original image 1505. Thus, all of AI for first AI scaling (AI of a first AI scaler 1510), AI for second AI scaling (AI of a second AI scaler 1540), and AI for third AI scaling (AI of a third AI scaler 1570) are jointly trained.

In the disclosure, a third DNN may refer to AI for first AI scaling of the first media server 1340. A fourth DNN may refer to AI for second AI scaling of the edge data network 1330. A fifth DNN may refer to AI for third AI scaling of the first device 1310.

Herein, to maintain such a joint relationship, the first media server 1340 may transmit first AI data to the edge data network 1330. The edge data network 1330 may transmit second AI data to the first device 1310.

Hereinbelow, a description is provided of a method, performed by each of the first media server 1340, the edge data network 1330, and the first device 1310, of performing AI scaling and image processing. An operation of the disclosure is performed based on FIGS. 1 through 12, and thus redundant descriptions are omitted here.

First, a configuration of the first media server 1340 will be described.

According to various embodiments, the first media server 1340, which is a media server supporting an AI scaling function, may include a first AI scaler 1510 and a first encoder 1520.

According to various embodiments, the first media server 1340 may obtain the original image 1505. In this case, the original image may refer to an image that is subject to AI encoding.

According to various embodiments, the first AI scaler 1510 may obtain a first VR image 1515 by performing first AI scaling on the original image 1505. The first VR image 1515 may correspond to the first VR image 1341 of FIG. 13. The first AI scaler 1510 may perform AI downscaling 110 described with reference to FIG. 1. The the first VR image 1515 may refer, for example, to an image obtained as a result of performing first AI scaling on the original image 1505 in an AI encoding process. More specifically, the first VR image 1515 may refer to an image obtained as a result of performing AI downscaling on the original image 1505.

According to various embodiments, the first encoder 1520 may perform first encoding on the first VR image 1515. The first encoder 1520 may perform first encoding 120 as described with reference to FIG. 1.

The first media server 1340 may transmit first AI encoding data 1525 obtained through the AI encoding process to the edge data network 1330. The first encoding data 1525 obtained through the AI encoding process of the first media server 1340 may include first VR image data obtained as a result of performing first encoding on the first VR image 1515 and first AI data.

The first AI data may be AI data related to AI downscaling of the original image 1505. The first AI data may be used when the second AI scaler 1540 of the edge data network 1330 performs second AI scaling. That is, the first AI data may be used for second AI scaling based on the fourth DNN. As described above, the third DNN and the fourth DNN are jointly trained, such that the first AI data may include information that enables second AI scaling 1540 of a second-first VR image 1535 to be accurately performed through the fourth DNN.

According to various embodiments, the edge data network 1330 may include a first decoder 1530, a second AI scaler 1540, and a second encoder 1550.

According to various embodiments, the first decoder 1530 may obtain the second-first VR image 1535 by performing first decoding based on the first encoding data 1525. The first decoder 1530 may perform first decoding 130 described with reference to FIG. 1.

According to various embodiments, the second AI scaler 1540 may obtain a second-second VR image 1545 by performing second AI scaling on the second-first VR image 1535. The second-second VR image 1545 may correspond to the second-second VR image 1331 of FIG. 13. The second-second VR image 1545 may refer, for example, to an image obtained as a result of performing second AI scaling on the second-first VR image 1535 decoded in the AI decoding process at a targeted resolution and/or quality based on the first AI data.

The second encoder 1550 may perform second encoding on the second-second VR image 1545. The second encoder 1550 may perform the same process as first encoding 120 described with reference to FIG. 1.

According to various embodiments, the edge data network 1330 may generate second encoding data 1555. In this case, the second AI encoding data 1555 obtained through second AI encoding may include second VR image data obtained as a result of performing second encoding on the second-second VR image 1545 and second AI data.

The second AI data may be data related to AI downscaling performed on the second-first VR image 1535 or data related to AI upscaling performed on the second-first VR image 1535. The second VR image data may be used in second decoding performed by the first device 1310, and the second AI data may be used in third AI scaling performed by the first device 1310.

The edge data network 1330 may transmit second encoding data obtained through the AI encoding process to the first device 1310.

According to various embodiments, the first device 1310 may include a second decoder 1560 and a third AI scaler 1570.

The second decoder 1560 may obtain a third VR image 1565 through second decoding. More specifically, the second decoder 1560 may reconstruct the third VR image 1565 corresponding to the second-second VR image 1545 by performing second decoding on the second VR image data. In this case, the second decoder 1560 may perform the same process as first decoding 130 described with reference to FIG. 1.

According to various embodiments, the third AI scaler 1570 may obtain a fourth VR image 1575 by performing third AI scaling on the third VR image 1565. In this case, the third AI scaler 1570 may perform AI scaling based on the fifth DNN with respect to the third VR image 1565 using the second AI data. As described above, the fourth DNN and the fifth DNN are jointly trained, such that the second AI data may include information that enables third AI scaling to be accurately performed on the third VR image 1565 through the fifth DNN. The third AI scaler 1570 may upscale or downscale the third VR image 1565 at a targeted resolution and/or quality based on the second AI data.

Figure 16:
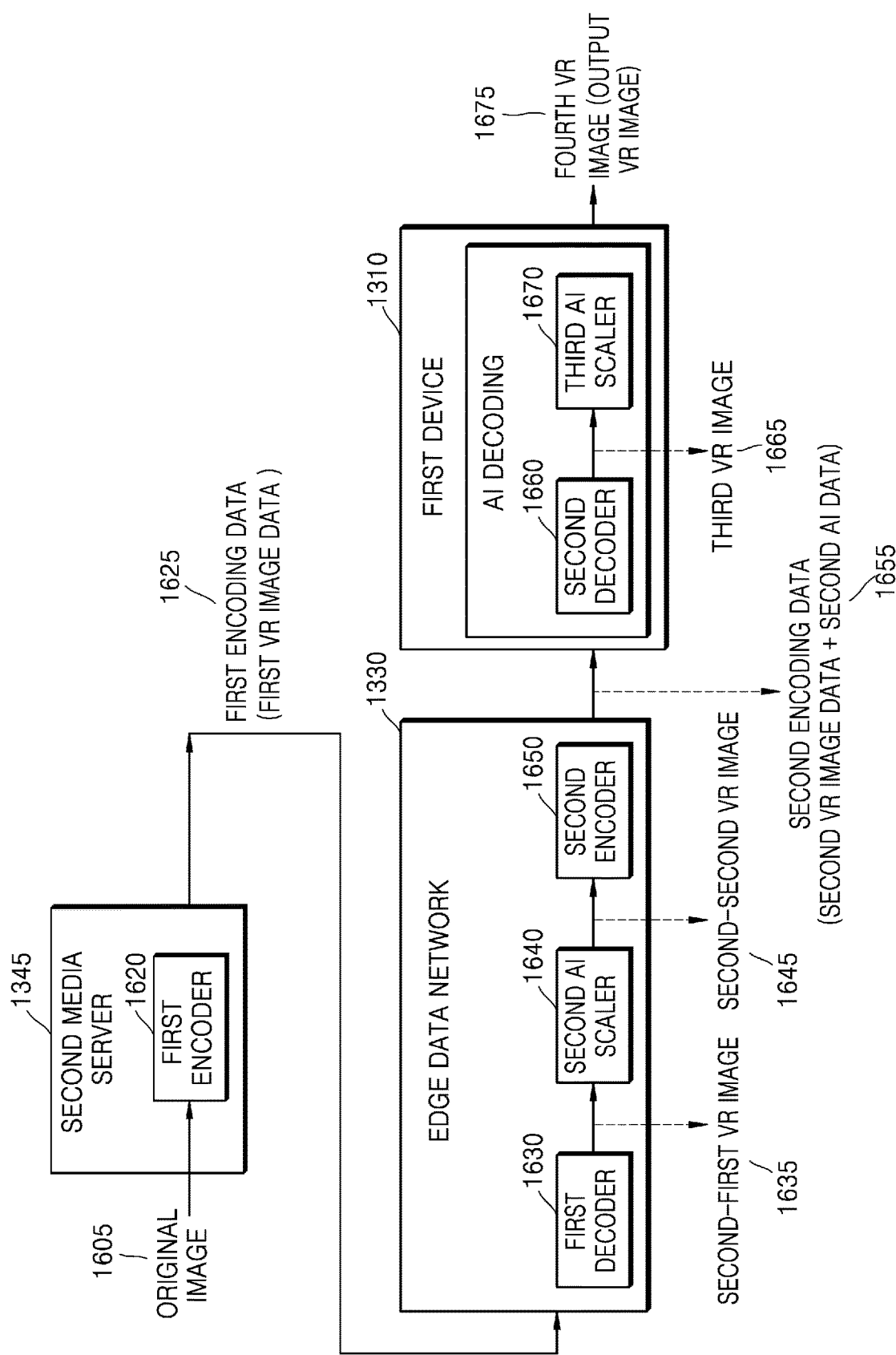
FIG. 16 is a diagram illustrating an example system network environment for performing VR streaming, according to various embodiments.

FIG. 16 is a diagram illustrating an example system network environment for performing VR streaming, according to various embodiments. More specifically, FIG. 16 illustrates an example system network environment in which the media server 1240 is the second media server 1345 that does not support AI scaling.

FIG. 16 shows an example embodiment for the edge data network 1330 and the first device 1310 to output a fourth VR image 1675 including a region having the original resolution by performing AI scaling because the second media server 1345 does not support AI scaling. Some components shown in FIG. 16 are the same as those shown in FIG. 15, and thus will not be described repeatedly.

The second media server 1345 may include a first encoder 1620. The first encoder 1620 may receive an original image 1605 and perform first encoding on the original image 1605. The second media server 1345 may transmit first encoding data 1625 including first VR image data obtained through encoding to the edge data network 1330.

The edge data network 1330 may include a first decoder 1630, a second AI scaler 1640, and a second encoder 1650. In this case, the first decoder 1630, the second AI scaler 1640, and the second encoder 1650 may correspond to the first decoder 1530, the second AI scaler 1540, and the second encoder 1550 of FIG. 15, respectively. However, first AI scaling is not performed by a media server in an embodiment of FIG. 16, such that the fourth DNN of the second AI scaler 1640 and the fifth DNN of the third AI scaler 1670 may be jointly trained.

Referring to FIG. 16, a second-first VR image 1635 has not been scaled, and thus may have the same resolution as the original image 1605. Thus, for efficiency of transmission, the edge data network 1330 needs to AI-downscale and transmit the second-first VR image 1635. The second AI scaler 1640 may obtain a second-second VR image 1645 by performing AI downscaling on the second-first VR image 1635.

The edge data network 1330 may encode the second-second VR image 1645 to obtain encoding data. Second encoding data 1655 may include second AI data obtained by AI downscaling performed by the second AI scaler 1640 and second VR image data generated in second encoding.

The third AI scaler 1670 of the first device 1310 may perform AI upscaling by considering the second AI data to obtain the fourth VR image 1675 from the third VR image 1165 obtained from second decoder 1160. The fourth VR image 1675 includes a region having the same resolution as the original resolution. Through the foregoing process, the device may obtain an output VR image of the same quality as the original quality for some of VR regions.

Figure 17:
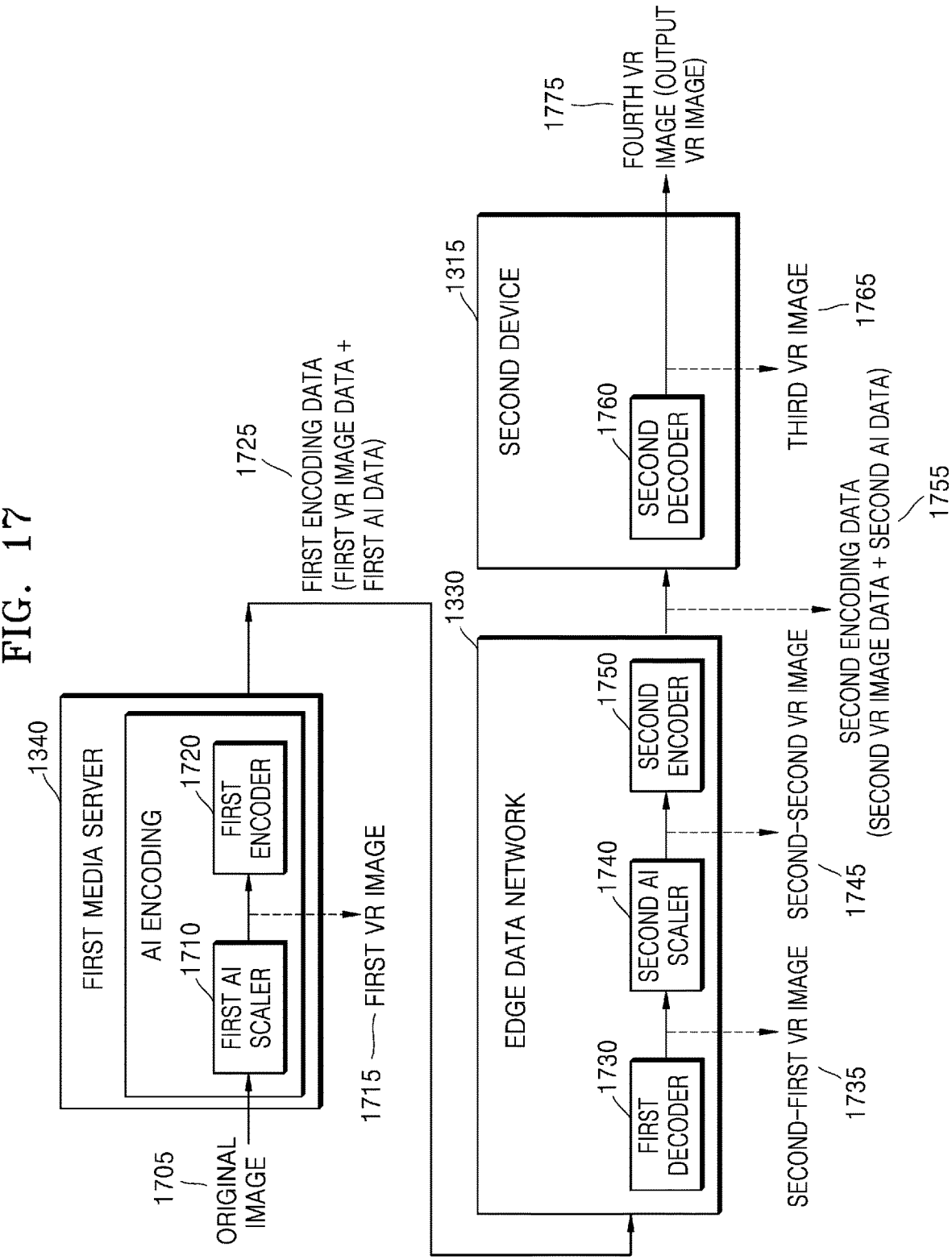
FIG. 17 is a diagram illustrating an example system network environment for performing VR streaming, according to various embodiments.

FIG. 17 is a diagram illustrating an example system network environment for performing VR streaming, according to various embodiments. More specifically, FIG. 17 illustrates an example system network environment in which the device 1210 is the second device 1315 that does not support AI scaling.

FIG. 17 shows an example embodiment for the first media server 1340 and the edge data network 1330 to stream a fourth VR image 1775 including a region having the original resolution by performing AI scaling because the second device 1315 does not support AI scaling. Some components shown in FIG. 17 are the same as those shown in FIG. 15, and thus will not be described repeatedly.

The first media server 1340 may include a first AI scaler 1710 and a first encoder 1720. In this case, the first AI scaler 1710 and the first encoder 1720 may correspond to the first AI scaler 1510 and the first encoder 1520 of FIG. 15, respectively. The first media server 1340 may output first encoding data 1725 including first VR image data and first AI data.

The edge data network 1330 may include a first decoder 1730, a second AI scaler 1740, and a second encoder 1750. In this case, the first decoder 1730, the second AI scaler 1740, and the second encoder 1750 may correspond to the first decoder 1530, the second AI scaler 1540, and the second encoder 1550 of FIG. 15, respectively. However, third AI scaling is not performed by a device in an embodiment of FIG. 17, such that the third DNN of the first AI scaler 1710 and the fourth DNN of the second AI scaler 1740 may be jointly trained. Edge data network 1330 may output second encoding data 1755 including second VR image data and second AI data.

According to FIG. 17, for efficiency of transmission, the first media server 1340 may need to transmit a first VR image 1715 after downscaling from an original image 1705. Thus, the first AI scaler 1710 may obtain the first VR image 1715 by performing AI downscaling on the original image 1705.

The edge data network 1330 may not expect AI scaling to be performed in the second device 1315, and thus may need to generate an expected output image and transmit the generated output image to the second device 1315. That is, referring to FIG. 17, a second-second VR image 1745 resulting from second AI scaling of second-first VR image 1735 may be the same as a fourth VR image (an output VR image) 1775 output by the second device 1315 and a third VR image 1765 resulting from second decoding by second decoder 1760.

The second device 1315 may perform second decoding on the received second VR image data and output, as the fourth VR image 1775, the third VR image 1765 without separate AI scaling.

Figure 18:
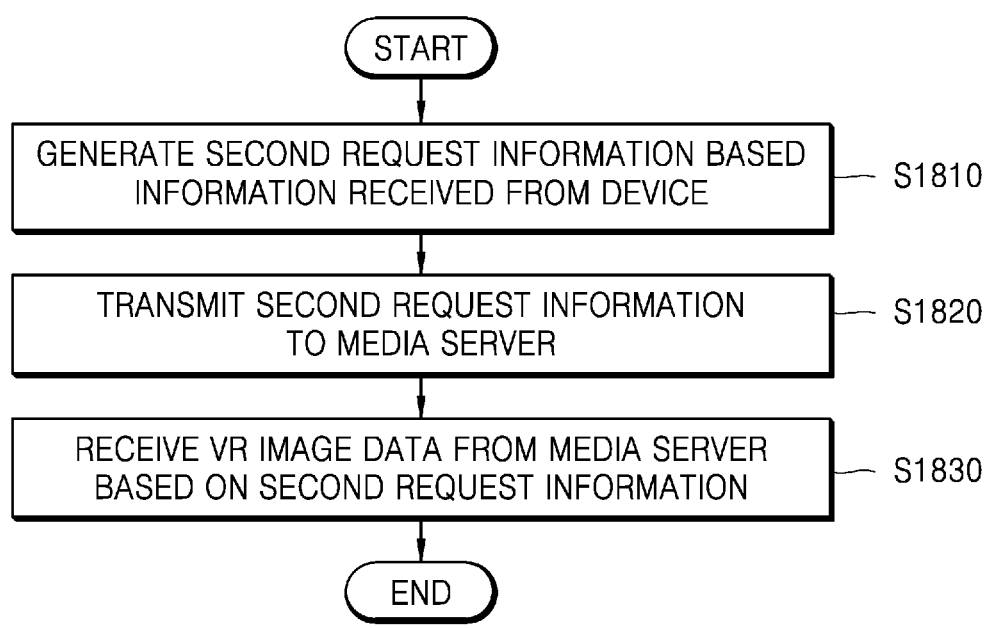
FIG. 18 is a flowchart illustrating an example method, performed by an edge data network, of streaming a VR image from a media server, according to various embodiments.

FIG. 18 is a flowchart illustrating an example method, performed by an edge data network, of streaming a VR image from a media server, according to various embodiments.

In operation S1810, the edge data network 1230 may generate second request information based on information, received from the device 1210.

More specifically, the edge data network 1230 may generate the second request information based on at least one of the user's gaze information, device information, image information requested by the device, second network information regarding a network environment between the edge data network 1230 and the media server 1240, or media server information.

Herein, the first request information may refer, for example, to information about requirements for a VR image selected or determined by the device 1210. The first request information may include the gaze information of the user viewing VR determined by the device 1210, first network information, device information, image information requested by the device, etc.

The user's gaze information, which is information regarding a gaze with which the user looks at the VR image, may refer, for example, to information used to determine which part of the VR image the user looks at. For example, the user's gaze information may include, but is not limited to, a vector value indicating a user's gaze direction, coordinates of a region at which the user looks in the VR image, etc. For example, the user's gaze information may include region of interest (ROI) information, viewport data, etc.

The first network information may refer, for example, to network information regarding a network environment between the edge data network 1230 and the device 1210. According to various embodiments, the edge data network 1230 may receive first network information from the device 1210. The edge data network 1230 may identify an environment between the edge data network 1230 and a network of the device 1210 to obtain the first network information. In this case, the first network information may be described based on a traffic occurrence level in a transmission/reception route between the edge data network 1230 and the device 1210, which may be described as complexity. The complexity may be determined considering, for example, a delay, a throughput, etc., of the first network. However, this is merely an example, and a state of a network may be described by information other than traffic occurring on the transmission/reception route. For example, as the first network information, a quality of service (QoS) of a streaming service may be considered, and jitter, a delay, a throughput, a packet loss rate, etc., may affect the QoS of the streaming service. In addition, the first network information may be determined based on the performance of the first network. The device information may include information about a capability of the device 1210. More specifically, the information about the capability of the device 1210 may include, for example and without limitation, information about a video codec supported by the device 1210, information indicating whether the device 1210 is capable of performing AI upscaling and AI downscaling (information whether the device 1210 is the first device 1310 or the second device 1315), information about an AI scaling change level of AI scaling change that may be performed by the device 1210, hardware information about a display of the device 1210, etc.

The image information may refer, for example, to information about an image requested by the device 1210. The image information may include a resolution of a specific image, a bitrate of the image, etc.

However, the first request information regarding the VR image may include some of the above-described information rather than all of the information. The device 1210 may transmit the foregoing information to the edge data network 1230 separately from the first request information regarding the VR image.

The second request information may, for example, correspond to information about requirements for the VR image requested from the edge data network 1230 to the media server 1240.

The second network information may refer, for example, to network information regarding a network between the edge data network 1230 and the media server 1240. The edge data network 1230 may receive the second network information from the media server 1240. Alternatively, the edge data network 1230 may identify a state of the network between the edge data network 1230 and the media server 1240 to obtain the second network information. In this case, the second network information may be described based on a traffic occurrence level in a transmission/reception route between the edge data network 1230 and the media server 1240, which may be described as complexity. In this case, the complexity may be determined considering, for example, a delay, a throughput, etc., of the second network. However, this is merely an example, and a state of a network may be described by information other than traffic occurring on the transmission/reception route. For example, as the second network information, a quality of service (QoS) of a streaming service may be considered, and jitter, a delay, a throughput, a packet loss rate, etc., may affect the QoS of the streaming service. In addition, the second network information may be determined based on the performance of the second network.

The media server information may include capability information regarding the media server 1240. The capability information regarding the media server 1240 may include, for example, information about a video codec supported by the media server 1240, information indicating whether the media server 1240 is capable of performing AI upscaling and AI downscaling (information whether the media server 1240 is the first media server 1340 or the second media server 1345), information about an AI scaling change level of AI scaling change that may be performed by the media server 1240, etc. The media server information may be previously stored in the edge data network 1230, or may be received from the media server 1240 at the request of the edge data network 1230. For example, the second request information may be the same as the first request information. When the device 1210 generates the first request information requesting an image of the fourth quality, the edge data network 1230 may transmit the second request information requesting the image of the fourth quality to the media server 1240.

According to various embodiments, when the edge data network 1230 is streamed with the VR image from the media server 1240, a latency (a required time) may be determined as a sum of a computation latency and a communication latency. In this case, the computation latency may increase when the media server 1240 or the edge data network 1230 performs AI scaling, and the communication latency may increase as the size of transmission data increases.

When the edge data network 1230 determines based on the second network information that the state of the network between the media server 1240 and the edge data network 1230 is good, transmission latency may not be a significant issue even in case of a large size of transmission data, such that the edge data network 1230 may receive an image of a high quality (e.g., the fourth quality) without AI downscaling. Also in this case, the edge data network 1230 does not require AI upscaling, such that the computation latency may not increase.

On the other hand, when the edge data network 1230 determines based on the second network information that the state of the network is poor, the transmission latency may increase largely when the size of transmission data increases, such that the edge data network 1230 needs to receive AI-downscaled data from the media server 1240 to reduce the size of transmission data. The edge data network 1230 may also perform AI upscaling on the received VR image data. That is, the media server 1240 may determine based on the state of the network between the media server 1240 and the edge data network 1230 whether to perform AI downscaling on image data to be transmitted from the media server 1240 to the edge data network 1230.

As described above, when the edge data network 1230 determines based on media server information that the media server 1240 is the first media server 1340 (a media server supporting AI codec) and based on the second network information that a second network environment is not good, the edge data network 1230 may generate the second request information requesting a VR image of a low resolution (e.g., the second quality). On the other hand, when the edge data network 1230 transmits the second request information regarding the first media server 1340 in a good second network environment, the edge data network 1230 may request the original resolution (e.g., the fourth quality).

According to various embodiments, when the edge data network 1230 determines based on media server information that the media server 1240 is the second media server 1345 (a media server not supporting AI codec), the second request information may include information requesting the original image.

In operation S1820, the edge data network 1230 may transmit the second request information to the media server 1240.

In operation S1830, the edge data network 1230 may receive VR image data from the media server 1240 based on the second request information.

Thereafter, the edge data network 1230 may obtain a VR image by performing decoding based on the received VR image data. As described above, when the media server 1240 is the first media server 1340, the edge data network 1230 may obtain the first VR image 1341. When the media server 1240 is the second media server 1345, the edge data network 1230 may obtain the original VR image 1346.

In this case, according to various embodiments, the VR image obtained from the media server 1240 may be image data divided into tiles of a preset size.

Figure 19:
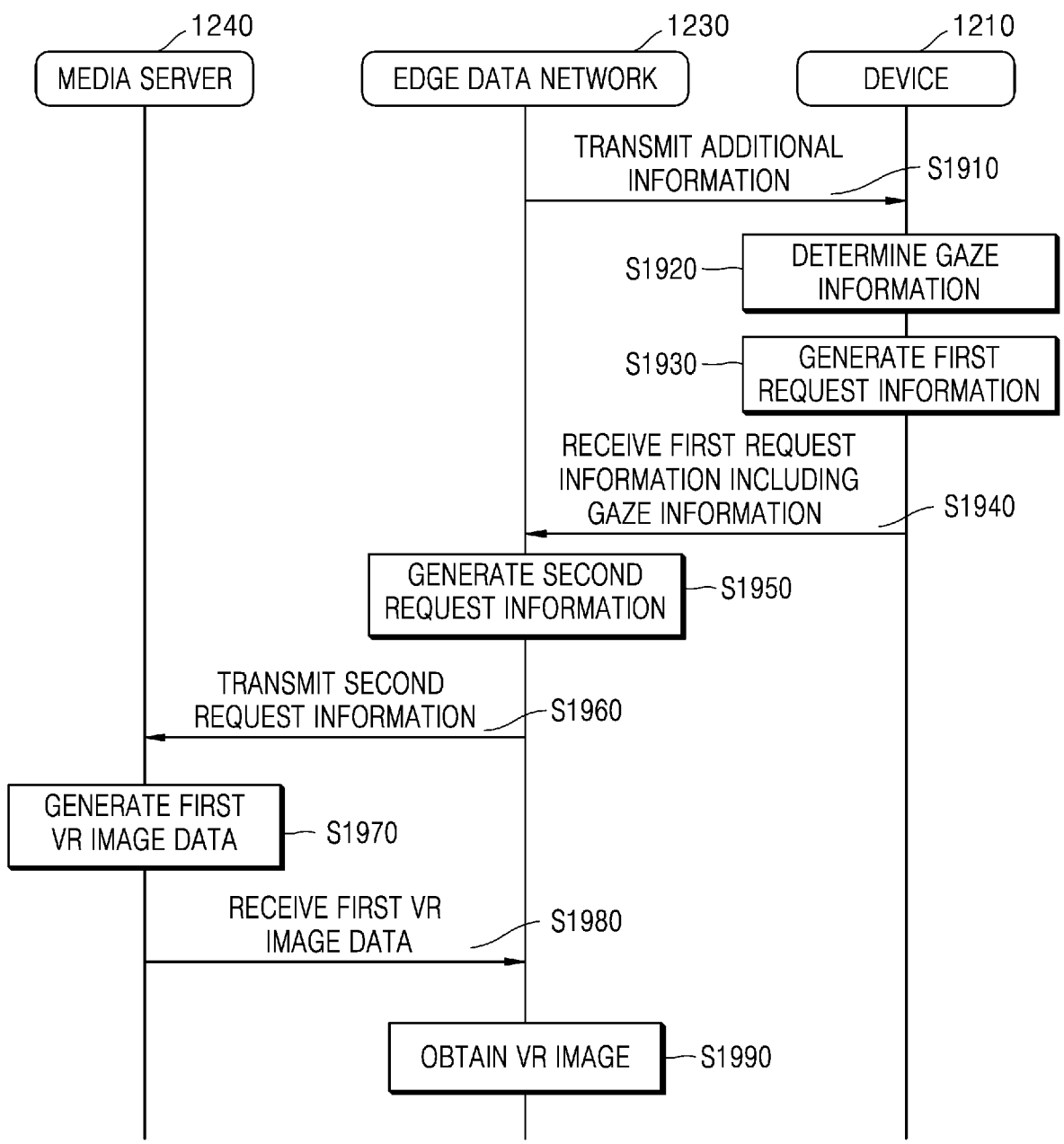
FIG. 19 is a diagram illustrating an example method, performed by an edge data network, of obtaining a VR image from a media server, according to various embodiments.

FIG. 19 is a diagram illustrating an example method, performed by the edge data network 1230, of obtaining a VR image from the media server 1240, according to various embodiments.

FIG. 19 shows a transmission/reception flow of data when the edge data network 1230 obtains a VR image as shown in FIG. 18. The flow of FIG. 19 has features similar with FIGS. 15 through 18, and thus a redundant descriptions will be avoided.

In operation S1910, the edge data network 1230 may transmit additional information regarding a VR image to the device 1210. In operation S1920, the device 1210 may determine gaze information. In operation S1930, the device 1210 may generate first request information regarding the VR image based on the additional information regarding the VR image. In operation S1940, the edge data network 1230 may receive the first request information including the gaze information from the device 1210. That is, the edge data network 1230 may receive the first request information from the device 1210, and the first request information of the device 1210 may include at least one of user's gaze information, first network information, device information, or image information.

The additional information regarding the VR image may refer, for example, to information regarding the VR image that may be provided by the edge data network 1230 or the media server 1240. The additional information regarding the VR image may include, for example, quality information including a resolution of the VR image, a bitrate of the VR image, etc., that may be provided by the edge data network 1230 or the media server 1240, AI encoding information, AI scaling change information, etc.

According to various embodiments, the edge data network 1230 may request, to the media server 1240, the additional information regarding the VR image that may be provided by the media server 1240. The media server 1240 may generate information about an image that may be provided by the media server 1240 as the additional information, by considering whether to perform AI scaling of the media server 1240. In this case, for example, when the media server 1240 is capable of performing AI scaling, the additional information regarding the VR image may include information indicating that AI encoding data may be provided. The edge data network 1230 may previously store the additional information regarding the VR image that may be provided by the media server 1240.

According to various embodiments, the edge data network 1230 may generate the additional information regarding the VR image that may be provided by the edge data network 1230. For example, the edge data network 1230 may generate the additional information, taking into account whether the VR image that may be provided to the device 1210 is an AI-encoded image, with which AI scaling change information the VR image has been AI-scaled, etc.

While it is shown that the device 1210 receives the additional information from the edge data network 1230, the device 1210 may also receive the additional information regarding the VR image from a separate server.

In operation S1950, the edge data network 1230 may generate second request information according to the method described with reference to FIG. 18. In operation S1960, the edge data network 1230 may transmit the second request information to the media server 1240. In operation S1970, the media server 1240 may generate first VR image data.

In operation S1980, the edge data network 1230 may receive the first VR image data from the media server 1240. When the media server 1240 is the first media server 1340, the edge data network 1230 may also receive first AI data regarding AI downscaling performed by the media server 1240. The VR image data generated based on the second request information may be data regarding an image in which at least a partial region among all of regions is AI-downscaled. This may correspond to operation S1830. Thereafter, in operation S1990, the edge data network may obtain the VR image by performing decoding on the first VR image data.

Figure 20:
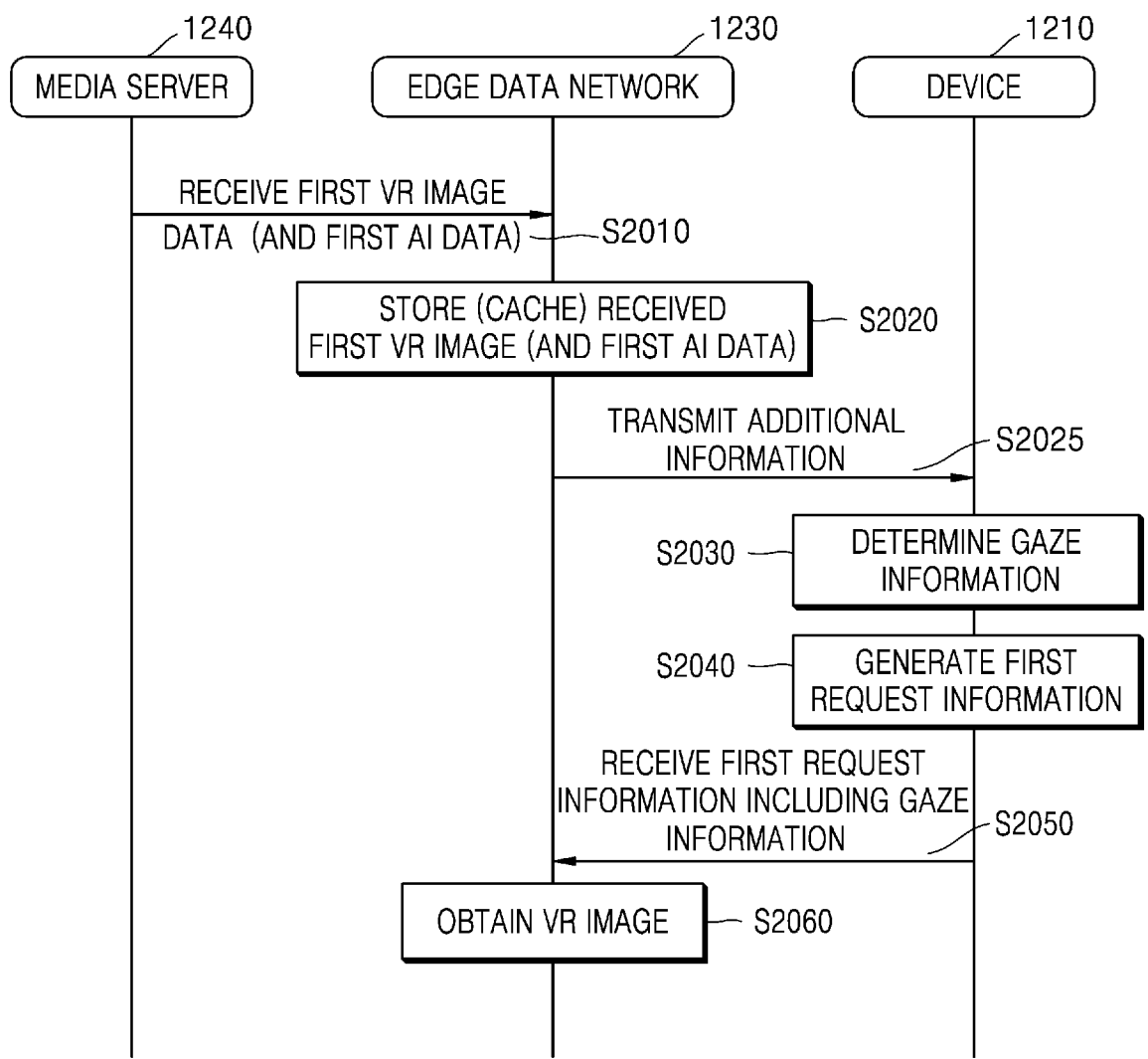
FIG. 20 is a diagram illustrating an example method, performed by an edge data network, of obtaining a VR image from a media server, according to various embodiments.

FIG. 20 is a diagram illustrating an example method, performed by an edge data network, of obtaining a VR image from a media server, according to various embodiments.

In operation S2010, the edge data network 1230 may receive first VR image data transmitted from the media server 1240. In operation S2020, the edge data network 1230 may store (cache) the received first VR image data. According to various embodiments, the edge data network 1230 may also receive first AI data from the media server and store the first AI data.

In operation S2025, the edge data network 1230 may transmit additional information to the device 1210. As described with reference to FIG. 19, the device 1210 may determine gaze information in operation S2030, generate first request information (including the gaze information) in operation S2040, and transmit the first request information to the edge data network 1230. In operation S2050, the edge data network 1230 may receive the first request information.

In operation S2060, the edge data network 1230 may obtain a VR image based on the first request information.

Figure 21:
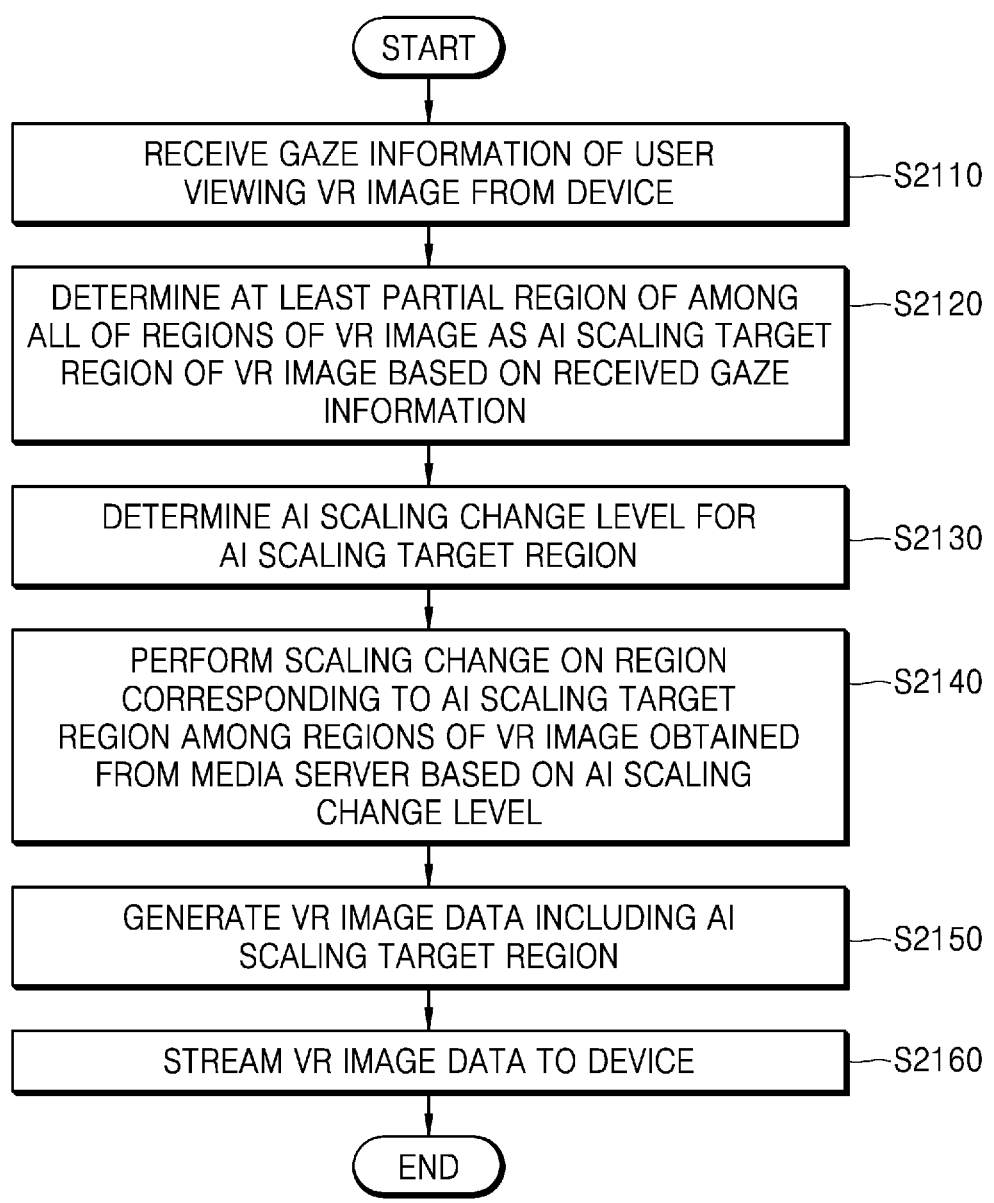
FIG. 21 is a flowchart illustrating an example method, performed by an edge data network, of streaming a VR image to a device, according to various embodiments.

FIG. 21 is a flowchart illustrating an example method, performed by an edge data network, of streaming a VR image to a device, according to various embodiments.

According to various embodiments, the edge data network may obtain a VR image from the media server. FIG. 21 shows a flow of streaming a VR image to the device 1210 in a situation where the edge data network 1230 obtains an image from the media server 1240 with reference to FIGS. 18, 19, and 20.

In operation S2110, the edge data network 1230 may receive gaze information of a user viewing a VR image from the device 1210.

More specifically, when the user watches the VR image through the device 1210, the edge data network 1230 may receive the user's gaze information generated by the device 1210 from the device 1210.

According to various embodiments, the edge data network 1230 may receive the user's gaze information from the device 1210 at specific time intervals. In this case, a period in which the edge data network 1230 receives the gaze information from the device 1210, for example, a time interval, may be preset.

According to other example embodiments, the edge data network 1230 may receive the user's gaze information from the device 1210 when a gaze change of the user is sensed. More specifically, the device 1210 may transmit the user's gaze information from the edge data network 1230 when the user's gaze information is changed due to the change of the gaze of the user. The edge data network 1230 may receive user's gaze information that is different from the user's gaze information received previously from the device 1210.

According to various embodiments, the edge data network 1230 may receive the user's gaze information from the device 1210 based on features of the VR image. More specifically, specific contents reproduced as a VR image in the device 1210 may request the user's gaze information at a preset time, and the device 1210 may determine the user's gaze information at a time preset in the contents and transmit the determined gaze information of the user to the edge data network 1230.

The edge data network 1230 may obtain information about a network state. In this case, information about the network state may include, for example, the above-described first network information and second network information.

As described above, the edge data network 1230 may receive the first request information regarding the VR image from the device 1210. In this case, the edge data network 1230 may receive the user's gaze information, included with the first request information regarding the VR image, from the device 1210. In another example, the edge data network 1230 may receive the user's gaze information, separately from other information of the first request information regarding the VR image, from the device 1210.

In operation S2120, the edge data network 1230 may determine at least a partial region among all of regions of the VR image as an AI scaling target region of the VR image, based on the received gaze information.

The edge data network 1230 may receive first network information from the device 1210, and the AI scaling target region may be determined based on at least one of the received gaze information or the first network information. A more detailed description will be provided below with reference to FIG. 23.

In the disclosure, the AI scaling target region may refer, for example, to a region to which AI scaling is to be applied among all of the regions of the VR image. For example, some regions among all of the regions of frames forming the VR image may be determined as an AI scaling target region. In another example, all of the regions of the frames constituting the VR image may be determined as an AI scaling target region. In this case, based on the determination of the edge data network 1230, AI upscaling or AI downscaling may be applied to the AI scaling target region.

According to various embodiments, referring to FIG. 14, the AI scaling target region may be one or more regions. For each of several AI scaling target regions, an AI scaling change level to be applied may be determined differently.

In operation S2130, the edge data network 1230 may determine an AI scaling change level for an AI scaling target region.

In the disclosure, the AI scaling change level may refer, for example, to a level of a resolution to which image data generated based on the received image data is to be upscaled or downscaled.

A detailed description will be provided below with reference to FIGS. 24 and 25.

In operation S2140, the edge data network 1230 may perform a scaling change on a region corresponding to the AI scaling target region among the regions of the VR image obtained from the media server 1240, according to the AI scaling change level.

The VR image obtained from the media server 1240 may refer, for example, to the first VR image 1341 or the original VR image 1346 according to FIG. 13. The descriptions thereof are already provided above and thus are not repeated here.

The edge data network 1230 may receive an image obtained by applying legacy scaling instead of AI scaling on the original image 1352 from the media server 1240. For example, when the media server 1240 does not support AI scaling, the media server 1240 may transmit the image obtained by application of legacy scaling to the edge data network 1230, and in this case, a VR image obtained from the media server 1240 may be an image obtained by applying legacy scaling on the original image 1352.

According to various embodiments, the edge data network 1230 may receive first image data and first AI data from the media server 1240 based on the second request information, which is already described with reference to FIGS. 18, 19, and 20.

According to various embodiments, the edge data network 1230 may perform an AI scaling change on a region corresponding to the AI scaling target region among the regions of the VR image obtained from the media server 1240, according to the determined AI scaling change level. Referring to FIG. 15, the edge data network 1230 may change configuration information of the fourth DNN according to the determined AI scaling change level. The edge data network 1230 may also perform AI scaling on an AI scaling target region corresponding to the determined AI scaling change level, based on the changed configuration information of the fourth DNN. A more detailed description will be provided below with reference to FIGS. 26A, 26B and 26C.

In operation S2150, the edge data network 1230 may generate VR image data including the AI scaling target region.

The edge data network 1230 may generate VR image data by encoding the VR image including the AI scaling target region. Referring to FIG. 15, the VR image data including the AI scaling target region may correspond to second VR image data generated by performing second encoding on the second-second VR image 1545.

In operation S2160, the edge data network 1230 may stream the VR image to the device 1210. Referring to FIGS. 15, 16, and 17, operation S2160 may correspond to a case in which the edge data network 1230 transmits second encoding data 1555 to the device 1210. According to various embodiments, the edge data network 1230 may transmit second AI data regarding the AI scaling change level to the device.

Figure 24:
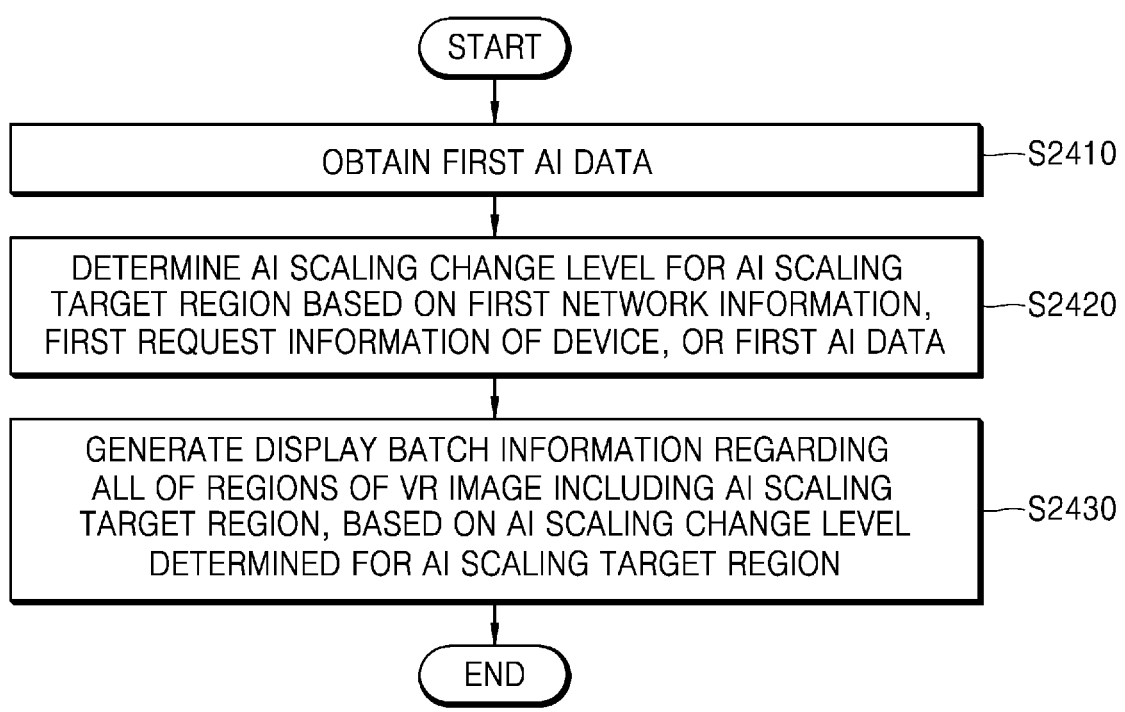
FIG. 24 is a flowchart illustrating an example method of determining an AI scaling change level with respect to an AI scaling target region, according to various embodiments.
Figure 25:
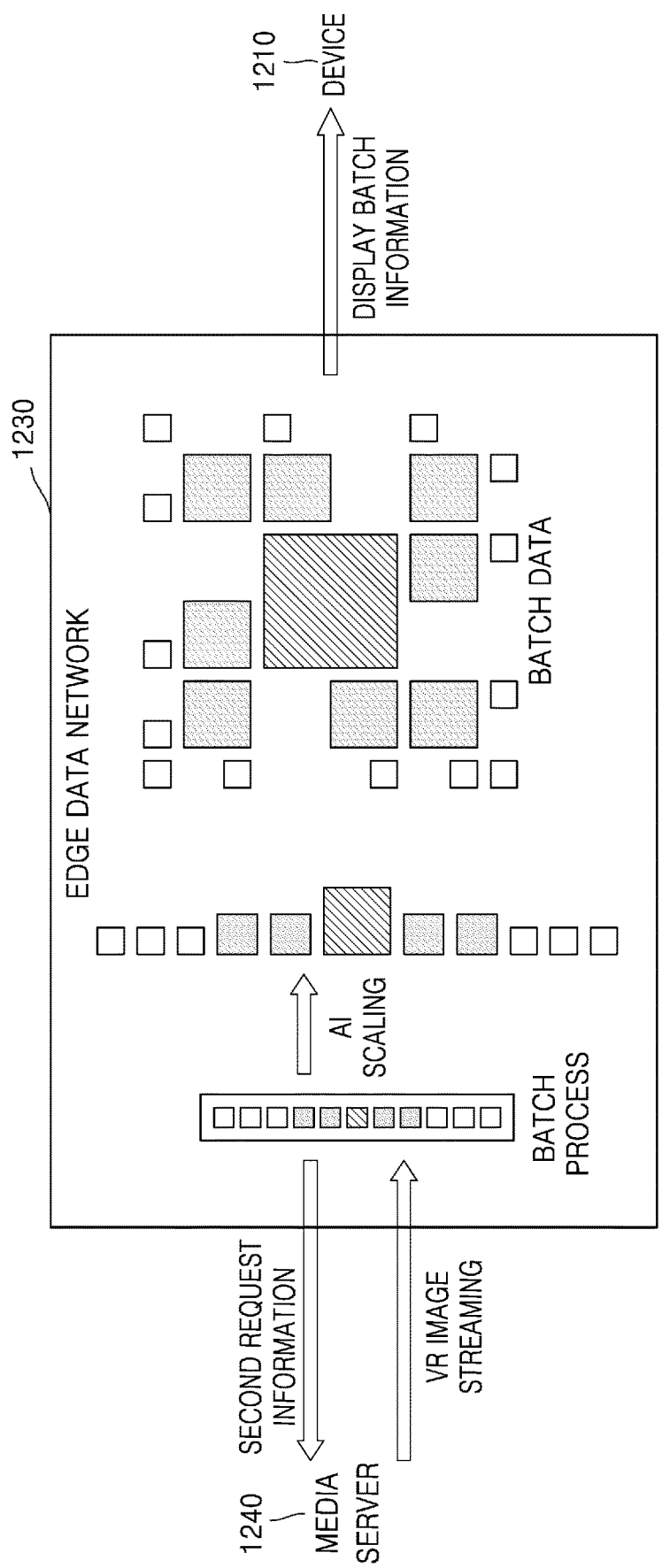
FIG. 25 is a diagram illustrating an example method, performed by an edge data network, of generating display batch information, according to various embodiments.

According to various embodiments, the edge data network 1230 may transmit display batch information generated for each AI scaling target region to the device 1210 according to FIGS. 24 and 25. In another example, the edge data network 1230 may transmit the display batch information generated for each tile divided from the VR image to the device.

Figure 22:
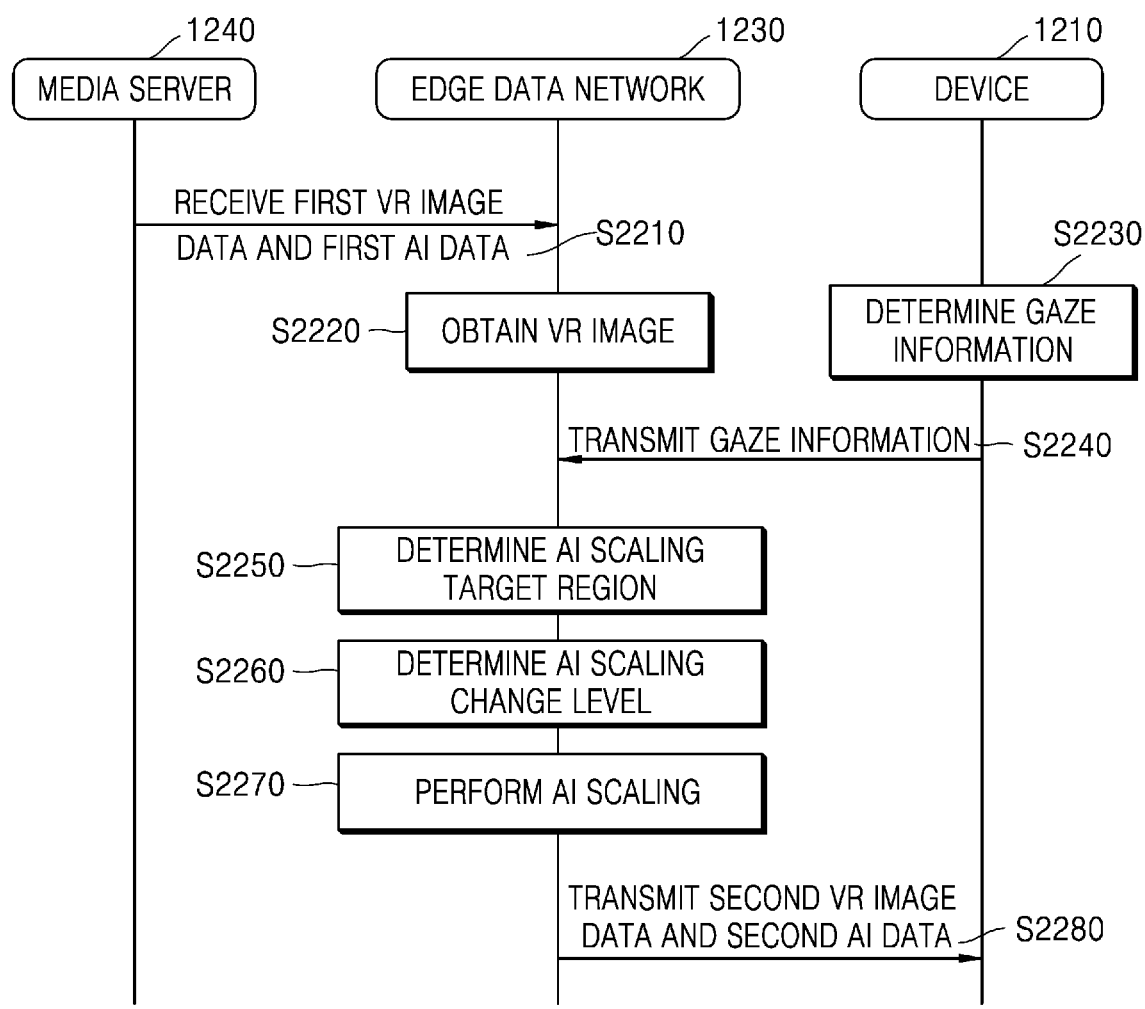
FIG. 22 is a data transmission/reception flow diagram illustrating an example method, performed by an edge data network, of streaming a VR image to a device, according to various embodiments.

FIG. 22 is a data transmission/reception flow diagram illustrating an example method, performed by an edge data network, of streaming a VR image to a device, according to various embodiments.

Descriptions redundant to descriptions provided above will be avoided.

In operation S2010, the edge data network 1230 may receive first VR image data transmitted by the media server 1240. In this case, first AI data may also be transmitted. In operation S2220, the edge data network 1230 may obtain a VR image in the same manner as described with reference to FIGS. 18, 19, and 20.

The device 1210 may determine user's gaze information in operation S2230, and the edge data network 1230 may receive the gaze information transmitted by the device 1210 in operation S2240. In this case, the edge data network 1230 may receive first the gaze information from the device 1210 and then obtain the VR image from the media server 1240.

In operation S2250, the edge data network 1230 may determine an AI scaling target region. In operation S2260, the edge data network 1230 may determine an AI scaling change level. In operation S2270, the edge data network 1230 may perform AI scaling. In operation S2280, the edge data network 1230 may transmit second VR image data and second AI data. Each operation will be described in detail below.

Figure 23:
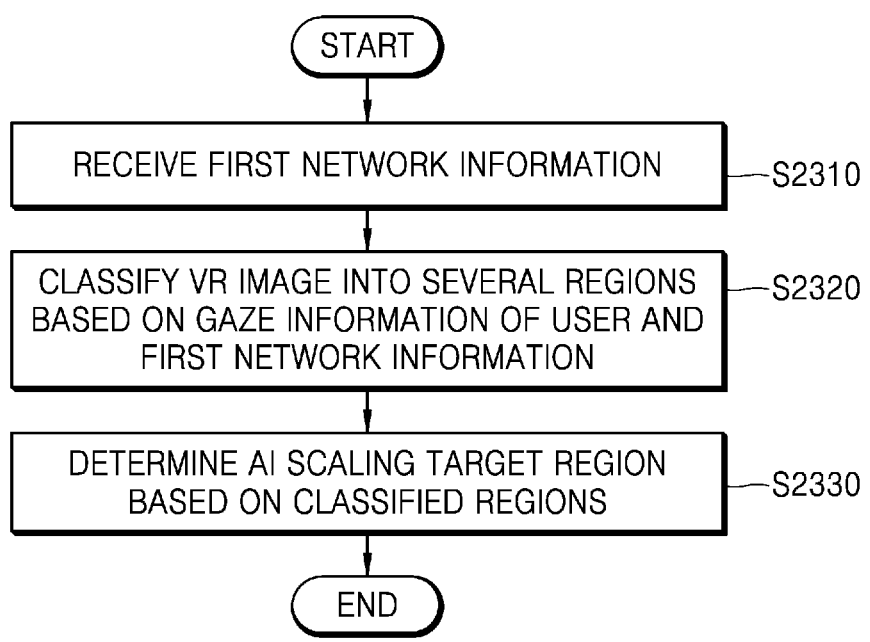
FIG. 23 is a flowchart illustrating an example method of determining at least a partial region among all of regions of a VR image as an AI scaling target region of the VR image, according to various embodiments.

FIG. 23 is a flowchart illustrating an example method of determining at least a partial region among all of regions of a VR image as an AI scaling target region of the VR image, according to various embodiments. FIG. 23 may correspond to operation S2120 of FIG. 21 and operation S2250 of FIG. 22, and descriptions redundant to those provided above will not be repeated.

In operation S2310, the edge data network 1230 may receive first network information regarding a network environment between the edge data network 1230 and the device 1210.

In operation S2320, the edge data network 1230 may classify the VR image into several regions based on user's gaze information and the first network information.

In operation S2330, the edge data network 1230 may determine an AI scaling target region based on the classified regions.

According to an example, referring to FIG. 14, there may be three AI scaling target regions which may include an ROI, a viewing region, and a non-viewing region. For convenience of a description, a description will be made assuming that the first region 1410 of FIG. 14 is an ROI, the second region 1420 is a viewing region, and the third region 1430 is a non-viewing region.

To facilitate a description, the description will be made with reference to FIG. 13. Referring to FIG. 13, the first media server 1340 may obtain the original image 1351 having the fourth quality (e.g., a resolution of 8K over the entire area thereof). The first media server 1340 may obtain the first VR image 1341 by performing AI downscaling such that the entire area of the first VR image 1341 has the second quality (e.g., a resolution of 2K over the entire area). The edge data network 1330 may apply AI upscaling to the first region 1410 such that the first region 1410 has the fourth quality (e.g., a resolution of 8K over the entire region), and apply AI upscaling to the second region 1420 such that the second region 1420 has the third quality (e.g., a resolution of 4K over the entire region). The edge data network may determine to apply AI downscaling to the third region such that the third region has the first quality (e.g., a resolution of 2K over the entire region).

According to another example, the edge data network 1330 may determine to apply AI upscaling to the first region 1410. Among all of the regions of the frames constituting the VR image, the viewing region and the non-viewing region may be determined to not be AI scaling target regions, and AI scaling may not be applied thereto.

According to another example, the edge data network 1330 may classify the VR image into several regions depending on a level at which the VR image matches with the gaze information, and determine each of the several regions as an AI scaling target region. In this case, the edge data network may perform AI upscaling on an upper region having a high level of matching with the user's gaze information with a higher AI scaling change level than that of a lower region having a low level of matching with the user's gaze information. That is, referring to FIG. 14, the AI scaling change level may be set differently for respective tiles included in each of the first region, the second region, and the third region.

According to another embodiment of the disclosure, the edge data network 1330 may classify the ROI or the viewing region into several regions depending on a level at which the ROI or the viewing region matches the user's gaze information, and determine each of the several regions as an AI scaling target region.

However, for convenience of a descriptions, all of the regions of frames constituting the VR image may be merely classified into the ROI, the viewing region, and the non-viewing region, but the AI scaling target regions are not limited to the ROI, the viewing region, and the non-viewing region. The AI scaling target regions may be determined based on the gaze information received from the device 1210. In addition, the AI scaling target regions may not be limited to three regions.

FIG. 24 is a flowchart illustrating an example method of determining an AI scaling change level with respect to an AI scaling target region, according to various embodiments of the disclosure.

FIG. 24 may correspond to operation S2130 of FIG. 21 and operation S2260 of FIG. 22.

According to various embodiments, the edge data network 1230 may determine a different AI scaling change level for each AI scaling target region. For example, when the edge data network determines the first region 1410, the second region 1420, and the third region 1430 as AI scaling target regions, higher AI scaling change levels may be assigned to the first region 1410, the second region 1420, and the third region 1430 in that order.

In operation S2410, when the media server 1240 is the first media server 1340, the edge data network 1230 may obtain first AI data. When the media server 1240 is the second media server 1345 (a media server that does not support AI codec), the edge data network 1230 may not obtain the first AI data.

In operation S2420, the edge data network 1230 may determine an AI scaling change level for an AI scaling target region based on at least one of first network information regarding a network environment between an edge data network and a device, first request information of a device regarding a VR image, or the first AI data regarding AI scaling performed by the media server.

The following description will be made for example embodiments in which the edge data network 1230 determines an AI scaling change level for an AI scaling target region.

For example, an example embodiment will be described in which the edge data network 1230 determines an AI scaling change level for an AI scaling target region, based on the first network information. The edge data network 1230 may determine that a network state between the edge data network 1230 and the device 1210 is good when a complexity obtained from the first network information is less than a reference value. In this case, the edge data network 1230 may determine an AI scaling change level to perform AI upscaling on an AI scaling target region. That is, the edge data network 1230 may determine an AI scaling change level to transmit an AI-upscaled image to the device 1210. In another example, the edge data network 1230 may determine that a network state between the edge data network 1230 and the device 1210 is poor when the complexity obtained from the first network information is higher than the reference value. In this case, the edge data network 1230 may determine an AI scaling change level to perform AI upscaling on an AI scaling target region. That is, the edge data network 1230 may determine an AI scaling change level to transmit an AI-downscaled image to the device 1210.

An example embodiment is provided in which the edge data network 1230 determines an AI scaling change level for an AI scaling target region, based on the first network information. The edge data network 1230 may determine an AI scaling change level for an AI scaling target region, based on the first request information regarding the VR image received from the device 1210. More specifically, the edge data network 1230 may determine an AI scaling change level for an AI scaling target region according to device information included in the first request information. The edge data network 1230 may determine an AI scaling change level for an AI scaling target region by obtaining information about a capability of the device 1210 from the device information.

That is, the edge data network 1230 may determine an AI scaling target region and an AI scaling change level by determining AI codec support of the device 1210 and a level of AI scaling change that may be performed by the device 1210. More specifically, the edge data network 1230 may determine whether the device 1210 is capable of performing AI scaling, based on information about support or non-support of the device 1210 for an AI codec (whether the device 1210 is the first device 1310 or the second device 1315). Even when the device 1210 is capable of performing AI scaling, a level of AI scaling change that may be performed by the device 1210 may differ with performance and capacity of the device 1210, such that the edge data network 1230 may determine an AI scaling change level based on information about the capacity of the device 1210.

An example embodiment is provided in which the edge data network 1230 determines an AI scaling change level for an AI scaling target region, based on the first AI data. According to an example embodiment, the edge data network 1230 may determine an AI scaling change level for an AI scaling target region, based on the first AI data received from the media server 1240. In this case, the first AI data may include in the VR image obtained from the media server 1240, information about whether AI scaling is performed, an AI scaling change level when AI scaling is applied to VR image data, decoding information of image data, etc. More specifically, the edge data network 1230 may receive the first AI data from the media server 1240 and identify, from the first AI data, a quality of the original image and a level at which the VR image received from the media server 1240 is downscaled.

For example, it may be assumed that the edge data network 1230 may identify the first AI data such that the original image of the VR image currently received from the media server 1240 has the fourth quality (e.g., a resolution of 8K over the entire area) and the VR image, which has been AI-downscaled by ½ from the original image and thus has the third quality (e.g., a resolution of 4K over the entire area), is received from the media server 1240. The edge data network 1230 may determine based on the first AI data that an image that is AI-upscaled by 2 may be generated.

In operation S2430, the edge data network 1230 may generate display batch information regarding all regions of the VR image including an AI scaling target region, based on an AI scaling change level determined for the AI scaling target region.

When the edge data network 1230 determines an AI scaling change level, the edge data network 1230 may generate display batch information regarding each AI scaling target region. In this case, the edge data network 1230 may generate the display batch information regarding the AI scaling target region, based on the AI scaling change level determined for the AI scaling target region. This will be described in more detail with reference to FIG. 25.

FIG. 25 is a diagram illustrating an example method, performed by an edge data network, of generating display batch information, according to various embodiments.

The device 1210 needs to display received VR image data based on an AI scaling change level applied to each AI scaling target region. Thus, after the edge data network 1230 performs AI scaling, the edge data network 1230 may transmit information about how each scaling target region may be displayed, based on an AI scaling change level applied to each AI scaling target region.

More specifically, the edge data network 1230 may determine display batch information regarding each AI scaling target region based on an AI scaling change level for each region, screen information that may be output from the device 1210, output information of the VR image, VR image rendering information, etc.

The edge data network 1230 may transmit the display batch information to the device 1210. The device 1210 having received the display batch information may generate the VR image data received from the edge data network 1230 as an output VR image, based on the display batch information.

Figure 26A:
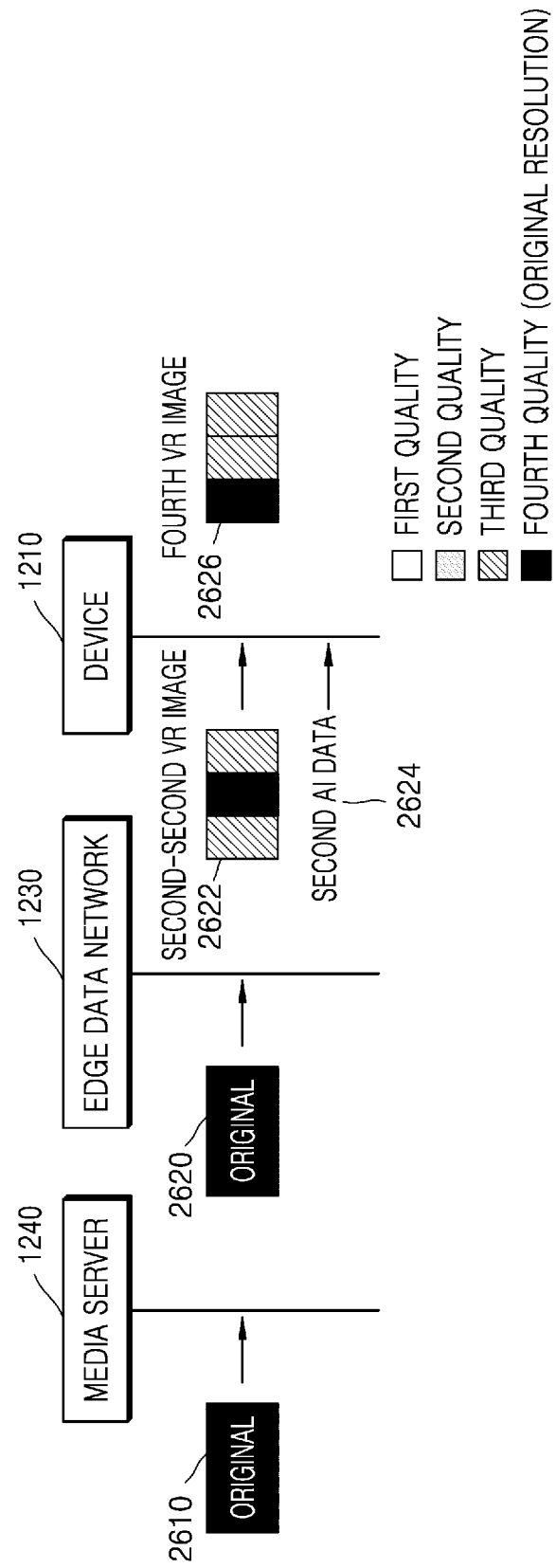
FIGS. 26A, 26B and 26C are diagrams illustrating an example AI scaling change method of an edge data network, according to an various embodiments.
Figure 26B:
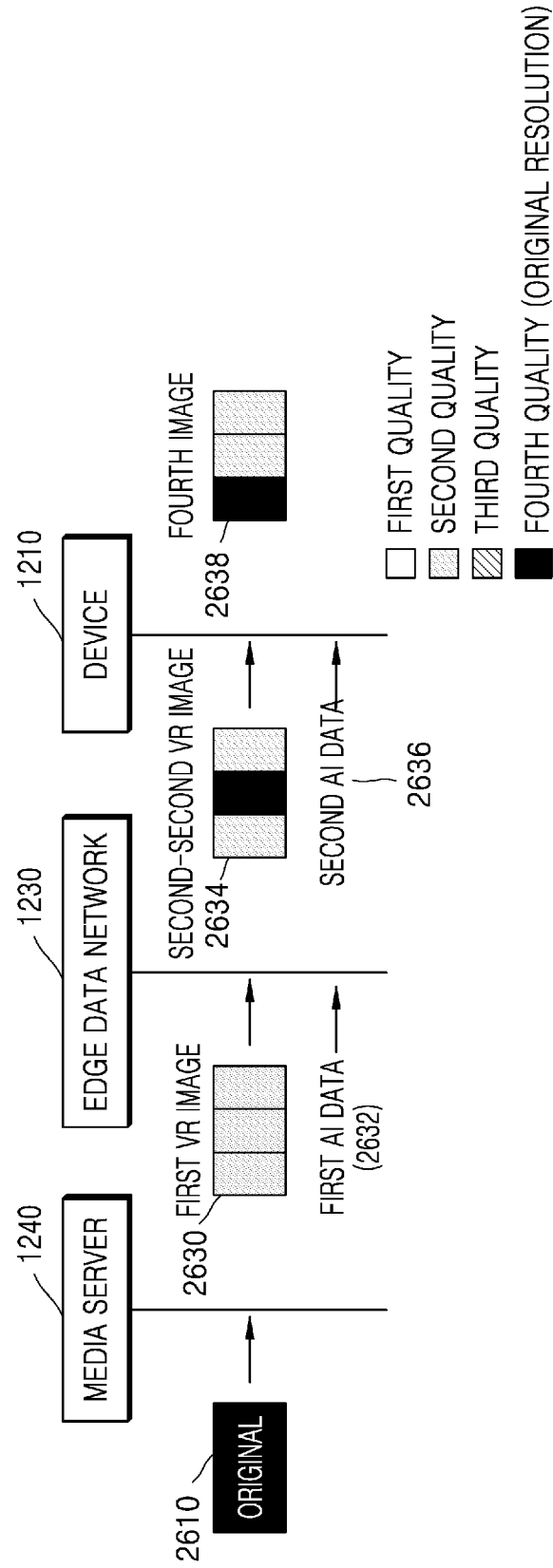
Figure 26C:
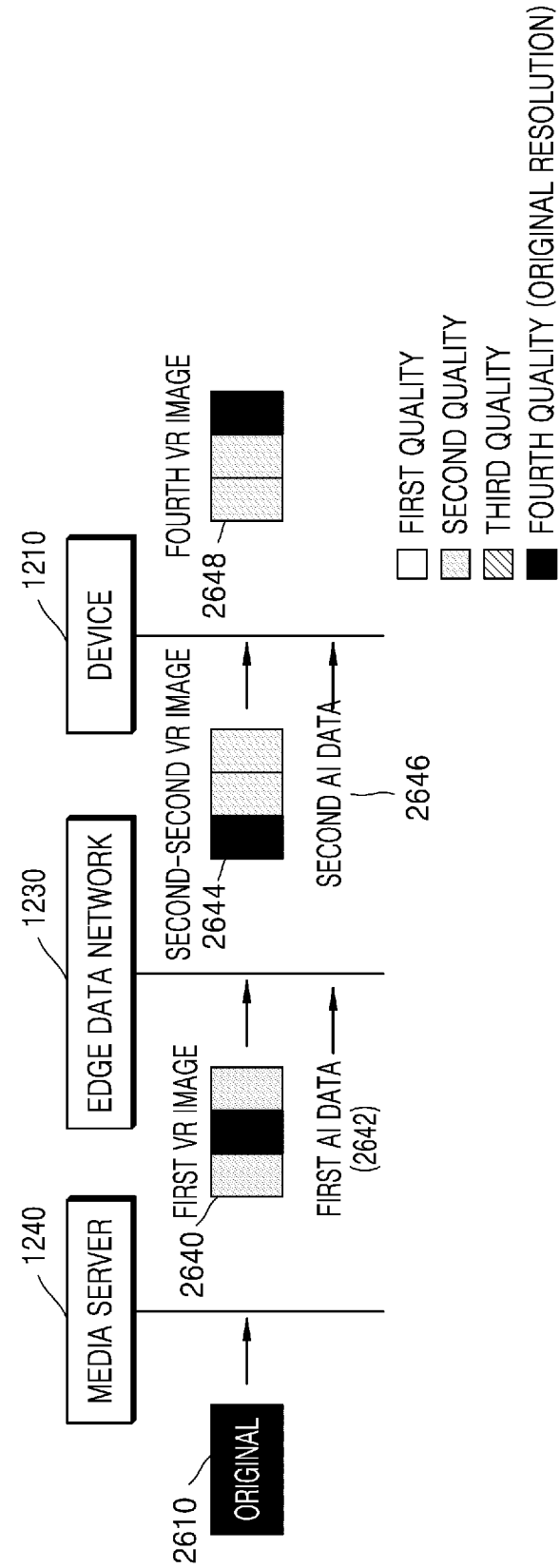

FIGS. 26A, 26B and 26C are diagrams illustrating an example AI scaling change method of an edge data network, according to various embodiments.

When the disclosure is described with reference to FIGS. 13 and 14, it is assumed that the user's ROI is changed in the order of the first region 1410, the second region 1420, and the third region 1430. While a description will be made assuming that the quality of an original VR image 2610 requested by the device 1210 is the fourth quality (e.g., a resolution of 8K over the entire area), this is merely for convenience and the disclosure is not limited thereto.

Referring to FIG. 26A, according to various embodiments, it may be assumed that the edge data network 1230 obtains an original image 2620 in place of AI encoding data from the media server 1240. For example, the media server 1240 may be the second media server 1345 as shown FIG. 16. As shown in FIG. 15, even when the media server 1240 is the first media server 1340, the edge data network 1230 may not request the AI encoding data depending on the performance, capacity, and second network environment of the media server 1240.

The edge data network 1230 may receive an original VR image 2620 of the fourth quality (e.g., a resolution of 8K over the entire area of the image) that is the same as the quality of the original VR image 2610 from the media server 1240. That is, data received by the edge data network 1230 may be encoding data, but may have not been subject to scaling change. That is, referring to FIG. 15, this may be a case where AI downscaling information is not included in first AI data of first encoding data. However, in this case, information indicating that AI scaling has not been performed may be included in the first encoding data instead. Alternatively, as shown in FIG. 16, this may be a case where the first AI data is not generated.

Referring to FIG. 26A, based on the edge data network 1230 determining based on the first network information that the state of the first network environment is good, the edge data network 1230 may transmit the first region 1410 to the device 1210 while maintaining the quality of the original image. The edge data network 1230 may determine for an original VR image 2620 received from the media server 1240 to transmit, to the device 1210, a second-second VR image 2622 in which the quality of the first region 1410 that is an ROI is maintained and the second region 1420 and the third region 1430 are AI-downscaled by ½ times (i.e., a resolution of 4K).

In this case, the edge data network 1230 may configure configuration information of the fourth DNN to perform AI downscaling by ½ on the second region 1420 and the third region 1430 of the original VR image 2620 obtained from the media server 1240.

The edge data network 1230 may generate second AI data 2624 including information indicating that the edge data network 1230 has performed AI downscaling by ½ on the second region 1420 and the third region 1430 of the original VR image 2620 obtained from the media server 1240 in order for the fifth DNN to obtain the resolution (the fourth quality) of the original image. The second AI data 2624 may include the information indicating that the original VR image 2610 has had the fourth quality.

The edge data network 1230 may transmit the second AI data 2624 to the device 1210. Thereafter, the ROI of the device 1210 may be changed to the second region 1420. In this case, the device 1210 may determine, based on the second AI data 2624, that the second region 1420 of the received second-second VR image 2622 has been AI-downscaled by ½. The device 1210 may change configuration of the fifth DNN based on identified information such that the second region 1420 is AI-upscaled by 2. The first region 1410 is not an ROI any longer, such that the device 1210 may set the first region 1410 as an AI scaling target region and perform AI downscaling on the first region 1410. Through the foregoing process, the device 1210 may obtain a fourth VR image 2626 in which a region (the second region 1420) corresponding to updated gaze information is changed to have the original quality.

Referring to FIG. 26B, according to various embodiments, it may be seen that the edge data network 1230 receives from the media server 1240, a first VR image 2630 having the second quality (e.g., a resolution of 2K over the entire area thereof) by performing AI downscaling by ¼ times on the original VR image 2610. The edge data network 1230 also receives first AI data 2632.

The edge data network 1230 may determine for the first VR image 2630 received from the media server 1240, to the device 1210, to transmit a second-second VR image 2634 having the fourth quality (e.g., a resolution of 8K) upscaled from the quality of the first region 1410. For example, when the edge data network 1230 determines based on the first network information that the state of the first network environment is good, the edge data network 1230 may upscale the first region 1410 that is an ROI to the resolution (the fourth quality) of the original image and transmit the upscaled first region 1410 to the device 1210. In this case, the edge data network 1230 may configure the configuration information of the fourth DNN to perform AI upscaling by 4 on the first region 1410 of the first VR image 2630 obtained from the media server 1240.

The edge data network 1230 may generate second AI data 2636 including information indicating that the edge data network 1230 has performed AI upscaling by 4 on the first region 1410 of the first VR image 2630 obtained from the media server 1240 in order for the fifth DNN to obtain the quality of the original image. The second AI data 2636 may include the information indicating that the original VR image 2610 has had the fourth quality. By using the foregoing method, the fifth DNN of the device 1210 may be allowed to perform an AI upscaling level (an AI upscaling target) by considering the quality of the original image 2610 in AI upscaling.

The device 1210 may change the configuration information of the fifth DNN regarding the second region 1420 based on the second AI data 2636 when the ROI of the device 1210 is changed to the second region 1420. The device 1210 may perform AI upscaling on the second region 1420 to the fourth quality and AI downscaling on the first region 1410 and output fourth image 2638.

Referring to FIG. 26C, according to various embodiments, the media server 1240 may perform the aforementioned function of the edge data network 1230.

According to various embodiments, the media server 1240 may receive user's gaze information from the edge data network 1230. When the media server 1240 transmits VR image data to the edge data network 1230 based on the user's gaze information, the amount of data to be transmitted and received between the media server 1240 and the edge data network 1230 may be reduced.

The media server 1240 may determine an AI scaling target region based on the received gaze information of the user and determine an AI scaling change level for the AI scaling target region. The media server 1240 may then perform AI scaling based on the AI scaling change level for the AI scaling target region.

That is, when the media server 1240 determines that the current gaze information of the user corresponds to the first region 1410, the media server 1240 may determine to maintain the first region 1410 at the original resolution. On the other hand, for efficiency of transmission, the media server 1240 may generate a first VR image 2640 in which the second region 1420 and the third region 1430 of the original VR image 2610 are AI-downscaled to the second quality. The media server 1240 may generate first AI data 2642 corresponding to the performed AI scaling. The first AI data 2642 may include information about a level of AI downscaling performed by the media server 1240. The edge data network 1230 may determine an AI scaling target region and an AI scaling change level corresponding to AI scaling performed by the media server 1240 from the first AI data 2642.

When the edge data network 1230 receives, from the device 1210, information indicating that the ROI corresponding to the user's gaze information has been changed to the second region 1420, the edge data network 1230 may determine the second region 1420 as the AI scaling target region and determine the AI scaling change level for the second region 1420 based on the first AI data. Thus, the edge data network 1230 may perform AI upscaling on the second region 1420 and AI downscaling on the first region 1410 to obtain a second-second VR image 2644.

When the ROI of the device 1210 is changed to the third region 1430, the device 1210 may change the configuration information of the fifth DNN regarding the third region 1430 based on second AI data 2646. The device 1210 may perform AI upscaling on the third region 1430 to the fourth quality and AI downscaling on the second region 1420 to output fourth VR image 2648.

Figure 27:
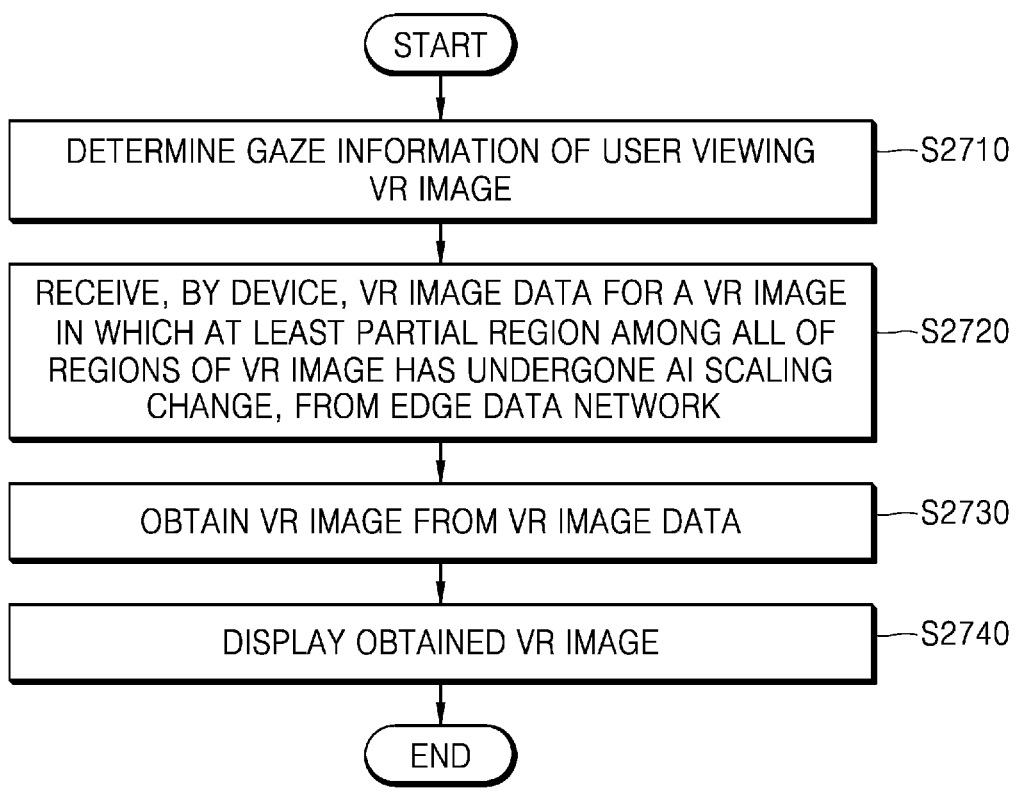
FIG. 27 is a flowchart illustrating an example method, performed by a device, of streaming a VR image from an edge data network, according to various embodiments.

FIG. 27 is a flowchart illustrating an example method, performed by the device 1210, of streaming a VR image from the edge data network 1230, according to various embodiments.

The flowchart shown in FIG. 27 may be applied to either a case in which the device 1210 is the first device 1310 or a case in which the device 1210 is the second device 1315. A more detailed operation in the case in which the device 1210 is the first device 1310 will be described below with reference to FIG. 28.

In operation S2710, the device 1210 may determine gaze information of a user viewing a VR image.

According to various embodiments, the device 1210 may determine the user's gaze information at specific time intervals. In this case, a period in which the device 1210 determines the gaze information, e.g., a time interval, may be preset.

According to various embodiments, the device 1210 may transmit the user's gaze information to the edge data network 1230. This operation corresponds to foregoing operation S2110, and thus the description will not be repeated here.

In operation S2720, the device 1210 may receive, from the edge data network 1230, VR image data for a VR image in which at least a partial region among all of regions of the VR image has undergone AI scaling change.

Referring to FIGS. 15 and 16, operation S2720 may correspond to a case in which the first device 1310 receives the second encoding data 1555 and 1655 from the edge data network 1330. As described above, the second encoding data 1555 and 1655 may include second VR image data and second AI data. The first device 1310 may perform third AI scaling based on the second AI data.

Referring to FIG. 17, operation S2720 may correspond to a case in which the second device 1315 receives the second encoding data 1755 from the edge data network 1330.

In operation S2730, the device 1210 may obtain a VR image from the VR image data.

According to various embodiments, the device 1210 may obtain the VR image by performing decoding based on the received VR image data. More specifically, referring to FIGS. 15, 16, and 17, operation S2730 may correspond to a process in which the first device 1310 or the second device 1315 obtains third VR images 1565, 1665, 1765 by performing second decoding based on second encoding data 1555, 1655, 1755.

According to various embodiments, as shown in FIGS. 15 and 16, when the device 1210 is the first device 1310, the device 1210 may perform third AI scaling on the obtained third VR images 1565 and 1665.

More specifically, the device 1210 may determine at least a partial region among all of regions of the VR image as an AI scaling target region of the VR image, based on the user's gaze information. The device 1210 may determine an AI scaling change level for the AI scaling target region. The device 1210 may also perform a scaling change on a region corresponding to the AI scaling target region among the regions of the VR image obtained from the edge data network 1230, according to the AI scaling change level. A corresponding detailed operation has already been described with reference to FIGS. 21 through 26C, and an operation of the edge data network 1230 may also be performed by the device 1210.

More specifically, when the device 1210 determines the AI scaling change level for the AI scaling target region, the device 1210 may receive second AI data regarding AI scaling performed by the edge data network 1230 from the edge data network 1230. The device 1210 may change the AI scaling change level for the AI scaling target region based on at least one of the second AI data or the user's gaze information.

In another example, as shown in FIG. 17, when the device 1210 is the second device 1315, the device 1210 may perform third AI scaling on the obtained third VR image 1765.

In this case, the device 1210 may perform rendering on the obtained third VR image 1765 or an image obtained by applying third AI scaling on the third VR images 1565 and 1665.

According to various embodiments, the device 1210 may receive display batch information regarding the AI scaling target region from the edge data network 1230. The device 1210 may combine regions of the VR image included in the VR image data based on the display batch information. In this case, the regions of the VR image included in the VR image data may include the AI scaling target region. When the device 1210 receives display batch information for each tile divided from the VR image, the device 1210 may combine tiles based on the display batch information. The device 1210 may perform interpolation on the combined regions.

In operation S2740, the device 1210 may display the obtained VR image.

Referring to FIGS. 15, 16, and 17, operation S2740 may correspond to a case in which the first device 1310 or the second device 1315 outputs fourth VR images 1575, 1675, and 1775.

Figure 28:
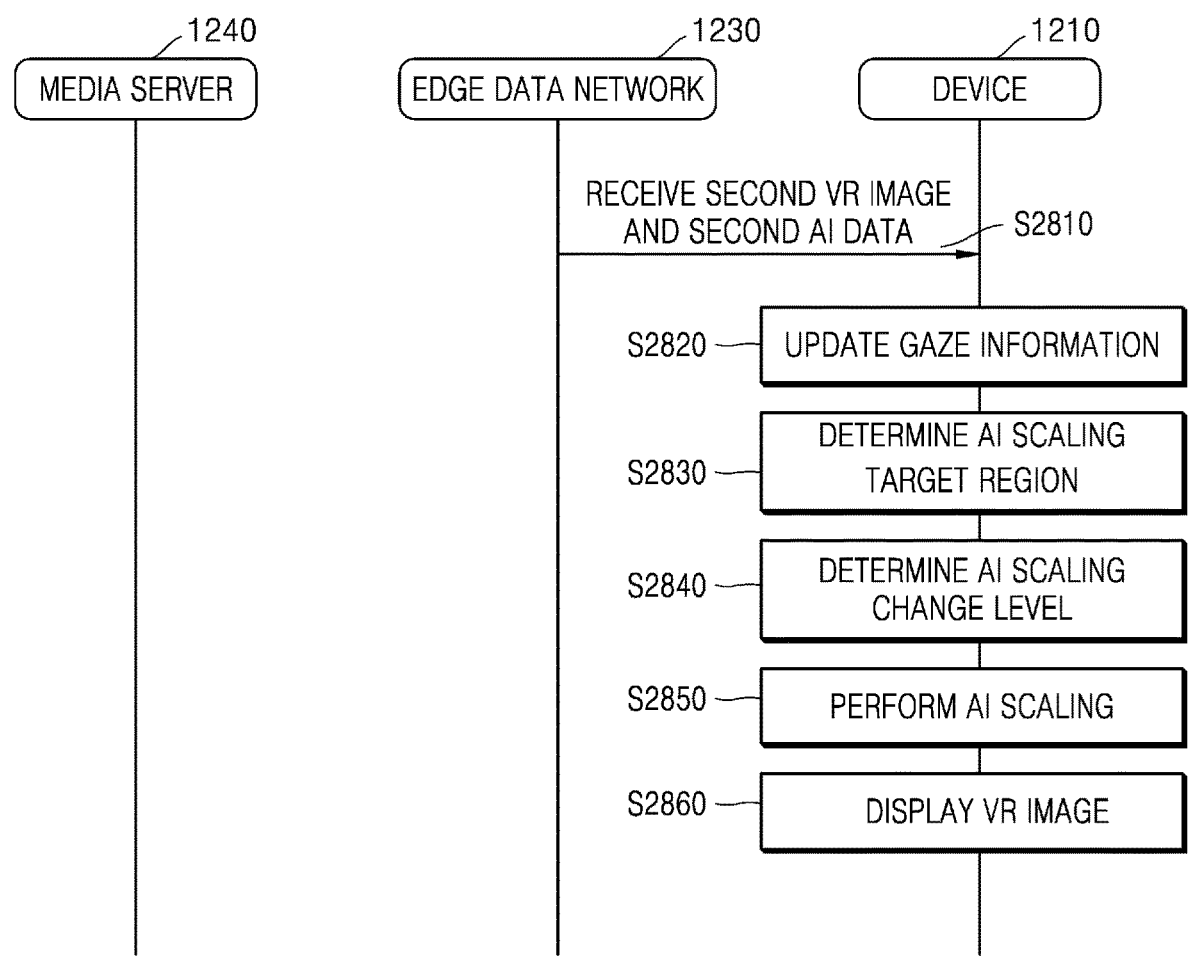
FIG. 28 is a diagram illustrating example data flow when a device is a first device, according to various embodiments.

FIG. 28 is a diagram illustrating an example data flow when a device is a first device, according to various embodiments.

A basic operation of the device 1210 has already been described with reference to FIG. 27, and a description of components when the device 1210 is the first device 1310 has already been provided with reference to FIGS. 15 and 16 and thus will not be repeated here.

The device 1210 shown in FIG. 27 may refer, for example, to the first device 1310. In operation S2810, the device 1210 may receive second VR image data and second AI data transmitted from the edge data network 1230.

In operation S2820, the device 1210 may determine updated gaze information of a user.

In operations S2830 and S2840, the device 1210 may determine an AI scaling region and an AI scaling change level for VR image data based on the updated gaze information of the user. The device 1210 may perform the AI scaling change on the VR image data based on the updated user's gaze information, AI data, VR stitch information, etc. This may be an operation of the edge data network 1230 and may correspond to operations S2120 through S2140 described above.

In operation S2850, the device 1210 may perform AI scaling. In operation S2860, the device 1210 may display a generated VR image.

Figure 29:
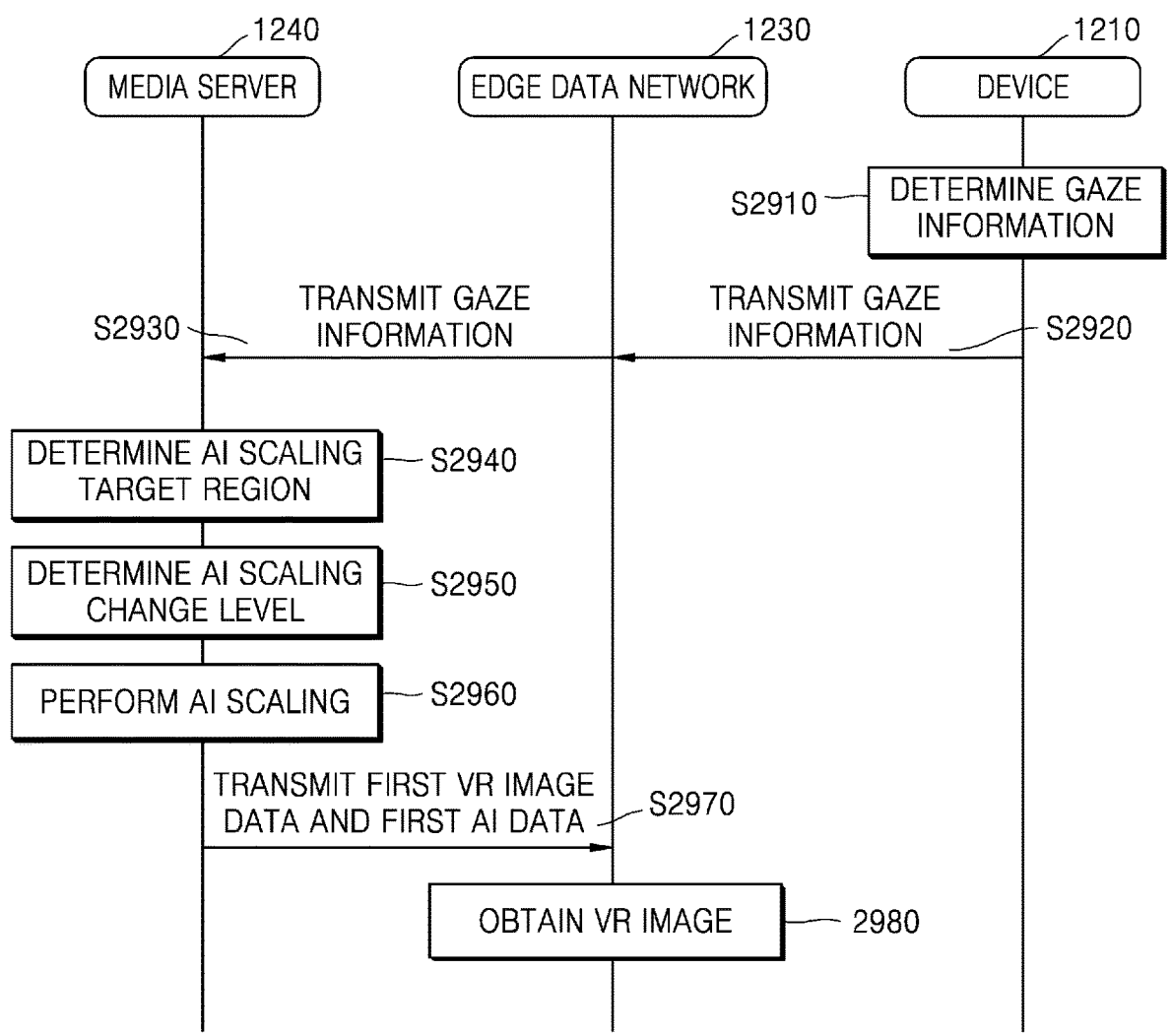
FIG. 29 is a diagram illustrating an example data flow when a media server is a first media server, according to various embodiments.

FIG. 29 is a diagram illustrating an example data flow when a media server is a first media server, according to various embodiments.

A basic operation of the media server 1240 is already described with reference to the foregoing drawings, and thus this description will not be repeated here. The media server 1240 shown in FIG. 29 may refer, for example, to the first media server 1340.

In FIG. 29, operations S2940, S2950, and S2960 performed by the media server 1240 may correspond to operations S2120 through S2140 of the edge data network 1230 described above.

In operation S2910, the device 1210 may determine gaze information. In operation S2920, the device 1210 may transmit the gaze information to the edge data network 1230.

In operation S2930, the edge data network 1230 may transmit the gaze information to the media server 1240. In this case, as described with reference to FIGS. 18 and 19, the edge data network 1230 may transmit second request information (including the gaze information) to the media server 1240. The second request information may include at least one of the gaze information of the user viewing a VR image, device information, image information, second network information, or media server information.

Thereafter, the media server 1240 may generate VR image data based on the second request information. That is, in operation S2940, the media server 1240 may determine an AI scaling target region. In operation S2950, the media server 1240 may determine an AI scaling change level. In operation S2960, the media server 1240 may perform AI scaling.

More specifically, the media server 1240 may determine at least a partial region among all of regions of the VR image as an AI scaling target region of the VR image. The media server 1240 may determine an AI scaling change level for the AI scaling target region. The media server 1240 may also perform a scaling change on a region corresponding to the AI scaling target region among the regions of the VR image requested from the edge data network 1230, according to the AI scaling change level.

The media server 1240 may change the AI scaling change level for the AI scaling target region based on at least one of the gaze information of the user or the second network information to determine the AI scaling change level for the AI scaling target region.

In operation S2970, the media server 1240 may transmit first VR image data and first AI data to the edge data network 1230.

In operation S2980, the edge data network 1230 may obtain a VR image.

Figure 30:
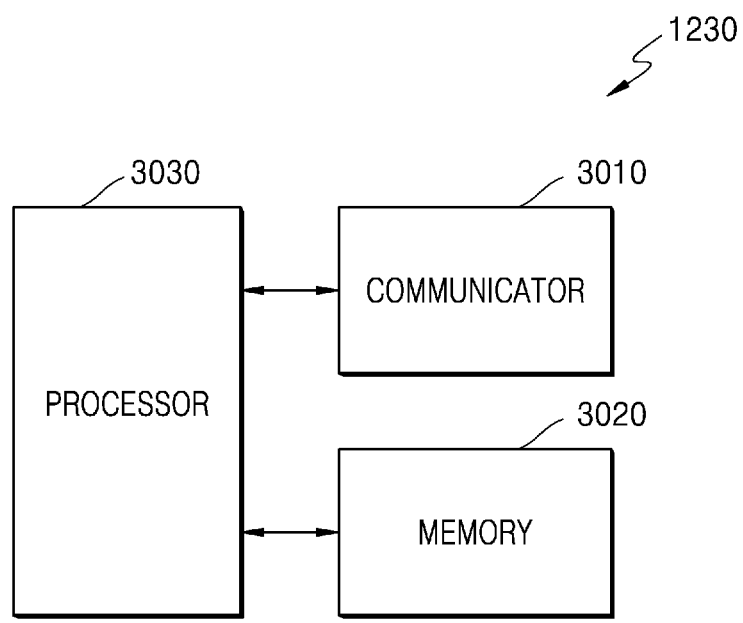
FIG. 30 is a block diagram illustrating an example structure of an edge data network according to various embodiments.
Figure 31:
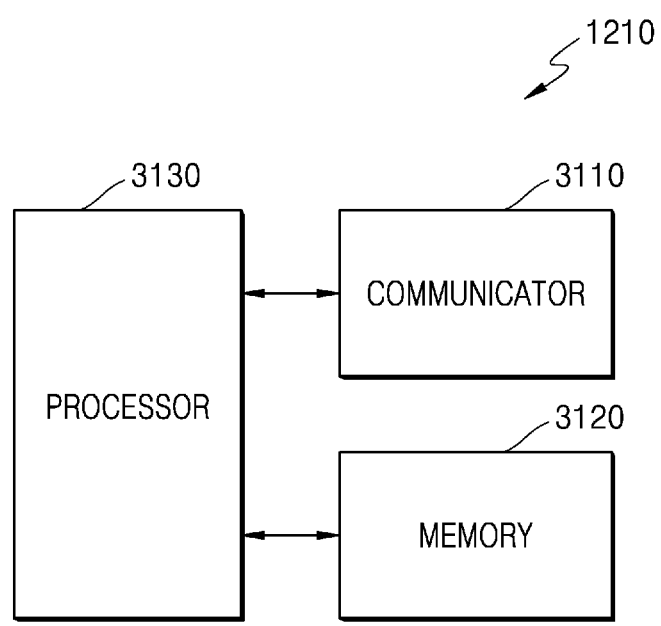
FIG. 31 is a block diagram illustrating an example device according to various embodiments.
Figure 32:
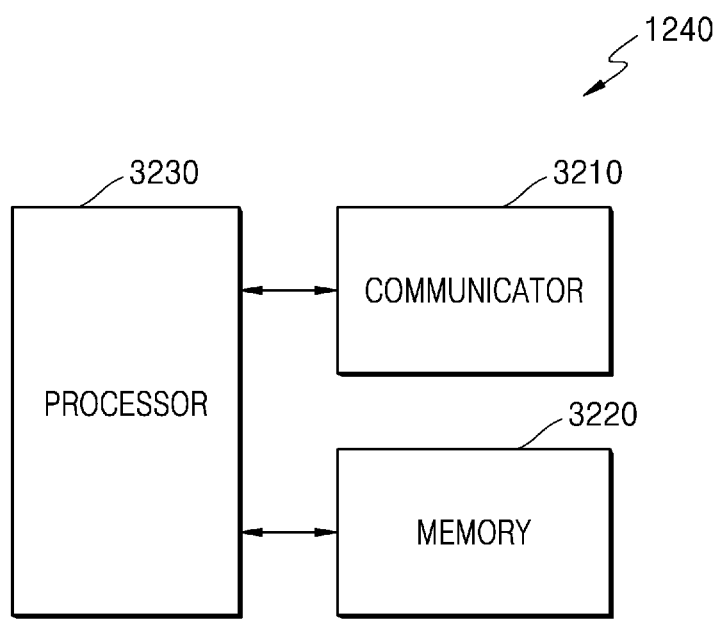
FIG. 32 is a block diagram illustrating an example media server according to various embodiments.

FIGS. 30, 31, and 32 illustrate example structures of the edge data network 1230, the device 1210, and the media server 1240, respectively, according to various embodiments.

FIG. 30 is a block diagram illustrating an example structure of an edge data network according to various embodiments.

As shown in FIG. 30, the edge data network 1230 according to the disclosure may include a processor 3030, a communicator (including communication circuitry) 3010, and a memory 3020. However, components of the edge data network 1230 are not limited to the components illustrated in FIG. 30. For example, the edge data network 1230 may include components that are more than or fewer than the above-described components. Moreover, the processor 3030, the communicator 3010, and the memory 3020 may be implemented in a single chip form.

The edge data network 1230 may perform a method of streaming a VR image in the above-described manner, and thus redundant descriptions will not be repeated here.

According to various embodiments, the processor 3030 may control a series of processes in which the edge network server 1230 operates according to the above-described embodiment of the disclosure. For example, components of the edge network server 1230 may be controlled to perform a method of streaming a VR image. The processor 3030 may perform an operation of providing a service for streaming a VR image according to the disclosure by executing a program stored in the memory 3020.

The communicator 3010 may transmit and receive a signal to and from an external device (e.g., the terminal 1210, the access network 1220, the media server, a $3^{rd}$-generation (3G) Partnership Project (3GPP) network, etc.). The signal transmitted and received to and from the external device may include control information and data. The communicator 3010 may include an RF transmitter that up-converts and amplifies a frequency of a transmission signal and an RF receiver that low-noise-amplifies a received signal and down-converts a frequency. However, this is merely an example of the communicator 3010, the components of which are not limited to the RF transmitter and the RF receiver. The communicator 3010 may receive a signal through a radio channel and output the received signal to the processor 3030, and transmit a signal output from the processor 3030 through the radio channel.

According to various embodiments, programs and data required for an operation of the edge data network 1230 may also be stored in the memory 3020. In addition, control information or data included in a signal transmitted and received by the edge data network 1230 may be stored in the memory 3020. The memory 3020 may include a storage medium such as ROM, RAM, hard-disk, CD-ROM, DVD, etc., or a combination thereof. The memory 3020 may be provided in plural. According to various embodiments, the memory 3020 may store a program for executing an operation of providing a service for streaming a VR image according to the above-described example embodiments.

According to various embodiments, the processor 3030 may control the communicator 3010 to receive gaze information of a user viewing a VR image from the device, and determine at least a partial region among all of regions of the VR image as an AI scaling target region of the VR image based on the received gaze information, determine an AI scaling change level for the AI scaling target region, perform a scaling change on a region corresponding to the AI scaling target region among the regions of the VR image obtained from the media server based on the AI scaling change level, generate VR image data including the AI scaling target region, and stream the VR image data to the device.

According to various embodiments, the processor 3030 may control the communicator to receive first network information regarding a network environment between the edge data network 1230 and the device 1210, and the processor 3030 may classify the VR image into several images based on the gaze information and the first network information, and determine the AI scaling target region based on the classified regions.

According to various embodiments, the processor 3030 may determine the AI scaling change level for the AI scaling target region based on at least one of the first network information regarding the network environment between the edge data network and the device, the first request information received from the device, or the first AI data regarding AI scaling performed by the media server.

FIG. 31 is a block diagram illustrating an example device according to various embodiments.

As shown in FIG. 31, a device 1210 may include a processor 3130, a communicator (including communication circuitry) 3110, and a memory 3120. However, components of the device 110 are not limited to the components illustrated in FIG. 31. For example, the device 110 may include components that are more than or fewer than the above-described components. Moreover, the processor 3130, the communicator 3110, and the memory 3120 may be implemented in a single chip form. According to various embodiments, the device 1210 may further include a display (not shown in FIG. 31).

The device 1210 may perform a method of displaying a VR image in the above-described manner, and thus descriptions redundant to those provided above will not be repeated here.

According to various embodiments, the processor 3130 may control a series of processes such that the device 1210 operates according to the example embodiments. For example, components of the device 1210 may be controlled to perform a method of displaying a VR image. The processor 3130 may be provided in plural and may perform an operation of displaying a VR image by executing a program stored in the memory 3120.

The communicator 3110 may transmit and receive a signal to and from an external device (e.g., the access network 1220, the access network 1230, the media server 1240, a 3GPP network, etc.). The signal transmitted and received to and from the external device may include control information and data. The communicator 3110 may include an RF transmitter that up-converts and amplifies a frequency of a transmission signal and an RF receiver that low-noise-amplifies a received signal and down-converts a frequency. However, this is merely an example of the communicator 3110, the components of which are not limited to the RF transmitter and the RF receiver. The communicator 3110 may receive a signal through a radio channel and output the received signal to the processor 3130, and transmit a signal output from the processor 3130 through the radio channel.

According to various embodiments, programs and data required for an operation of the device 1210 may also be stored in the memory 3120. Control information or data included in a signal transmitted and received by the device 1210 may be stored in the memory 3120. The memory 3120 may include a storage medium such as ROM, RAM, hard-disk, CD-ROM, DVD, etc., or a combination thereof. The memory 3120 may be provided in plural. According to various embodiments, the memory 3120 may store a program for executing an operation of displaying a VR image according to the above-described example embodiments.

According to various embodiments, the processor 3130 may determine gaze information of a user viewing a VR image, control the communicator 3110 to receive VR image data in which AI scaling change is performed on at least a partial region among all of regions of the VR image, from the edge data network, obtain a VR image from the VR image data, and display the obtained VR image.

According to various embodiments, the processor 3130 may determine at least a partial region among all of regions of a VR image as an AI scaling target region of a VR image based on user's gaze information, determine an AI scaling change level for the AI scaling target region, and perform a scaling change on a region corresponding to the AI scaling target region among the regions of the VR image obtained from the edge data network based on the AI scaling change level.

According to various embodiments, the processor 3130 may receive second AI data for AI scaling performed by the edge data network from the edge data network and determine the AI scaling change level for the AI scaling target region based on at least one of the second AI data or the user's gaze information.

According to various embodiments, the processor 3130 may receive display batch information regarding the AI scaling target region from the edge data network. The processor 3130 may combine regions of the VR image included in the VR image data based on the display batch information.

FIG. 32 is a block diagram illustrating an example media server according to various embodiments.

As shown in FIG. 32, the media server 1240 according to the disclosure may include a processor 3230, a communicator (including communication circuitry) 3210, and a memory 3220. However, components of the media server 1240 are not limited to the components illustrated in FIG. 32. For example, the media server 1240 may include components that are more than or fewer than the above-described components. Moreover, the processor 3230, the communicator 3210, and the memory 3220 may be implemented in a single chip form.

The media server 1240 may perform a method of streaming a VR image in the above-described manner, and thus descriptions redundant to those provided above will not be repeated here.

According to various embodiments, the processor 3230 may control a series of processes in which the media server 1240 operates according to the various above-described embodiments. For example, components of the media server 1240 may be controlled to perform a method of providing a service for streaming a VR image. The processor 3230 may be provided in plural, and may perform an operation of providing a service for streaming a VR image according to the disclosure by executing a program stored in the memory 3220.

The communicator 3210 may transmit and receive a signal to and from an external device (e.g., the device 1210, the access network 1220, the edge network server 1230, a 3GPP network, etc.). The signal transmitted and received to and from the external device may include control information and data. The communicator 3210 may include an RF transmitter that up-converts and amplifies a frequency of a transmission signal and an RF receiver that low-noise-amplifies a received signal and down-converts a frequency. However, this is merely an example of the communicator 3210, the components of which are not limited to the RF transmitter and the RF receiver. The communicator 3210 may receive a signal through a radio channel and output the received signal to the processor 3230, and transmit a signal output from the processor 3230 through the radio channel.

According to various embodiments, programs and data required for an operation of the media server 1240 may be stored in the memory 3220. Control information or data included in a signal obtained by the media server 1240 may be stored in the memory 3220. The memory 3220 may include a storage medium such as ROM, RAM, hard-disk, CD-ROM, DVD, etc., or a combination thereof. The memory 3220 may be provided in plural. According to various embodiments, the memory 3220 may store a program for executing an operation of providing a service for streaming a VR image according to the various above-described embodiments.

According to various embodiments, the processor 3230 may receive the second request information from the edge data network, generate VR image data based on the second request information, and stream the generated VR image data to the edge data network. The second request information may include at least one of the gaze information of the user viewing a VR image, device information, image information, second network information, or media server information.

According to various embodiments, the processor 3230 may determine at least a partial region among all of regions of a VR image as an AI scaling target region of a VR image based on user's gaze information, determine an AI scaling change level for the AI scaling target region, and perform a scaling change on a region corresponding to the AI scaling target region among the regions of the VR image requested from the edge data network based on the AI scaling change level.

According to various embodiments, the processor 3230 may change the AI scaling change level for the AI scaling target region based on at least one of the second network information or the user's gaze information.

The methods according to the example embodiments described in the claims or specification of the disclosure may be implemented by hardware, software, or a combination thereof.

When the methods are implemented by software, a computer-readable storage medium (e.g., a non-transitory computer-readable storage medium) or a computer program product having stored therein one or more programs (software modules) may be provided. The one or more programs stored in the computer-readable storage medium or computer program product may be configured for execution by one or more processors in an electronic device. The one or more programs include instructions that cause the electronic device to execute the methods according to the embodiments described in the claims or the specification of the disclosure.

These programs (software modules and software) may be stored in RAMs, non-volatile memories including flash memories, ROMs, electrically erasable programmable ROMs (EEPROMs), magnetic disc storage devices, CD-ROMs, DVDs, other types of optical storage devices, or magnetic cassettes. The programs may be stored in a memory configured by a combination of some or all of such storage devices. Also, each of the memories may be provided in plurality.

The programs may be stored to an attachable storage device of the electronic device accessible via the communication network such as Internet, Intranet, a local area network (LAN), a wireless LAN (WLAN), or storage area network (SAN), or a communication network by combining the networks. The storage device may access a device performing the embodiment of the disclosure through an external port. Furthermore, a separate storage device in a communication network may access a device performing the embodiment of the disclosure.

In the disclosure, the term "computer program product" or "computer-readable medium" may be used to overall indicate a memory, a hard disk installed in a hard disk drive, a signal, etc. The "computer program product" or the "computer-readable recording medium" may be a means provided to a software computer system including instructions for the example embodiments.

According to the various example embodiments, there may be provided a VR streaming method based on adaptive AI upscaling or AI downscaling according to a network environment, user's gaze information, support or non-support for AI codec of a media server by using an edge data network.

In the detailed example embodiments, components included in the disclosure have been expressed as singular or plural according to the provided detailed embodiment of the disclosure. However, singular or plural expressions have been selected properly for a condition provided for convenience of a description, and the disclosure is not limited to singular or plural components and components expressed as plural may be configured as a single component or a component expressed as singular may also be configured as plural components.

While the disclosure has been illustrated and described with reference to various example embodiments, it will be understood that the various example embodiments are intended to be illustrative, not limiting. It will be further understood by one skilled in the art, that various changes in form and detail may be made without departing the true spirit and full scope of the disclosure, including the appended claims and their equivalents.

What is claimed is:

1. A method, performed by an edge data network, of streaming a virtual reality (VR) image, the method comprising:
   receiving gaze information associated with a displayed VR image, from a device;
   determining at least a partial region among all of regions of the VR image as an artificial intelligence (AI) scaling target region of the VR image, based on the gaze information;
   determining an AI scaling change level for the AI scaling target region;
   performing a scaling change on a region corresponding to the AI scaling target region among the regions of the VR image obtained from a media server, according to the AI scaling change level;
   generating VR image data comprising the AI scaling target region; and
   streaming the VR image data to the device.

2. The method of claim 1, wherein the determining of the at least partial region among all of the regions of the VR image as the AI scaling target region of the VR image, based on the gaze information comprises:
   receiving first network information regarding a network environment between the edge data network and the device;
   classifying the VR image into a plurality of regions based on the gaze information and the first network information; and
   determining the AI scaling target region based on the classified regions.

3. The method of claim 1, wherein the AI scaling change level is determined based on at least one of the first network information regarding the network environment between the edge data network and the device, first request information received from the device, or first AI data regarding AI scaling performed by the media server.

4. The method of claim 1, further comprising receiving first request information from the device,
wherein the first request information of the device comprises at least one of the gaze information of the user, first network information, device information, or image information.

5. The method of claim 1, wherein the determining of the AI scaling change level for the AI scaling target region comprises generating display batch information about all of the regions of the VR image, including the AI scaling target region, based on the AI scaling change level determined for the AI scaling target region.

6. The method of claim 5, wherein the streaming of the VR image data to the device comprises transmitting the display batch information to the device.

7. The method of claim 1, further comprising obtaining the VR image from the media server.

8. The method of claim 7, wherein the obtaining of the VR image from the media server comprises:
generating second request information based on at least one of the gaze information of the user, device information, image information requested by the device, second network information regarding a network environment between the edge data network and the media server, or media server information;
transmitting the second request information to the media server; and
receiving, from the media server, VR image data generated based on the second request information.

9. The method of claim 8, wherein the receiving of the VR image data generated based on the second request information from the media server comprises receiving first AI data regarding AI downscaling performed by the media server, and
wherein the VR image data generated based on the second request information corresponds to data of a VR image whose partial region among all of regions of the VR image is AI-downscaled.

10. The method of claim 1, wherein the streaming of the VR image data to the device comprises transmitting second AI data regarding the AI scaling change level to the device.

11. A method, performed by a device, of displaying a virtual reality (VR) image, the method comprising:
determining gaze information of a VR image displayed by the device;
receiving, from the edge data network, VR image data for a VR image in which at least a partial region among all of regions of the VR image has undergone an artificial intelligence (AI) scaling change;
obtaining a VR image from the VR image data; and
displaying the obtained VR image,
wherein the obtaining of the VR image from the VR image data comprises:
determining the at least partial region among all of the regions of the VR image as an AI scaling target region of the VR image, based on the gaze information;
determining an AI scaling change level for the AI scaling target region; and
performing a scaling change on a region corresponding to the AI scaling target region among the regions of the VR image obtained from the edge data network, according to the AI scaling change level.

12. The method of claim 11, wherein the determining of the AI scaling change level for the AI scaling target region comprises:
receiving second AI data regarding AI scaling performed by the edge data network, from the edge data network; and
determining the AI scaling change level for the AI scaling target region based on at least one of the second AI data or the gaze information of the user.

13. The method of claim 11, further comprising receiving display batch information regarding the AI scaling target region from the edge data network, and
wherein the displaying of the obtained VR image comprises combining regions of the VR image which are included in the VR image data, based on the display batch information.

14. A method, performed by a media server, of streaming a virtual reality (VR) image, the method comprising:
receiving request information from an edge data network;
generating VR image data based on the request information; and
streaming the generated VR image data to the edge data network,
wherein the generating of the VR image data based on the request information comprises:
determining at least a partial region among all of regions of the VR image as an artificial intelligence (AI) scaling target region of the VR image;
determining an AI scaling change level for the AI scaling target region; and
performing a scaling change on a region corresponding to the AI scaling target region among the regions of the VR image, according to the AI scaling change level.

15. The method of claim 14, wherein the request information comprises at least one of gaze information of a user viewing the VR image, device information, image information, second network information, or media server information.

16. The method of claim 14, wherein the AI scaling change level is determined based on at least one of the gaze information of the user or the second network information.

17. An edge data network for streaming a virtual reality (VR) image, the edge data network comprising:
a communicator, including communication circuitry, configured to communicate with a device and a media server;
a memory storing at least one instruction; and
at least one processor configured to control the edge data network by executing the at least one instruction,
wherein the executing of the at least one instruction configures the processor to:
control the communicator to receive gaze information of a displayed VR image, from the device;
determine at least a partial region among all of regions of the VR image as an artificial intelligence (AI) scaling target region of the VR image, based on the received gaze information;
determine an AI scaling change level for the AI scaling target region;
perform a scaling change on a region corresponding to the AI scaling target region among the regions of the VR image obtained from the media server, according to the AI scaling change level;

generate VR image data comprising the AI scaling target region; and control the communicator to stream the VR image data to the device.

18. The edge data network of claim 17, wherein the executing of the at least one instruction further configures the processor to:

control the communicator to receive first network information regarding a network environment between the edge data network and the device;

classify the VR image into a plurality of regions based on the gaze information and the first network information; and determine the AI scaling target region based on the classified regions.

* * * * *